(12) United States Patent
Liu

(10) Patent No.: US 6,260,871 B1
(45) Date of Patent: Jul. 17, 2001

(54) TANGENTIAL WHEEL SUSPENSION SYSTEM

(76) Inventor: Yingjie Liu, c/o Baying Zhou, Tech. Service Center of Saving Energy, Nanning, Guangxi 530023 (CN)

( * ) Notice: Subject to any disclaimer, the term of this patent is extended or adjusted under 35 U.S.C. 154(b) by 0 days.

(21) Appl. No.: 09/280,907

(22) Filed: Mar. 29, 1999

Related U.S. Application Data

(60) Provisional application No. 60/082,558, filed on Apr. 21, 1998.

(51) Int. Cl.[7] .................................................. B62K 25/16
(52) U.S. Cl. ........................... 280/277; 280/276; 280/279
(58) Field of Search ................................... 280/275, 276, 280/279, 284, 277, 11.28, 283; 180/219

(56) References Cited

U.S. PATENT DOCUMENTS

| | | | |
|---|---|---|---|
| 5,413,368 | * | 5/1995 | Pong et al. ........................ 280/276 X |
| 5,431,426 | * | 7/1995 | Ijams et al. ............................ 280/276 |
| 5,899,478 | * | 5/1999 | Woodside ......................... 280/277 X |

FOREIGN PATENT DOCUMENTS

| | | | | |
|---|---|---|---|---|
| 459398 | * | 12/1949 | (IT) ...................................... 280/276 |
| 405330473 | * | 12/1993 | (JP) ...................................... 280/276 |

* cited by examiner

*Primary Examiner*—Eric Culbreth
*Assistant Examiner*—F. Zeender
(74) *Attorney, Agent, or Firm*—Michael I Kroll

(57) ABSTRACT

A wheel suspension system for reducing or eliminating the shock associated with travelling over bumps and dents on a roadway on a wide variety of low speed wheeled transportation equipment. The system includes substantially vertically positioned swing arms connected between the wheel axle and frame of the wheeled transportation equipment. The swing arms cause a bump or a dent on the ground to feel as if travelling over smooth ramps and thereby eliminating the shock normally felt when travelling over the bumps or dents. The system does not utilize shock absorbing springs and is structurally simpler and more stable. Furthermore, the system keeps the gravity center of the frame of the wheeled transportation equipment at a similar level to that with no suspension system and also increases the wheel's ability to overcome large obstacles.

2 Claims, 62 Drawing Sheets

TANGENTIAL WHEEL SUSPENSION SYSTEM

REFERENCE TO RELATED APPLICATIONS

Priority for this application is claimed from the U.S. provisional patent application Ser. No. 60/082,558, filed Apr. 21, 1998, entitled "Wheel Suspension for Small Wheels to Overcome Big Obstacle".

BACKGROUND OF THE INVENTION

This application is also based on disclosure documents by the same inventor with disclosure document numbers: 429340, 432511, 429131, 429131, 428843, 427754, 428048, in 1997; and 442273, 438665, 444981, 444459, 441661, 437590, 437273, 436836, 436693, 436206, 436035, 435779, 435671, 430641, 431767, 432317, 434741, 42997, 429722 in 1998.

1. Field of the Invention

This invention relates generally to wheel suspension systems, and more particularly to a wheel suspension system able to smooth movement of an object or load carried on wheels when travelling over obstructions on a surface being navigated.

2. Background of the Invention

Conventional wheel suspension systems greatly improve the function of the wheel, one of the oldest inventions, for travelling on non smooth surface, by smoothing out the momentum of the object the wheel carries, which the movement of the weight center of the wheel may not be smooth. The distance between the wheel and the object it carries is flexible so that when the wheel encounters as obstacle the distance between the wheel and object being carried thereby shrinks in order for the wheel to overcome the obstacle while keeping the momentum of the object relatively unchanged. This inevitably increases the gravity center of the object, which in certain situations (e.g., inline roller skate), is a big disadvantage. Also the shrinkable distance between the object and the wheel requires elastic material to connect the wheel and the object. This increases the complexity and cost, decreases the reliability and stability in some applications and introduces vibration to the object.

It is thus desirable to provide a fundamentally new wheel suspension mechanism. It is further desirable to provide a wheel suspension mechanism in which contrary to conventional suspension systems, the distance between the wheel and the object it carries will not shrink in the normal position. Thus, the gravity center of the object can be positioned as low as if no suspension system were used, and the object will have maximum stability. It is yet further desirable to provide a wheel suspension mechanism which does not require any form of elastic material (like spring etc), and therefore is simpler, more reliable and introduces no vibration to the object. It is still further desirable to provide a wheel suspension mechanism which overcomes the drawbacks of conventional suspension systems and could be applied to all sorts of low speed equipment such as, bicycles, trailers, scooters, skates, skate boards, roller skis, wheelchairs, baby strollers, carts, dollies etc. and some industrial applications.

SUMMARY OF THE INVENTION

This invention relates generally to wheel suspension system and, more particularly, to a wheel suspension system able to smooth movement of an object carried on wheels when travelling over obstructions on a surface being navigated.

A primary object of the present invention is to provide a wheel suspension mechanism which overcomes the drawbacks of conventional suspension systems and could be applied to all sorts of low speed equipment like bicycles, trailers, scooters, skates, skate boards, roller skis, wheelchairs, baby strollers, carts, dollies etc. and some industrial applications.

A further object of the present invention is to provide a wheel suspension mechanism in which, contrary to conventional suspension systems, the distance between the wheel and the object carried thereby does not shrink in the normal position, thus, the gravity center of the object can be positioned as if no suspension system were used, and the object will have maximum stability.

An even further object of the present invention is to provide a wheel suspension mechanism which does not require any form of elastic material (like spring, etc.), and therefore is simpler, more reliable and introduces no vibration to the object.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENT

Figure 1:
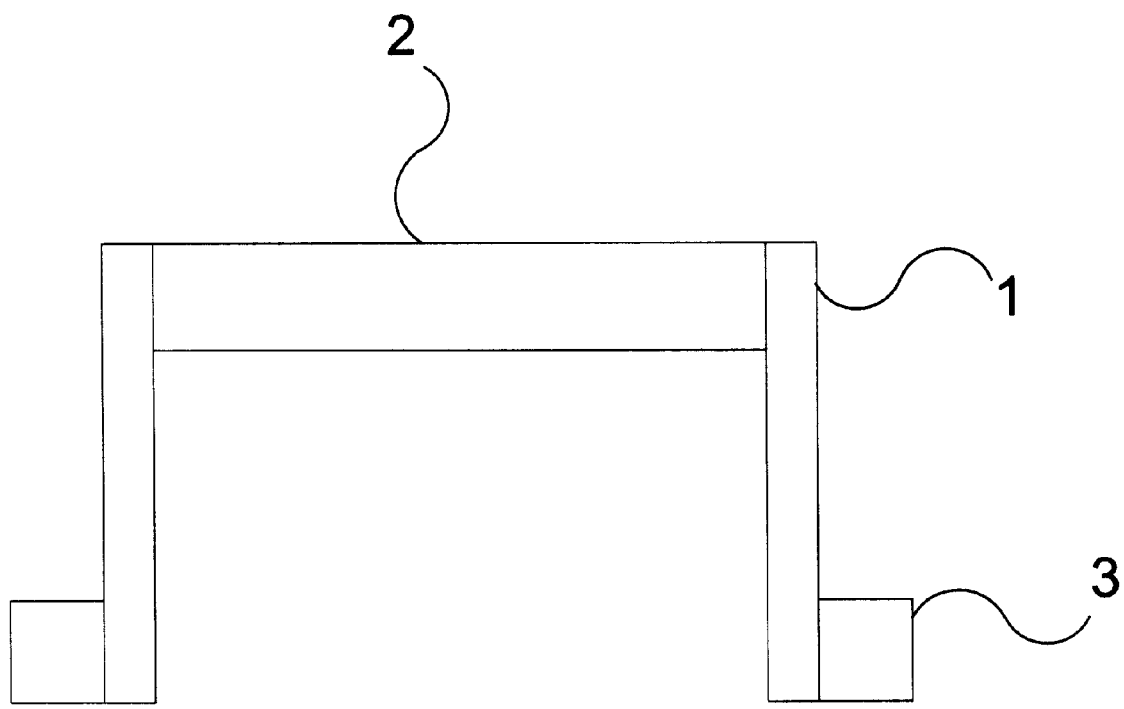
FIG. 1 is a front view of a front wheel axle fixed to two string arms of the wheel suspension system of the present invention.
Figure 62:
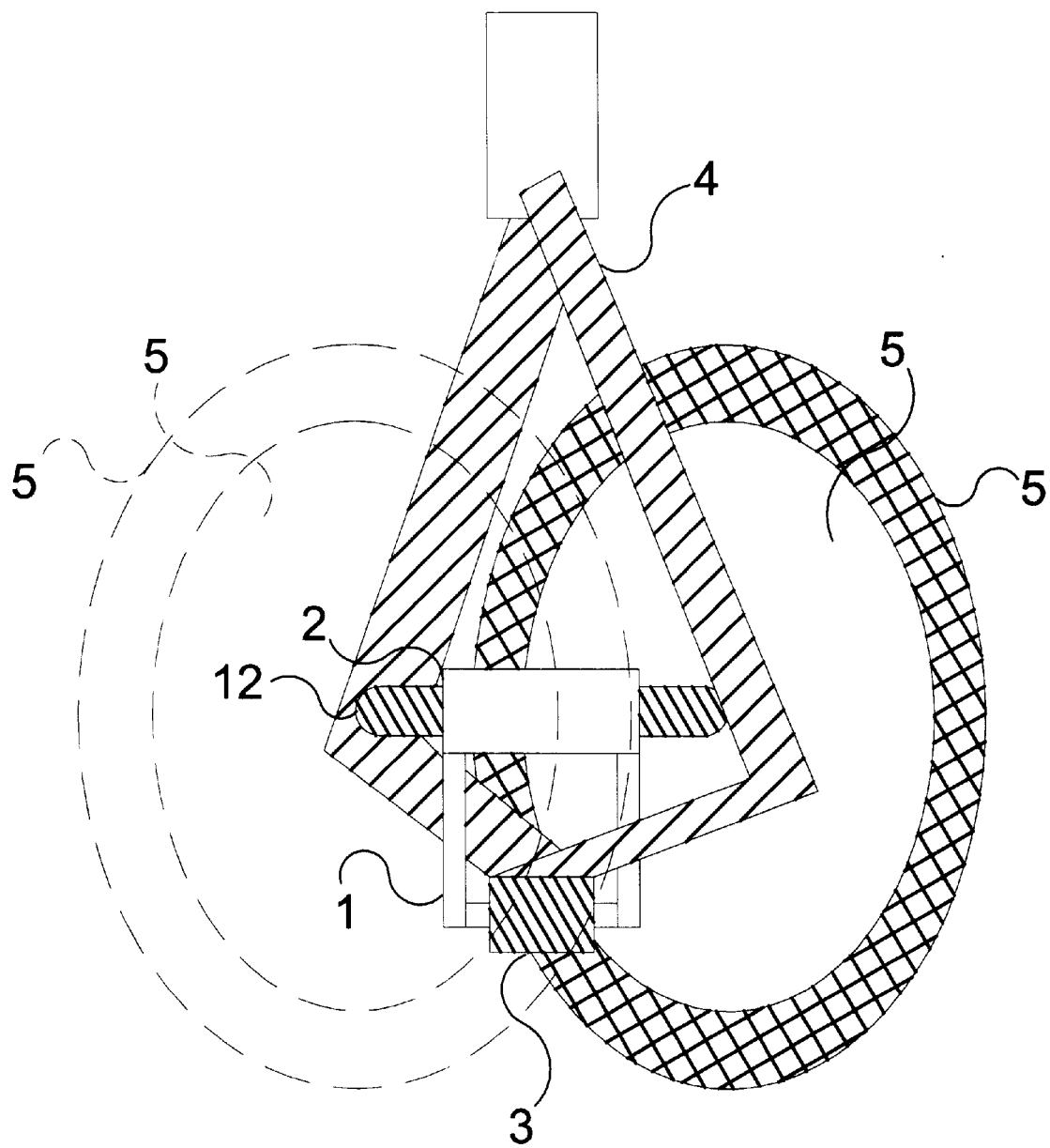
FIG. 62 is a perspective view of double wheels of the baby stroller including the wheel suspension system of the present invention.

Turning now descriptively to the drawings, in which similar reference characters denote similar elements throughout the several views, FIGS. 1 through 62 illustrate the wheel suspension system of the present invention indicated generally by the numeral 10.

It is better to use an example to explain the basic mechanism behind the wheel suspension system 10 of the present invention. In the following subsections, a bicycle 12 having a front wheel 5 is used as a simple model to define this new suspension system 10 and study the physics behind it.

1.1 The Concept of Tangential Suspension (TS)

Figure 2:
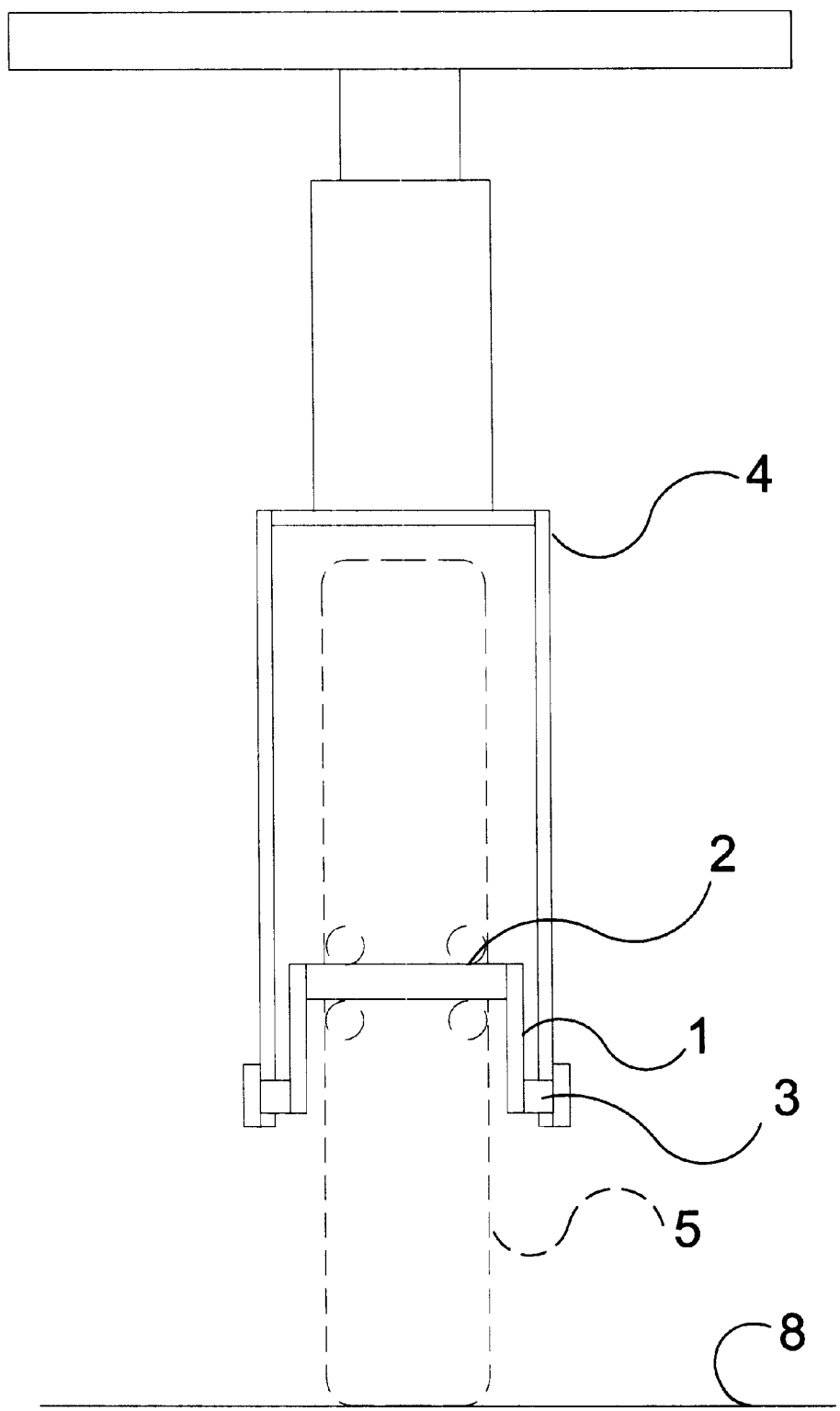
FIG. 2 is a front view of a wheel axle of a bicycle fixed to the two string arms of the wheel suspension system of the present invention.
Figure 3:
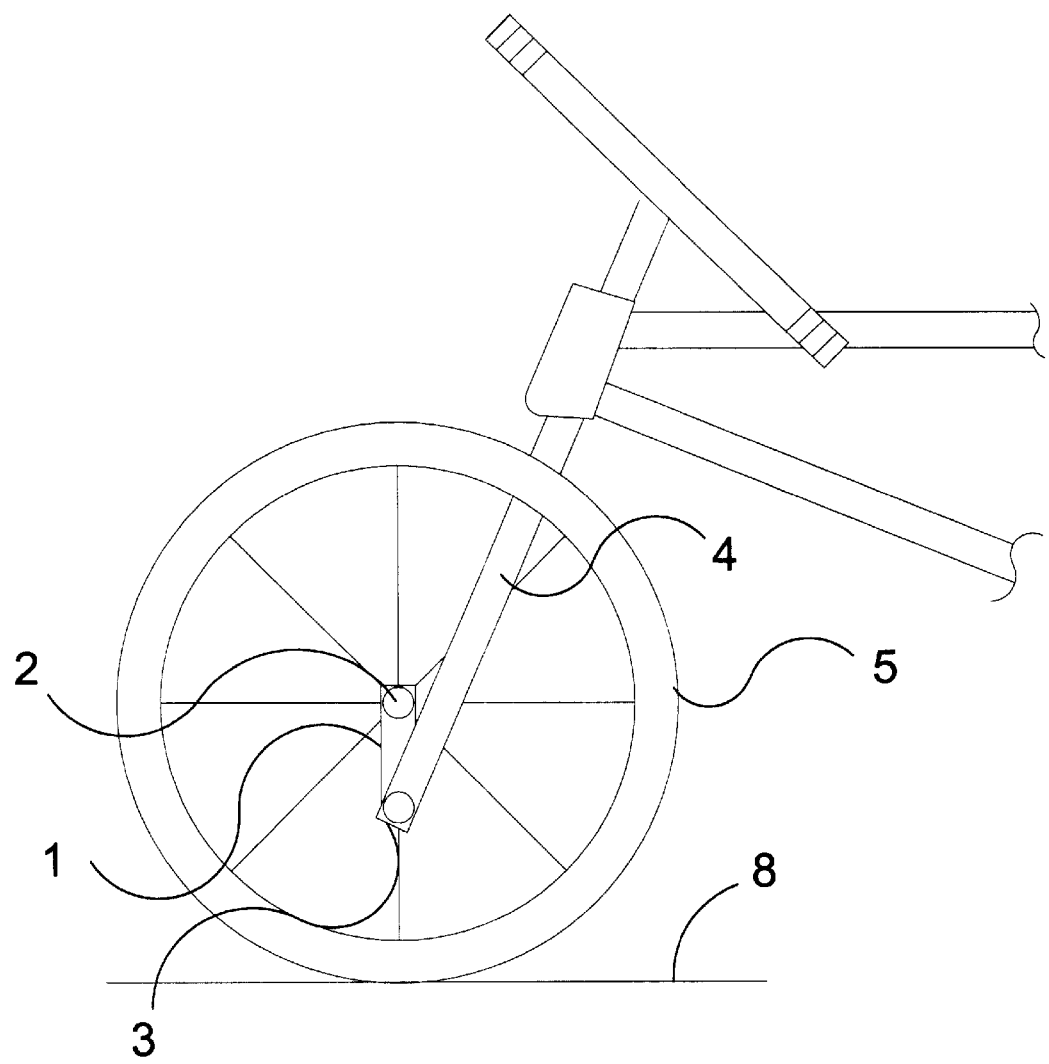
FIG. 3 is a side view of a wheel axle of a bicycle fixed to the two string arms of the wheel suspension system of the present invention.

FIGS. 1–3 are different views of TS 10 of the present invention applied to the front wheel 5 of a bicycle. FIG. 1 shows that the front wheel axle 2 can be fixed to the two swing arms 1. Extending from each of the two swing arms 1 is a joint 3.

FIG. 2 is the font view of the front wheel 5 of the bicycle 12 equipped with TS 10. Note that the two swing arms 1 are pivotally connected to the front fork 4 of the bicycle frame 14 via the joints 3 on the ends of each swing arm 2. The joints 3 are positioned below the wheel axle 2 because of the weight of the frame 14. The wheel 5 pivots about the axle 2. FIG. 3 is the side view of the same embodiment. Note that the swing arms 1 extend perpendicular to the ground 8 and the joints 16 between the wheel 5 and the swing arms 1 are above the joints 3 between the front fork 4 and the swing arms 1. (This swing arm 1 position is defined as the NORMAL POSITION). In real world design, joints 3 should be more delicate in order to achieve torsional rigidity. The swing arms 1 should be able to rotate around joints 3 in both the forward and backward direction for at most 90 degrees. (More than that could be harmful and should be restricted).

2.2 The Physics Behind TS

Figure 4:
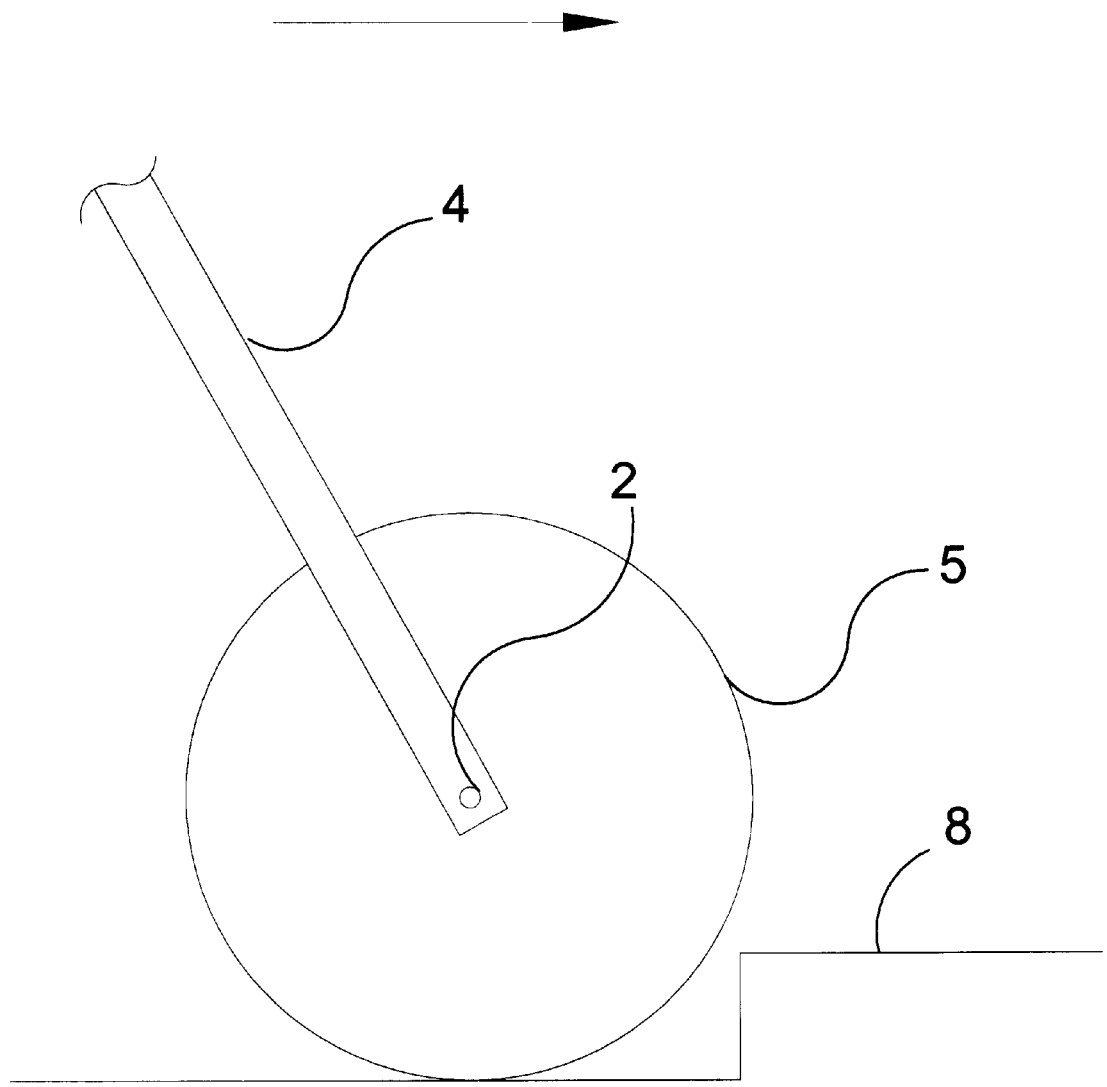
FIG. 4 is a side view of a front wheel of a bicycle without the wheel suspension system of the present invention approaching a bump.
Figure 5:
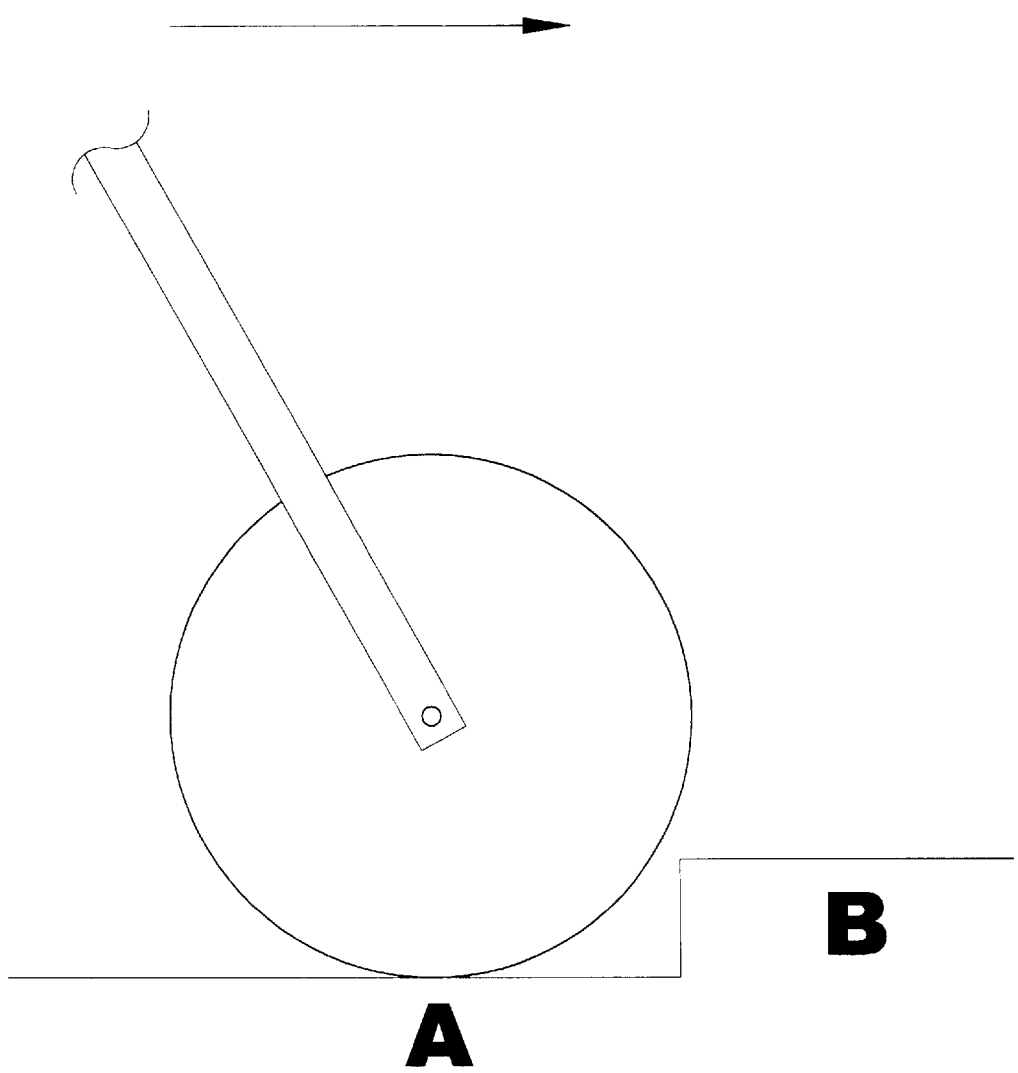
FIG. 5 is a side view of the front wheel of a bicycle without the wheel suspension system of the present invention from FIG. 4 meeting the bump.
Figure 6:
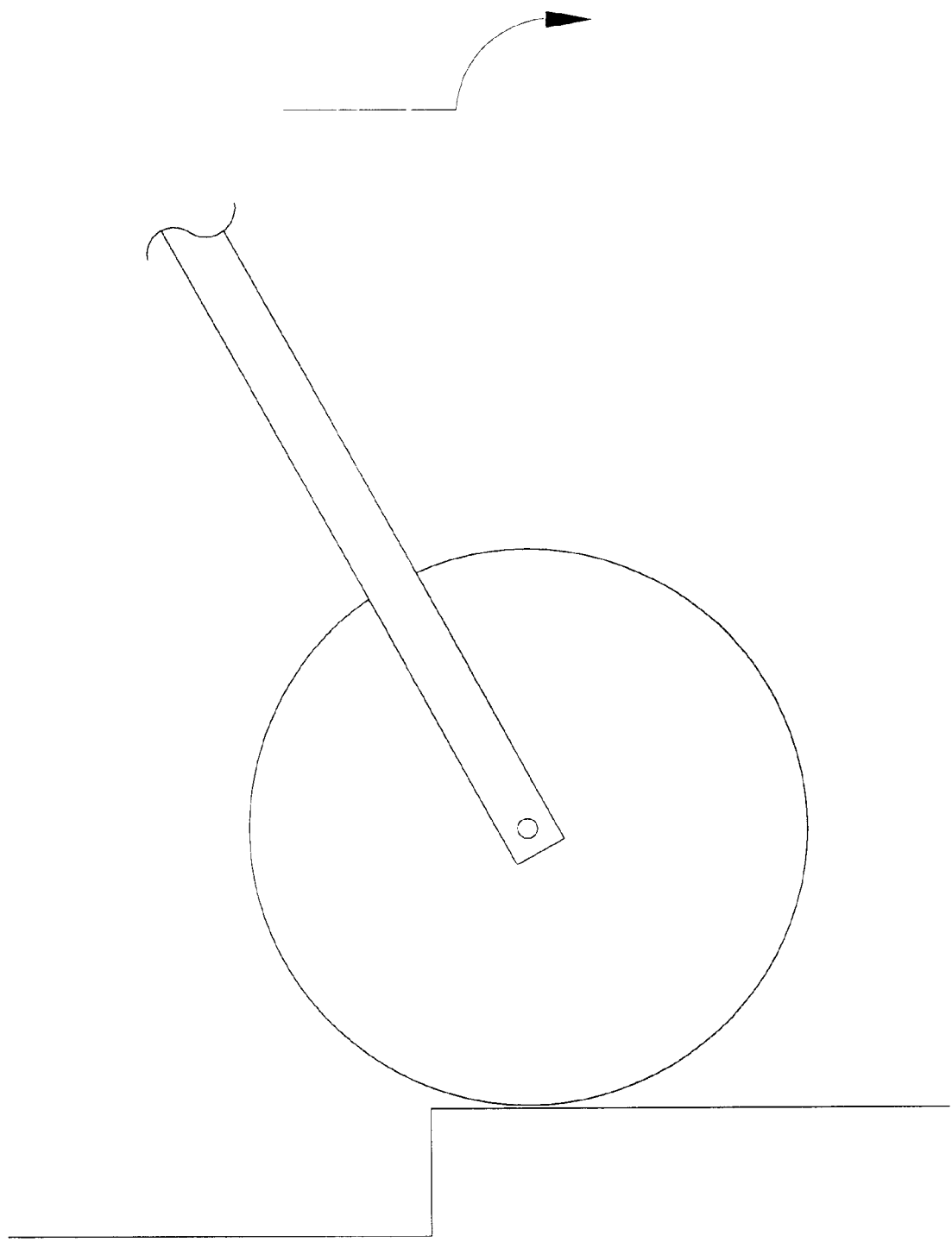
FIG. 6 is a side view of the front wheel of a bicycle without the wheel suspension system of the present invention from FIG. 4 rolling over the bump.

FIGS. 4–6 show how a bicycle front wheel 5 without any suspension system overcomes an obstacle 18 on a surface of the ground 8. The curve, labeled with the numeral 20, on top of FIG. 6 shows the trajectory of the frame 14 with respect to time in the whole procedure. Note that there is a corner 22 in the curve, which means the momentum (the time derivative of the trajectory) has a jump when the wheel 5 touches the bump 18. Therefore there is a shock acting on the frame 14 to cause the jump of momentum. As can be seen from FIGS. 4 and 5, the arrow 24 on top of FIG. 4 and the arrow 26 on top of FIG. 5 indicate the trajectory of the frame 14 prior to and up until contact of the wheel 5 with the bump 18. As the wheel 5 is traveling on flat ground 8 until contacting the bump 18, the trajectory of the wheel 5 is parallel to the around 18.

FIGS. 7–10 shows how the TS 10 eliminates the shock which occurs in wheeled objects not containing the TS 10.

Figure 7:
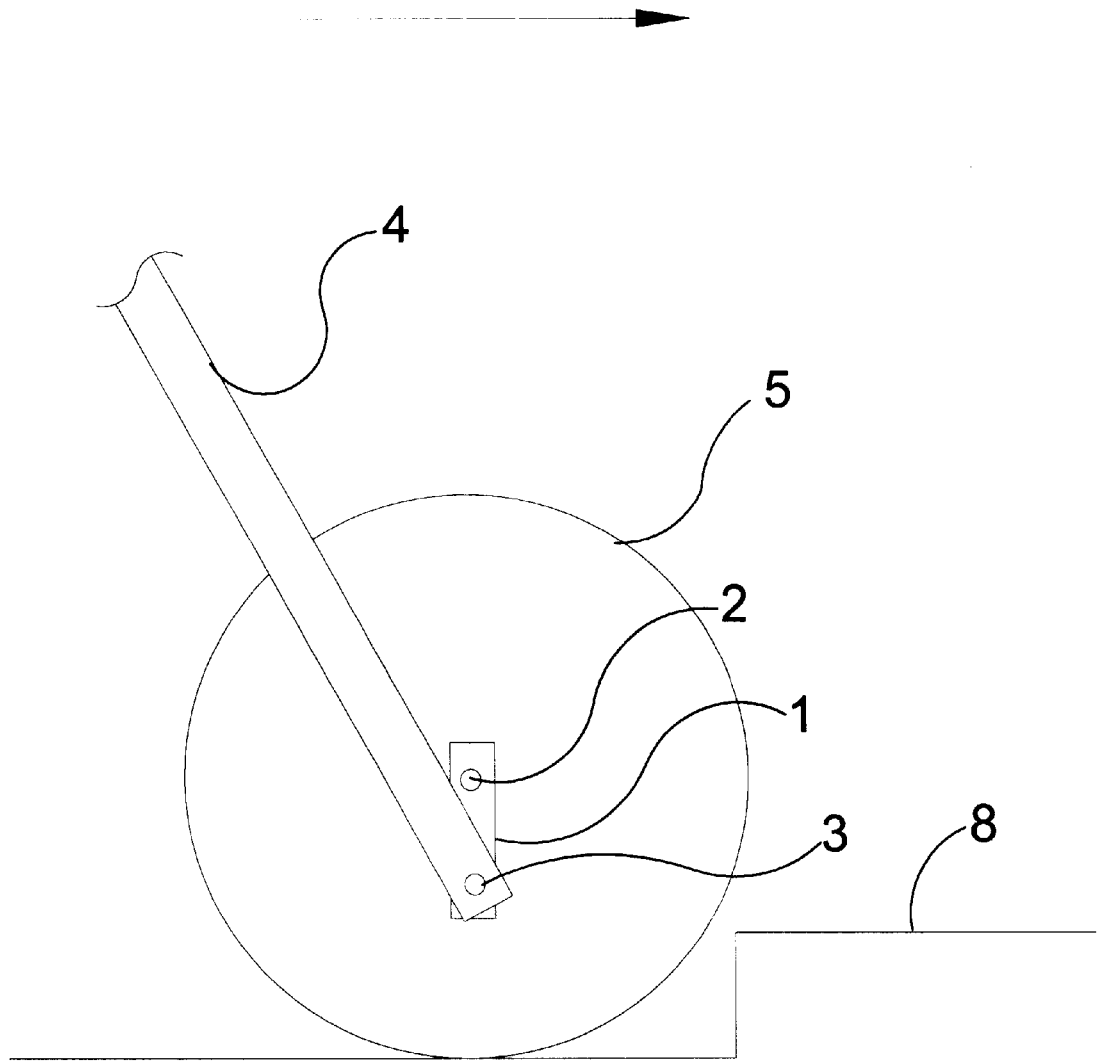
FIG. 7 is a side view of a front wheel of a bicycle with the wheel suspension system of the present invention approaching a bump.
Figure 8:
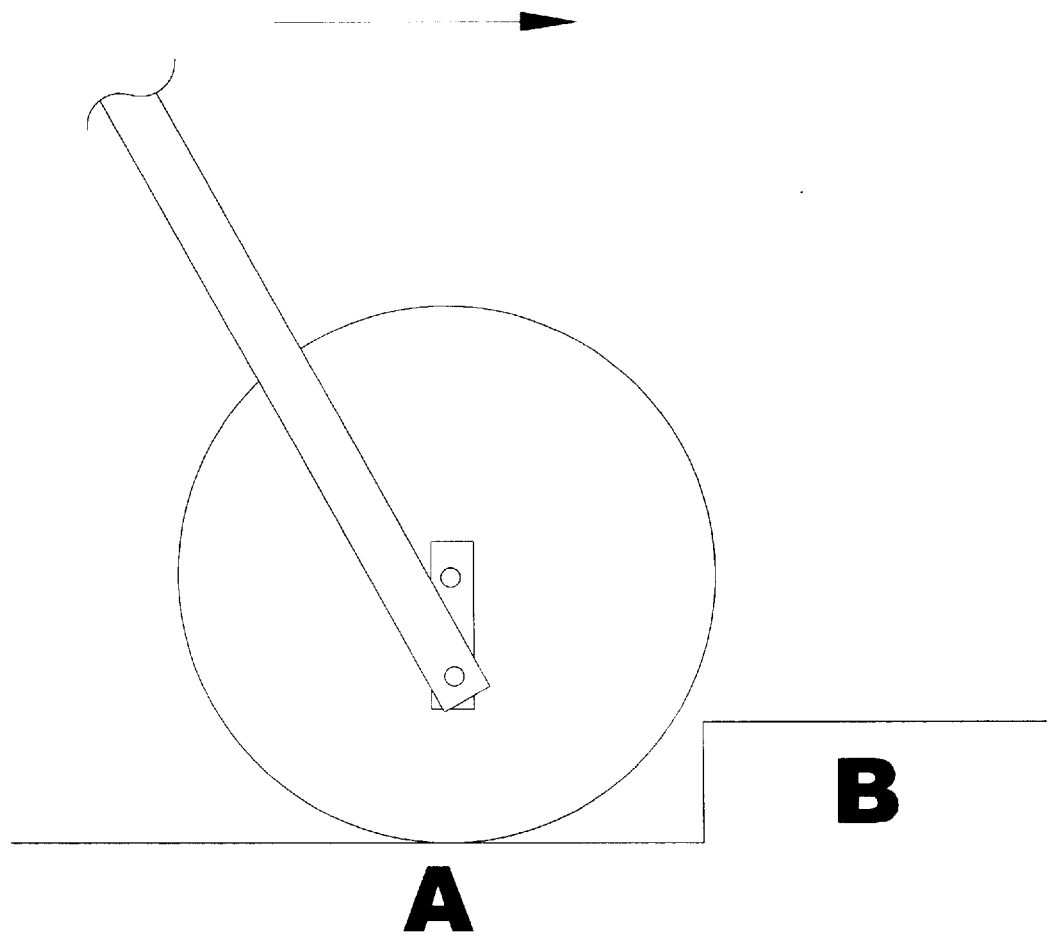
FIG. 8 is a side view of the front wheel of a bicycle with the wheel suspension system of the present invention from FIG. 7 touching the bump.

FIG. 7 shows that the bicycle front wheel 5 with TS 10 connected thereto is moving towards a bump 18. The arrow 28 on the top of FIG. 7 shows the trajectory of the frame 14. FIG. 8 shows the moment of the bicycle 12 when the wheel 5 touches the bump 18. Note that point A is where the wheel 5 contacts the ground 8 and point B is where the wheel 5 touches the bump 18. The arrow labeled with the numeral 30 located on top of FIG. 8 indicates the trajectory of the frame 14 of the bicycle 12 prior to contacting the bump 18.

Figure 9:
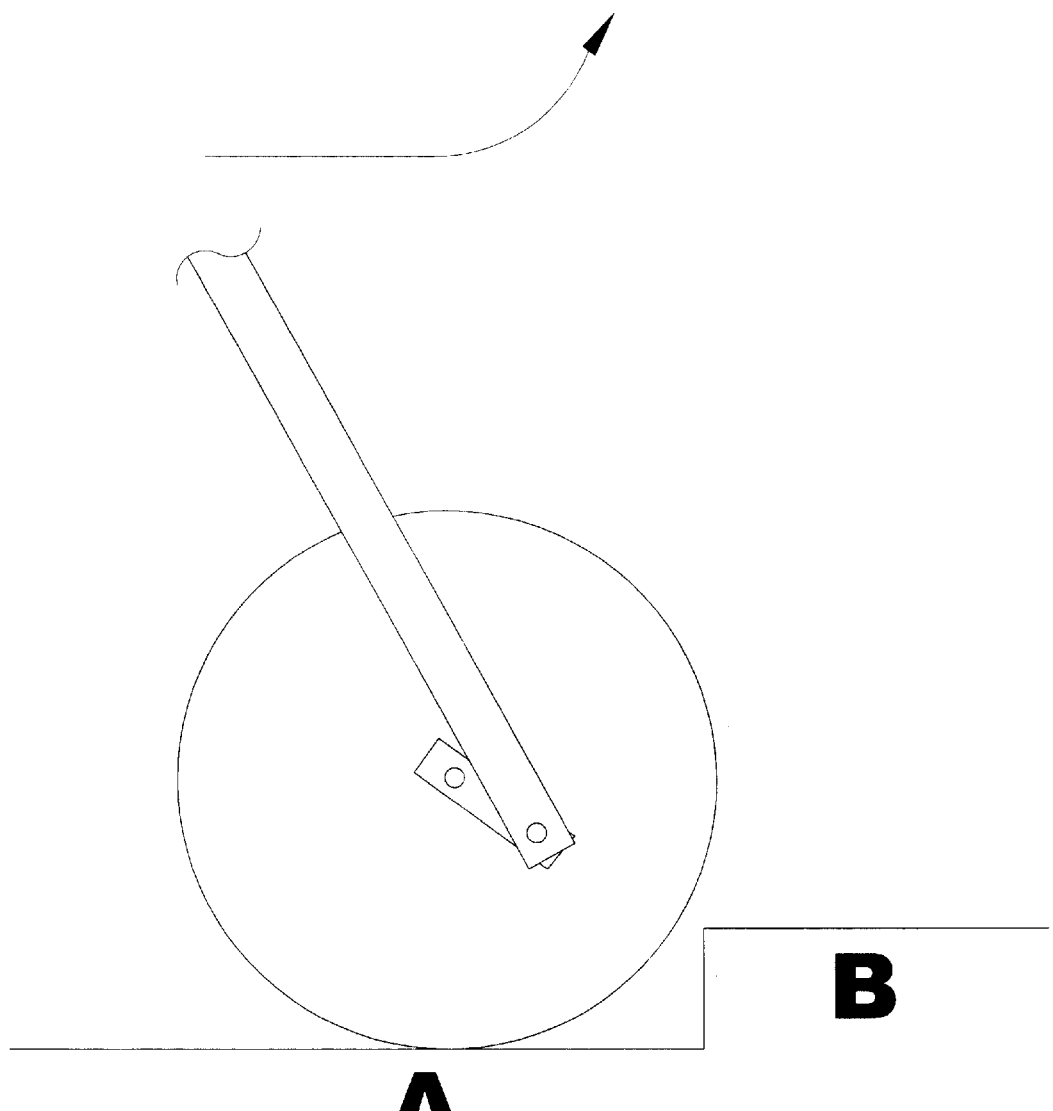
FIG. 9 is a side view of the front wheel of a bicycle with the wheel suspension system of the present invention from FIG. 7 showing movement of the swing arms when meeting the bump.
Figure 10:
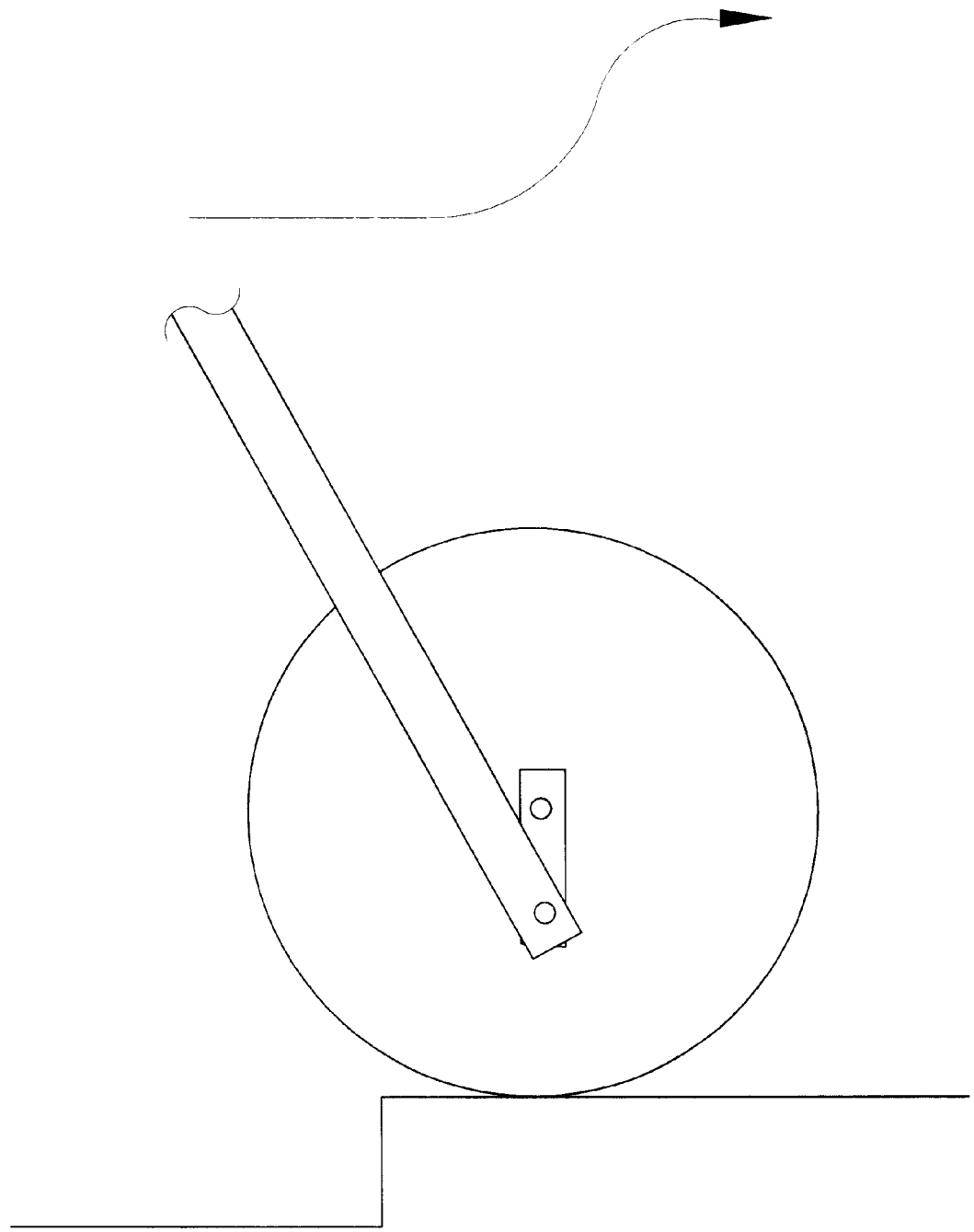
FIG. 10 is a side view of the front wheel of a bicycle with the wheel suspension system of the present invention from FIG. 7 rolling over the bump.

FIG. 9 shows that, because the wheel is very light compared to the frame 14 and a rider positioned on the frame and riding the bicycle 12, the wheel 5 stops while the frame 14 keeps moving forward and upward smoothly under the restricting of the swing arms 1. The curve 32 on top of FIG. 9 shows the trajectory of the wheel 5 with respect to time. When the swing arm 1 swings to the position so that it points toward B, as shown in FIG. 9, (let's call this moment the CRITICAL MOMENT, and the angle between the line passing A and the wheel center 34 and the line passing B and the wheel center 36 the CRITICAL ANGLE 38), the force of the swing arm 1 acting on the wheel axle 40 will start to move the wheel 5 again over the bump 18, as shown in FIG. 10. The curve 42 on top of 10 shows the trajectory of the frame 14 in the whole procedure. Unlike the curve 20 in FIG. 6, this curve 42 is continuously differentiable. i.e., tangentially connected, therefore there is no shock acting on the frame 14 during the whole procedure. Notice that the direction change of the momentum in the curve 20 in FIG. 6 just before and after the corner 22 is as large as that in FIG. 9 at the beginning and the end of the concave up curve 42. This tells us that TS 10 wouldn't cause "overshooting" theoretically. In the real world, the direction chance of the momentum in the curve 20 in FIG. 6 should be larger because the shock causes larger energy losses. That is why the rider will feel much smoother and slicker with TS 10 on a non smooth road.

FIGS. 11–14 show how the TS 10 reduces shocks from a dent.44 (It totally eliminates shocks in this case in a low speed).

Figure 11:
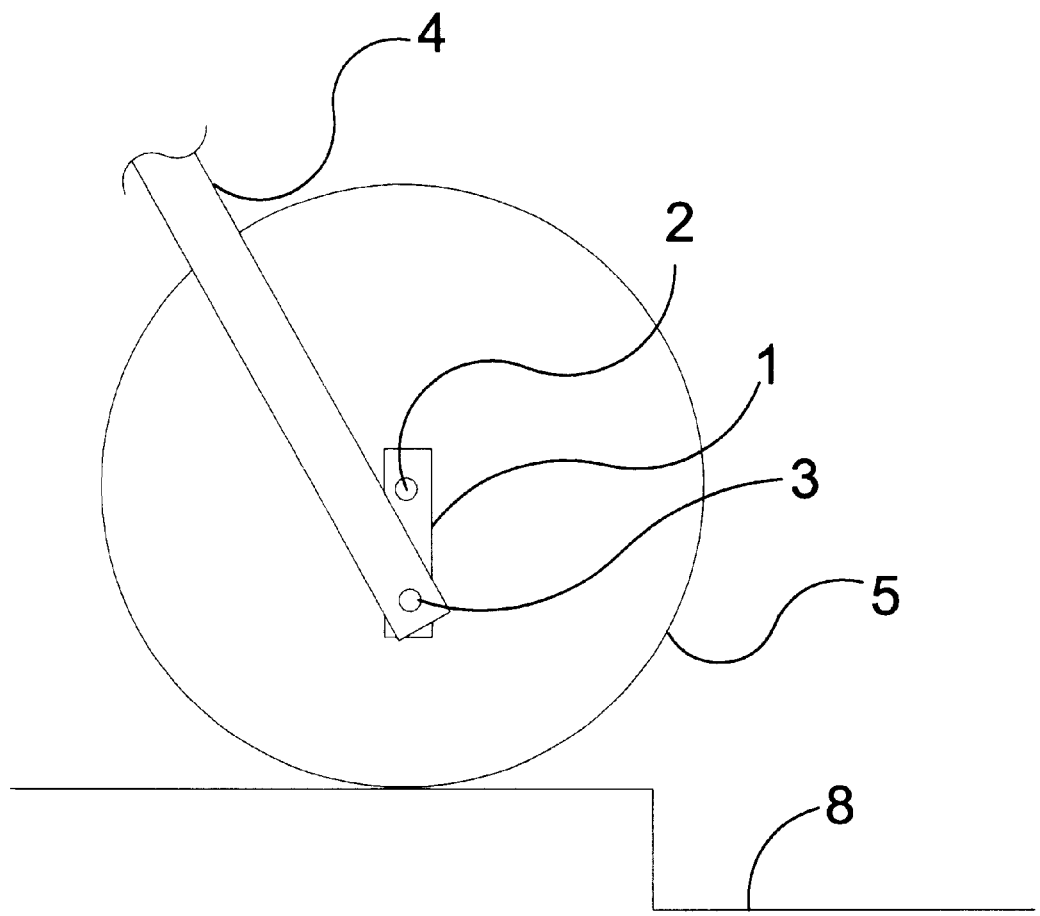
FIG. 11 is a side view of a front wheel of a bicycle with the wheel suspension system of the present invention approaching a dent.
Figure 12:
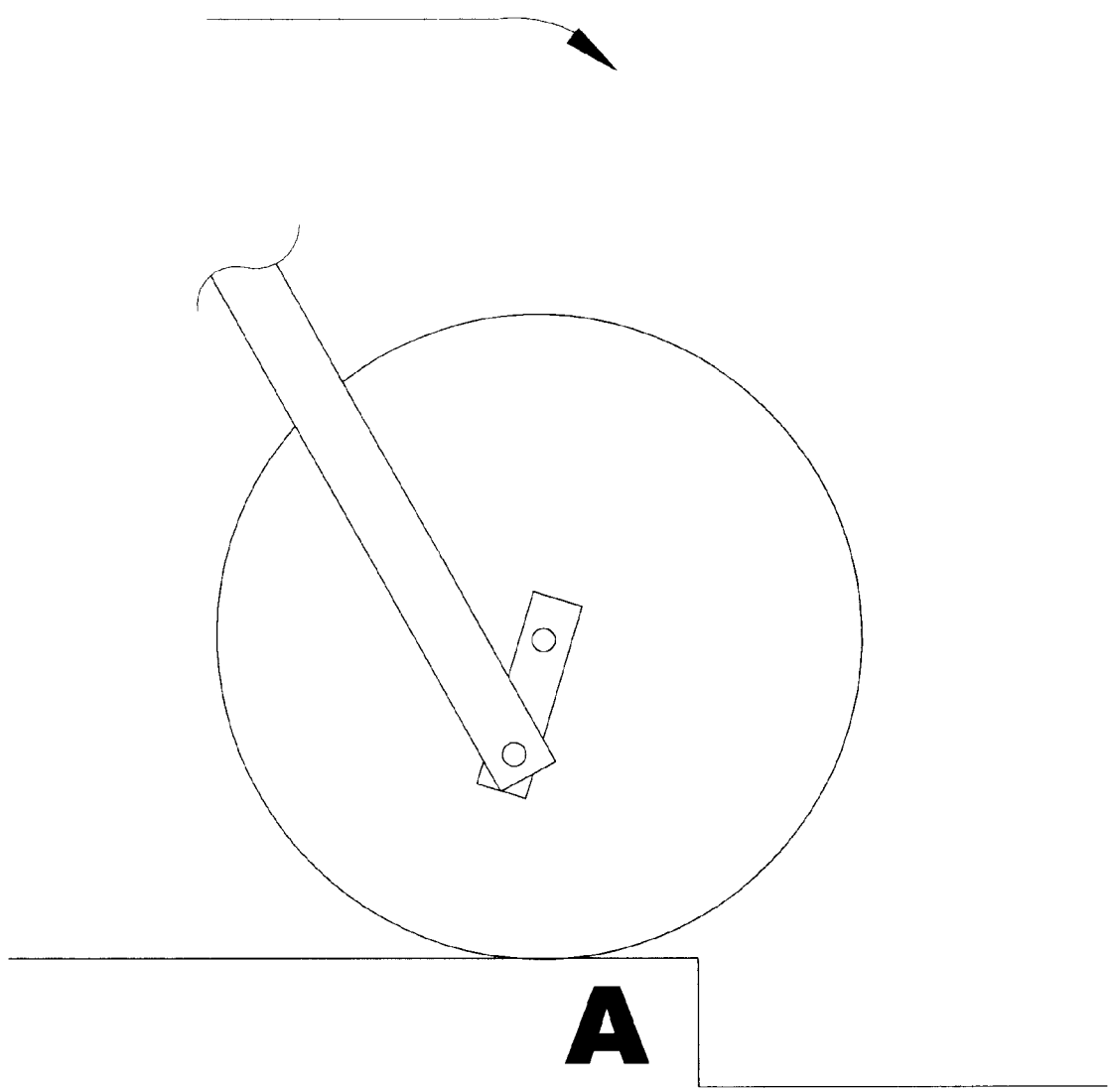
FIG. 12 is a side view of the front wheel of a bicycle with the wheel suspension system of the present invention from FIG. 11 showing movement of the swing arms when touching an edge of the dent.
Figure 13:
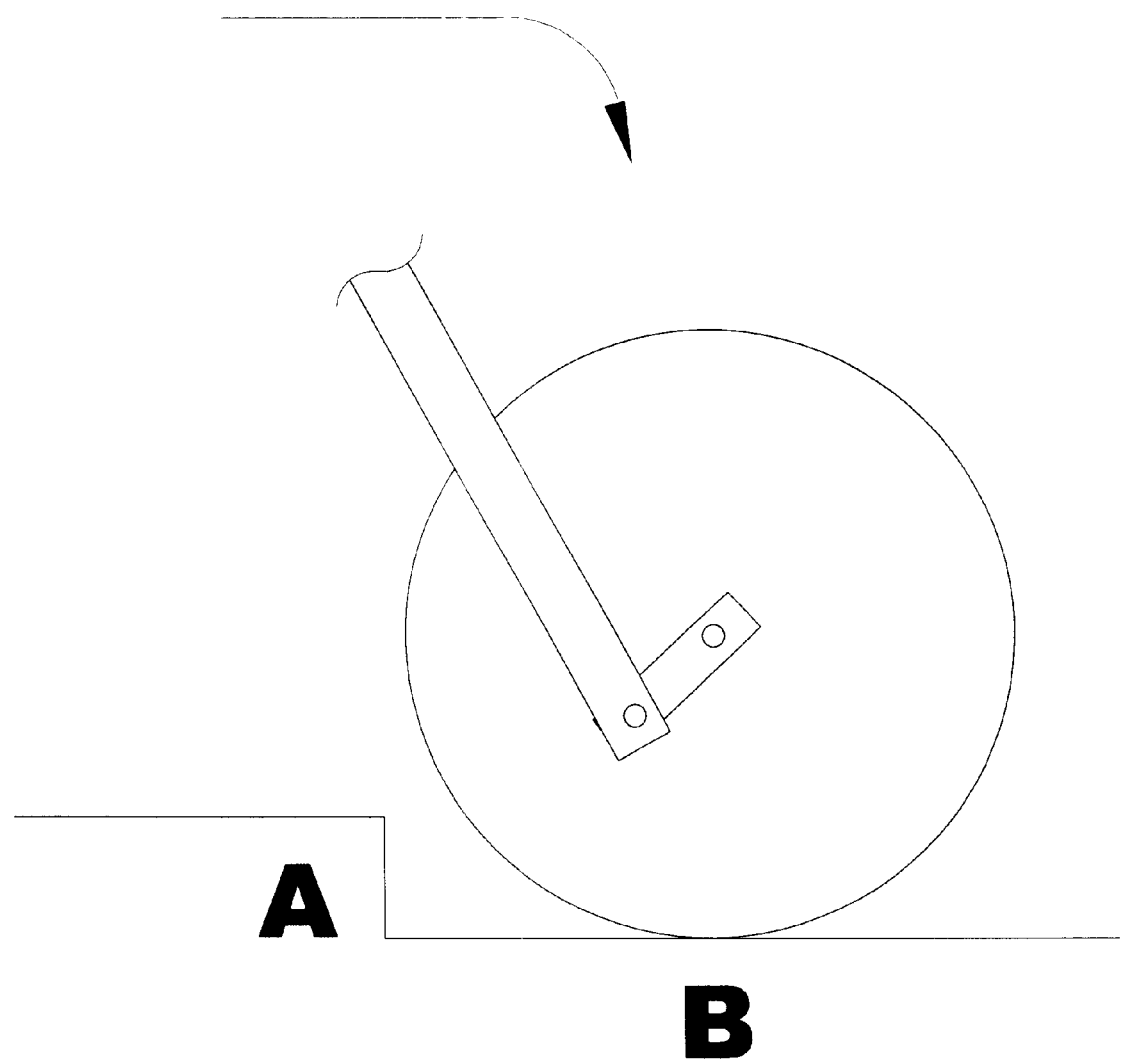
FIG. 13 is a side view of the front wheel of a bicycle with the wheel suspension system of the present invention from FIG. 11 showing movement of the swing arms when touching a bottom of the dent.
Figure 14:
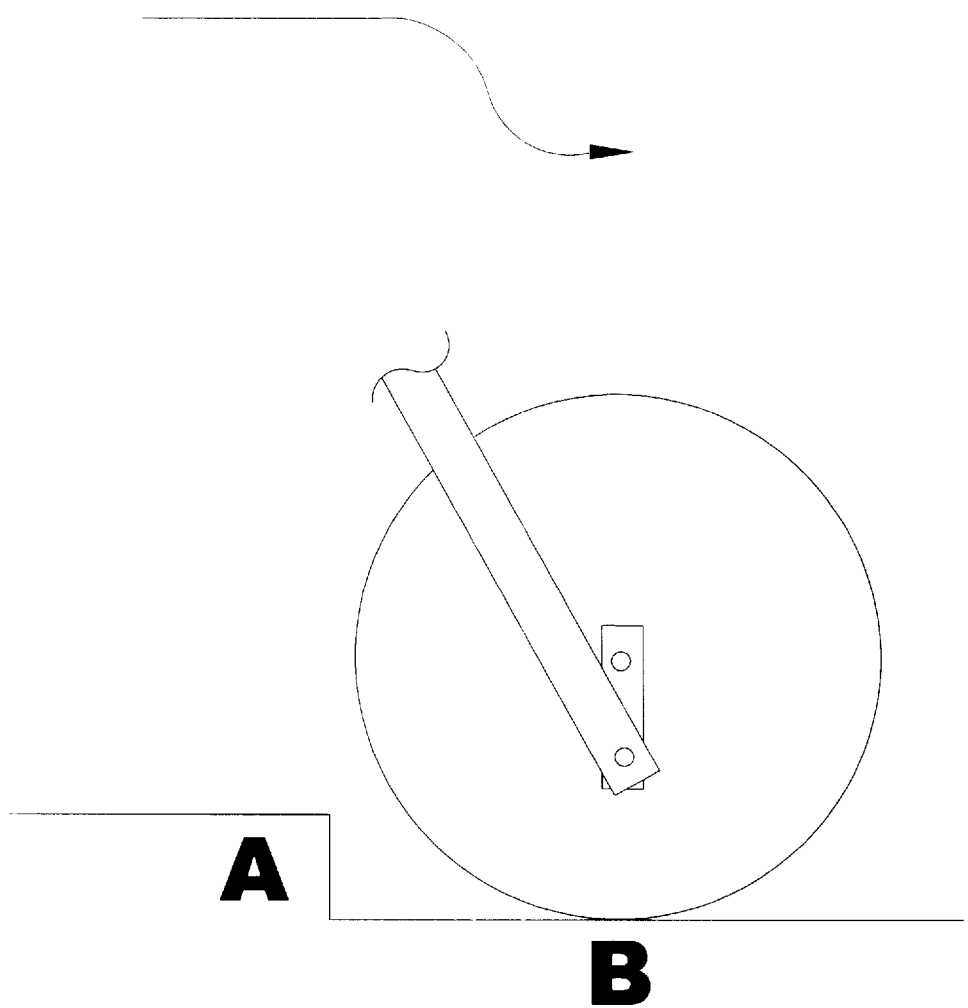
FIG. 14 is a side view of the front wheel of a bicycle with the wheel suspension system of the present invention from FIG. 11 showing the swing arms returning to the normal position after passing the dent.

FIG. 11 shows the wheel 5 with TS 10 connected thereto moving toward the dent 44. An arrow labeled with the numeral 46 indicates the trajectory of the wheel 5. FIG. 12 shows that when the wheel 5 touches the edge A of the dent 44, it (and the frame) will rotate downward around A until it touches the bottom B, as shown in FIG. 13. Then the wheel 5 will stop while the frame 14 keeps on moving around the wheel axle under the restriction of the swing arms 1. An arrow labeled with the numeral 48 above FIG. 12 indicates the trajectory of the wheel 5 as is begins to roll over the dent 44. An arrow labeled with the numeral 50 above FIG. 13 indicates the trajectory of the wheel 5 as is completes rolling over the dent 44. As can be seen when comparing the arrow 48 to the arrow 50, the arrow 50 drops a longer distance indicating the wheel 5 has passed completely over the dent 44. FIG. 14 shows that when the swing arm 1 moves to the normal position, the wheel 5 will start moving again along with the frame 14. Note that the curve labeled with the numeral 52 on top of FIG. 14 shows the trajectory of the frame 14 and wheel 5 through the whole procedure of travelling over the dent 44, which is continuously differentiable and therefore no shock (in lower speed) is felt by a rider.

2.3 Rolling Resistance Compensated Tangential Suspension (CTS) and Rolling Resistance Super Compensated Tangential Suspension (SCTS)

Because the swing arm 1 should be in normal position just before hitting a bump 18 in order to eliminate the shock, it is better to introduce a torque to act on the swing arm from the frame 14 around the joint 3 (i.e., the joint between the swing arm and the frame) should be introduced. Thus, when the wheel with TS 10 is rolling on a smooth level and flat surface 8, the torque is just enough to balance the torque caused by the rolling resistance so that the swing arm 1 will stay in a normal position. TS 10 with torque to achieve the above purpose is defined as Compensated Tangential Suspension (CTS).

Figure 15:
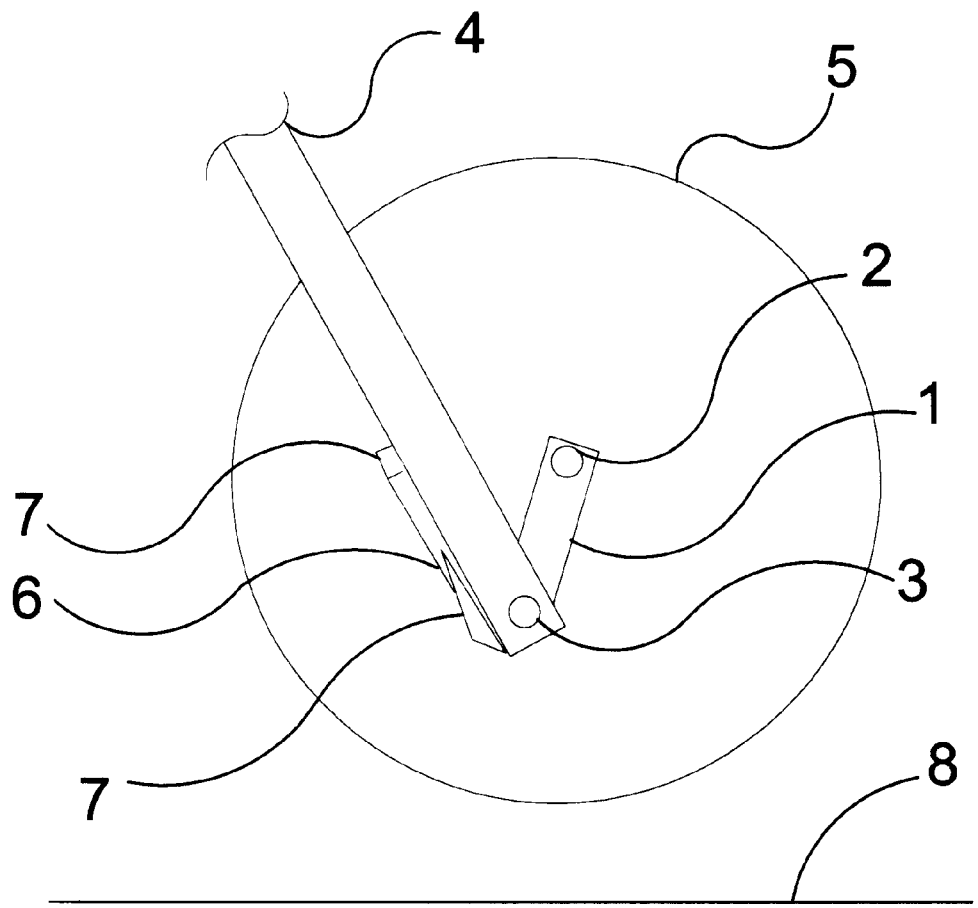
FIG. 15 is a side view of a wheel connected to the wheel suspension system of the present invention in a load free situation.
Figure 16:
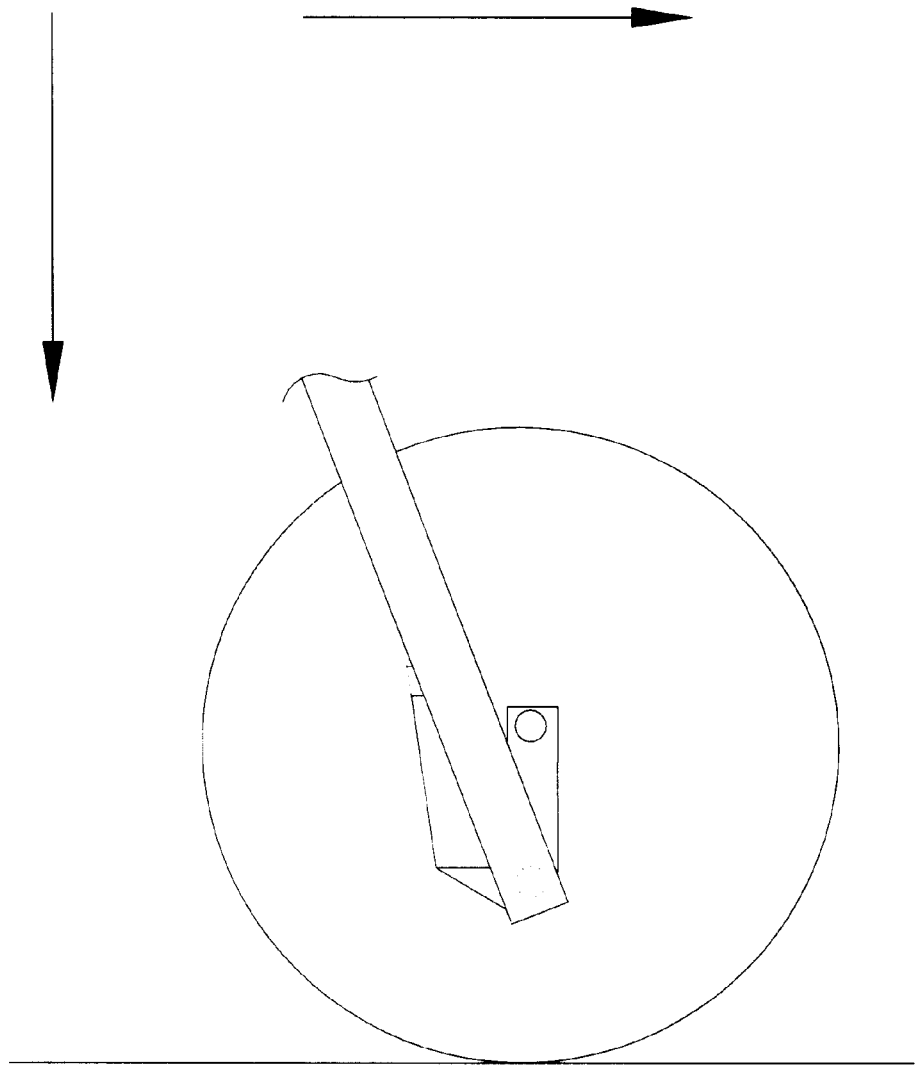
FIG. 16 is a side view of a wheel connected to the wheel suspension system of the present invention under a load and moving at a constant speed.

FIGS. 15 and 16 show a wheel with CTS in different situations. FIG. 15 shows the wheel 5 in a load free situation. In this example, the torque is achieved by a pulling spring 6. Note that the swinging arm 1 leans forward because of the torque.

FIG. 16 shows the same embodiment under a load 54 and moving with constant speed V indicated by the arrow labeled with the numeral 56 on a smooth level and flat surface 8, Note that because of the load 54 and rolling resistance, the swing arm 1 stays in the normal position prepared for an upcoming bump 18 or dent 44. The torque should be adjustable according to the load 54 applied to the wheel 5 in order to achieve CTS because the rolling resistance depends on the weight of the load 54 and the bearing resistance coefficient.

If we increase the torque on CTS slightly we get Super Compensated Tangential Suspension (SCTS).

Figure 17:
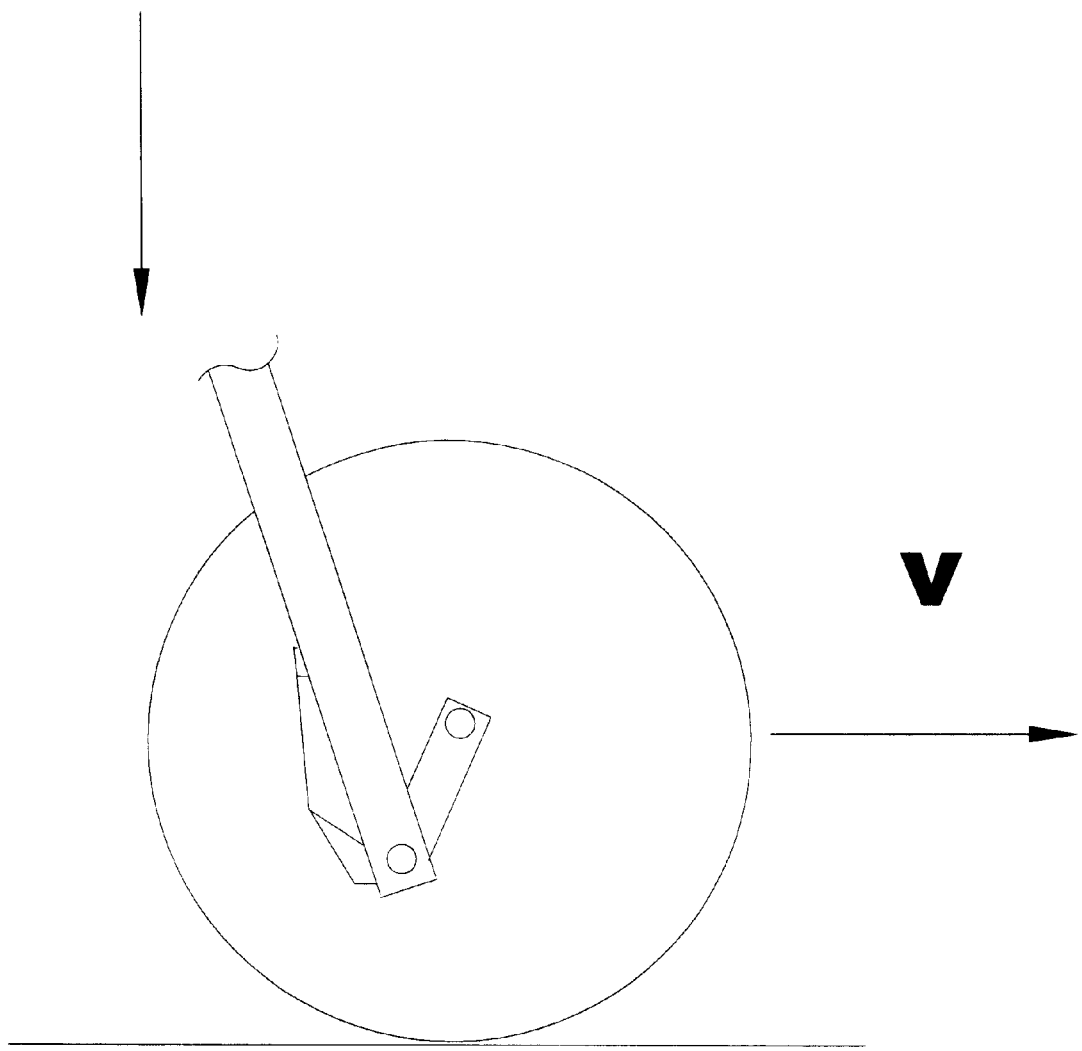
FIG. 17 is a side view of a wheel connected to the wheel suspension system of the present invention under a load, moving at a constant speed and with increased torque in the spring.

FIG. 17 shows the same embodiment as in FIGS. 15 and 16 under the load 54 and moving with constant speed V as indicated by the arrow labeled 56 on a smooth level and flat surface 8. Note that because the spring 6 is stronger than in CTS, even with the load 54 and rolling resistance, the swing arm 1 can't stay in normal position. Instead, it leans forward a little bit. The advantage of SCTS is that because the wheel has a little upward freedom (as shown in FIG. 17), it has the properties of conventional suspension systems when dealing with tiny road noise. When the obstacle on the road is larger than the wheel's upward freedom, the properties of TS start to take effect.

3 Applications to Individual Wheels

Figure 18:
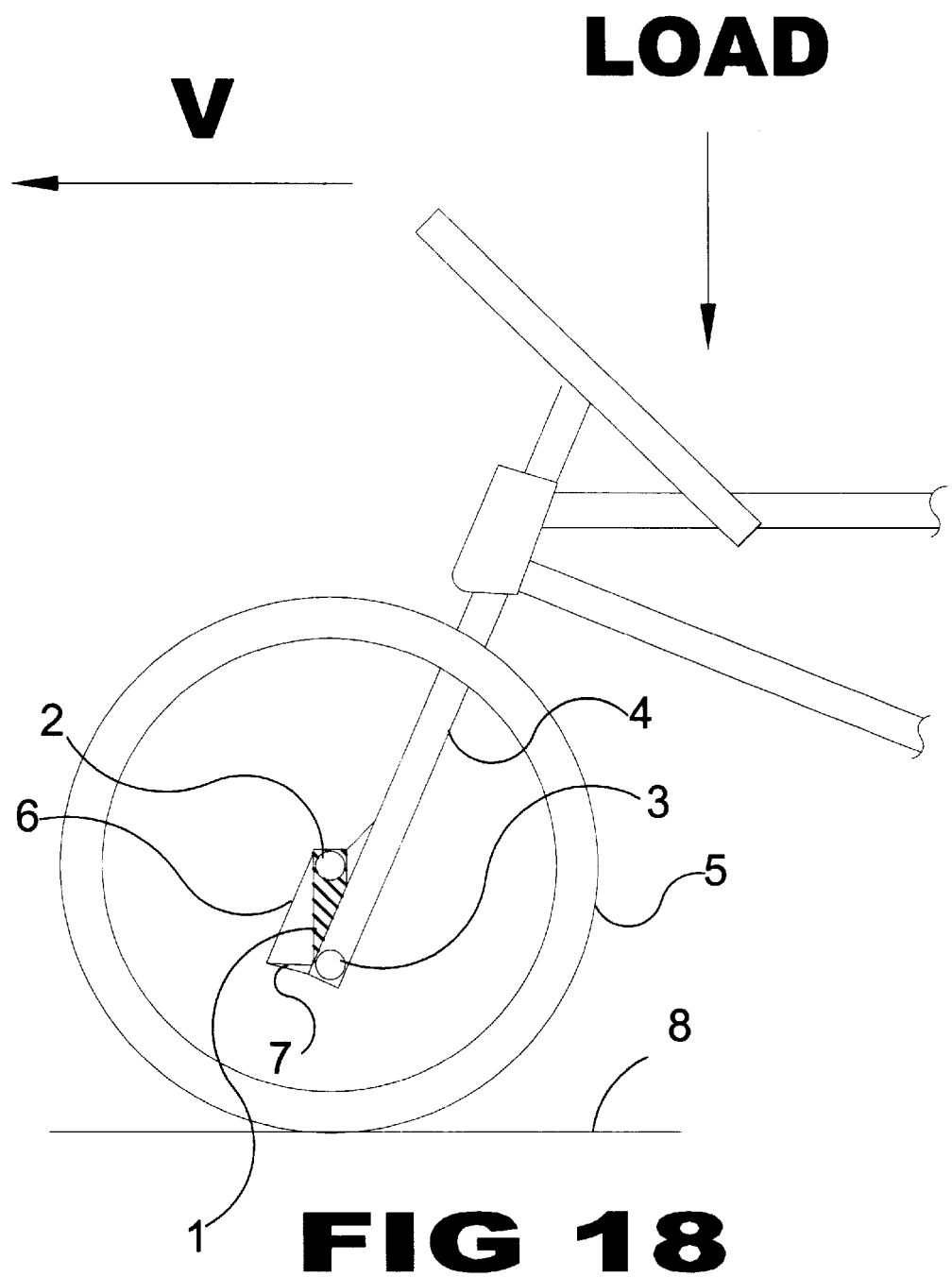
FIG. 18 is a side view of a wheel connected to the wheel suspension system of the present invention with a forward spring hooker.

FIG. 18 is an example of applying CTS 10 to the front wheel 5 of a bicycle 12. Note that the front fork 4 contains a forward spring hooker 7. The pulling spring 6 connecting the wheel axle 2 and the hooker 7 provides the torque to achieve CTS. You can see that under the load indicated by the arrow labeled 54 and moving with constant speed V indicated by the arrow labeled with the numeral 56 on a flat surface 8, the swing arm 1 is in the normal position.

Figure 19:
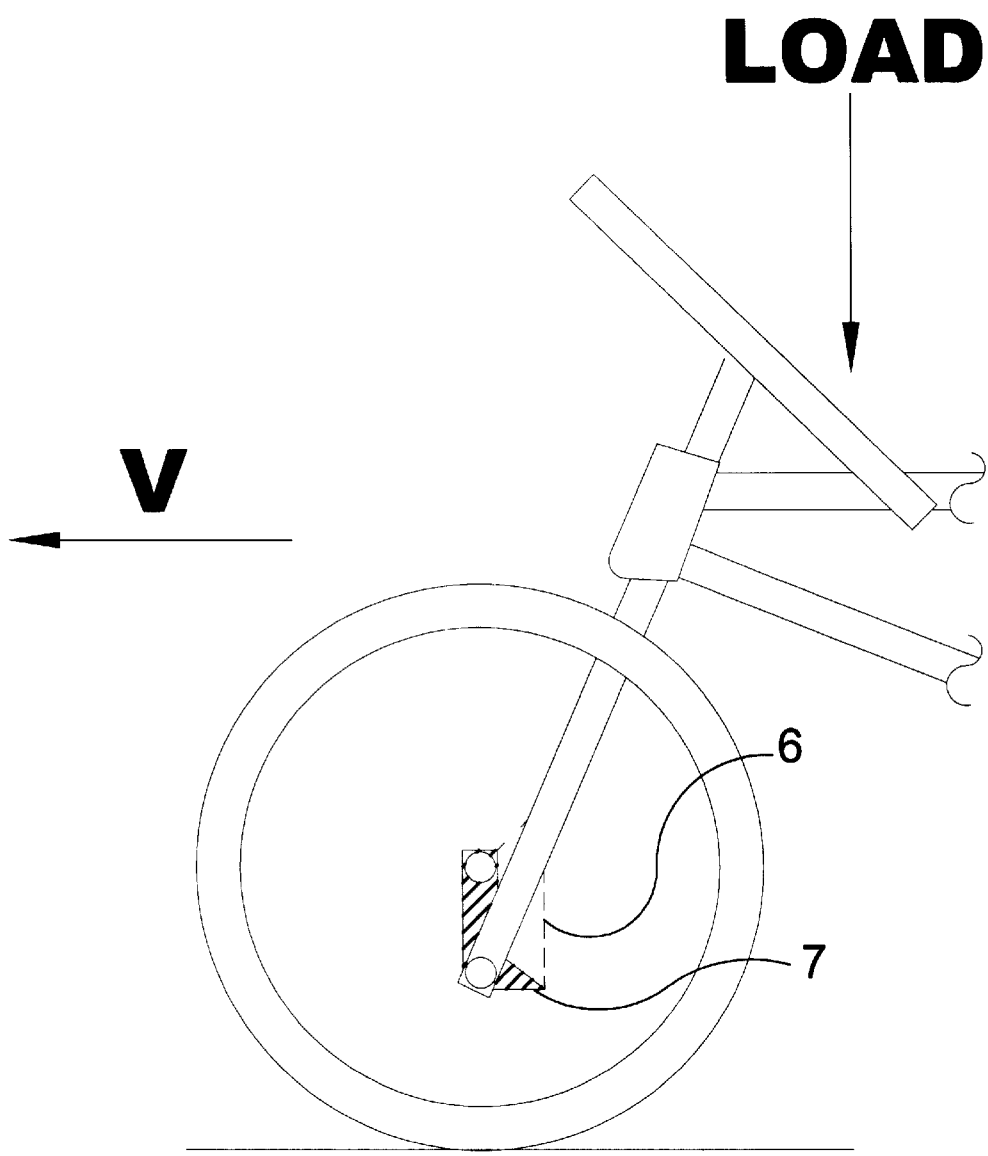
FIG. 19 is a side view of a wheel connected to the wheel suspension system of the present invention with a backward spring hooker.

FIG. 19 is another example of applying CTS to the front wheel 5 of a bicycle 12. Note the swing arm 1 contains a backward spring hooker 7. The pulling spring 6 connecting the hooker 7 and the fork 4 provides the CTS torque. The difference between the two examples is that the rate of change of the torque with respect to the rotation of the swing arm 1 is different when the swing arm 1 is in normal position. In other words, the sensitivity to the road noise is different for the two examples.

Figure 20:
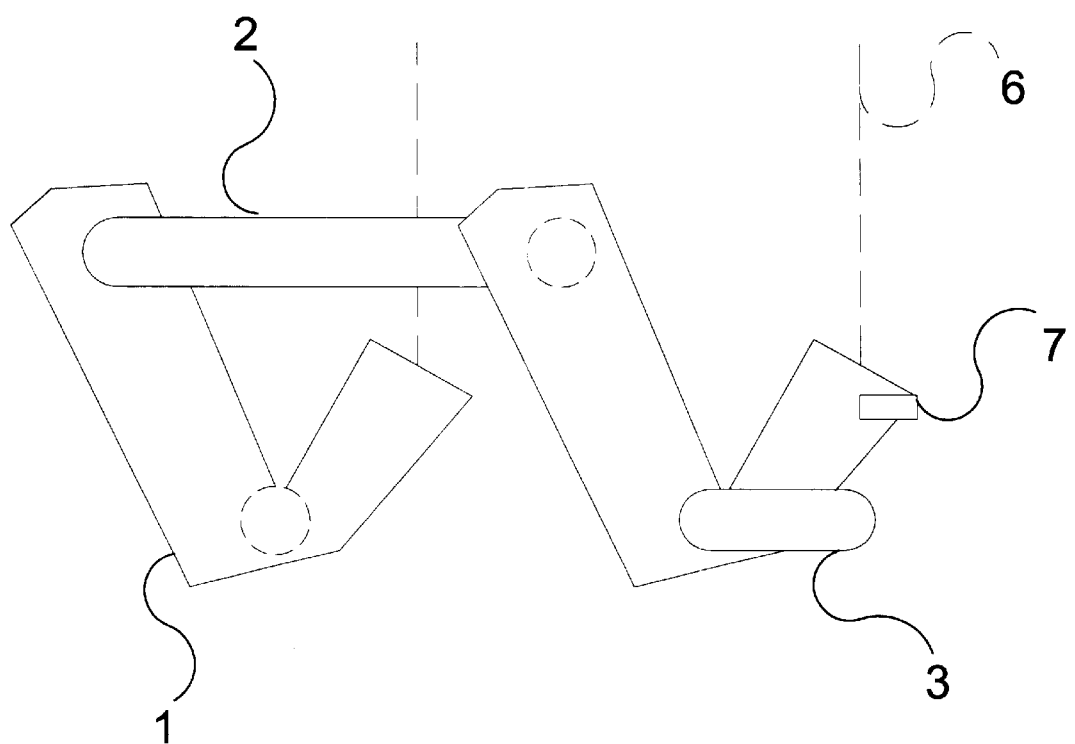
FIG. 20 is a perspective view of the wheel suspension system of the present invention with increased torque in the spring.
Figure 21:
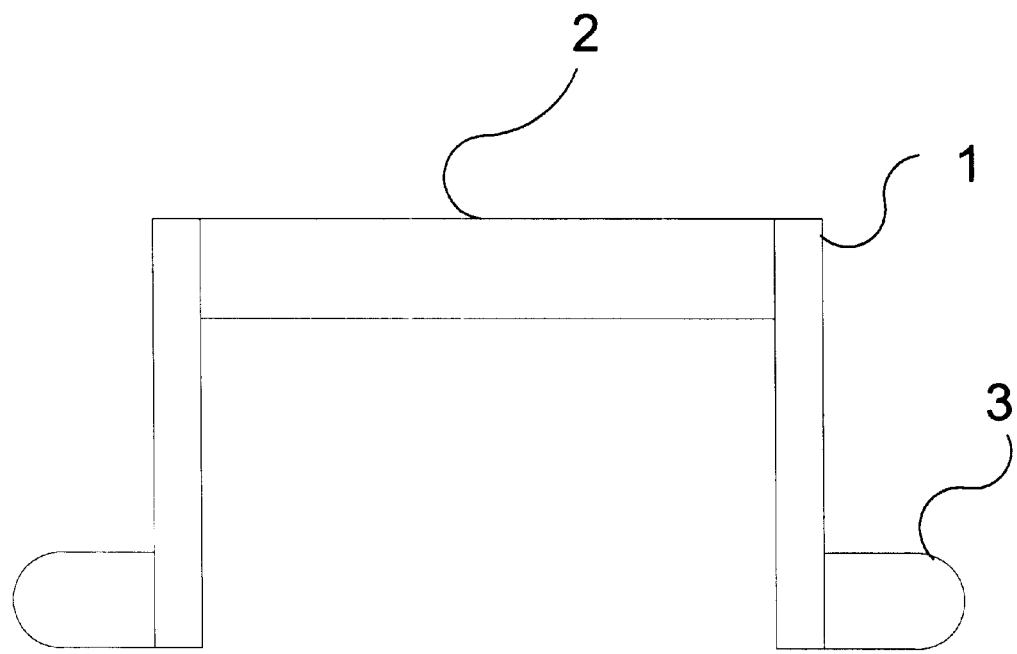
FIG. 21 is a front view of the wheel suspension system of the present invention shown in FIG. 20.
Figure 22:
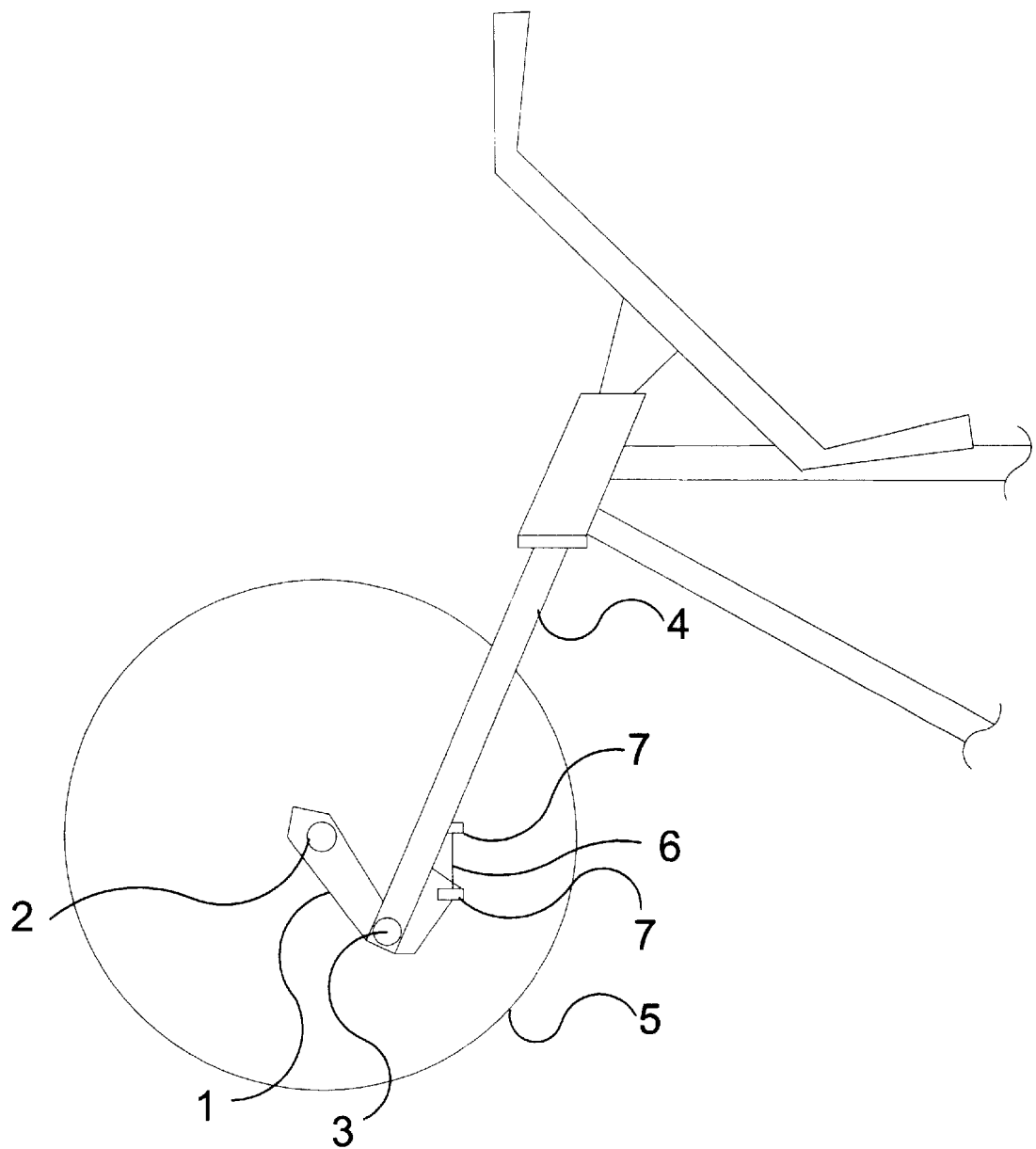
FIG. 22 is a side view of the wheel suspension system of the present invention shown in FIG. 20 connected to a wheel of a bicycle.

FIGS. 20–22 provide an example of applying SCTS to the front wheel 5 of a bicycle 10.

Figure 23:
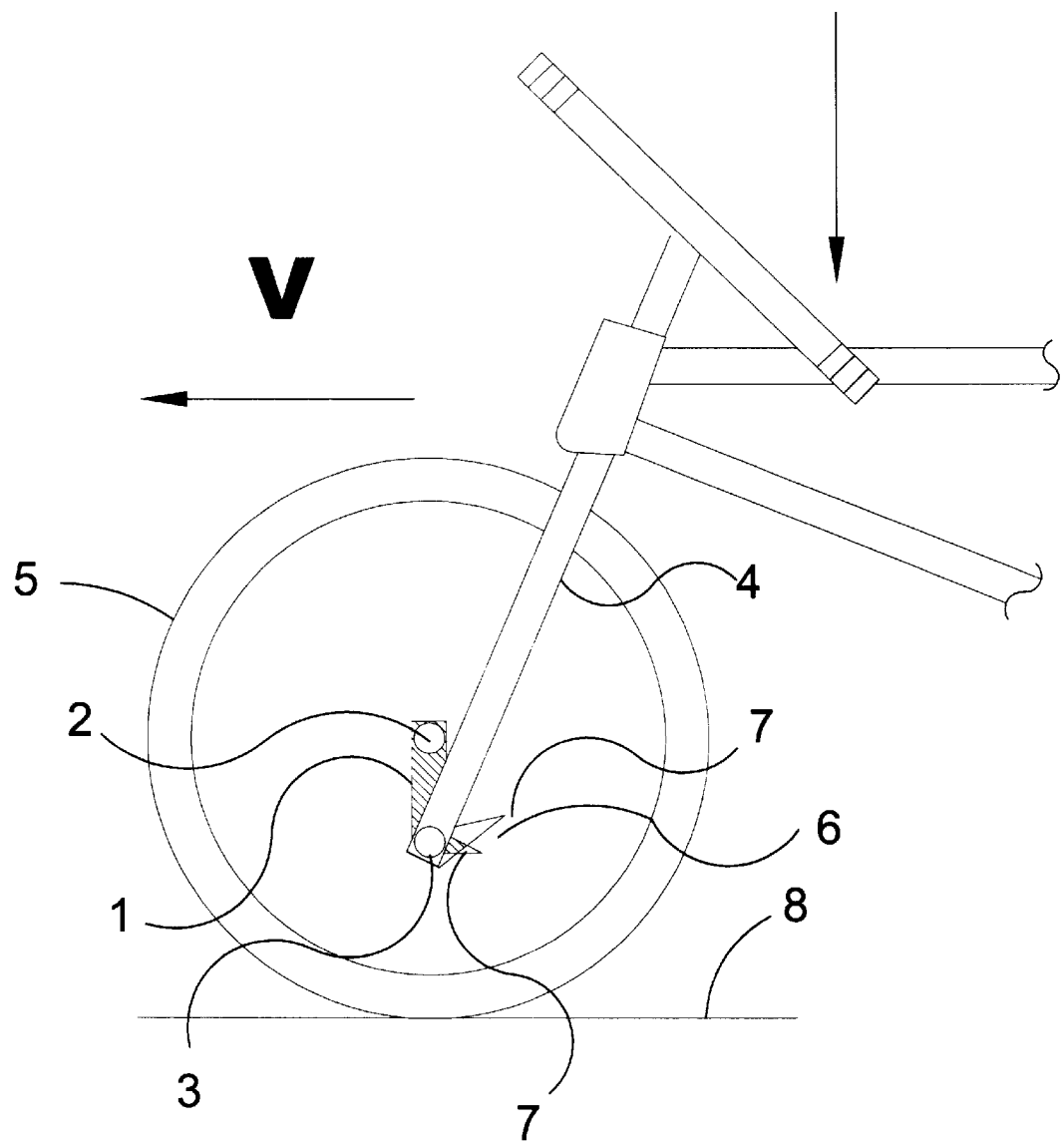
FIG. 23 is a side view of the wheel suspension system of the present invention connected to a front wheel of a bicycle allowing increased forward and backward movement for the wheel.

FIG. 23 is another example of applying CTS to the front wheel 5 of a bicycle 12. Note that the torque is given by another positioning of spring means 6. This positioning allows the wheel 5 to have more freedom swinging forward and backward.

Figure 24:
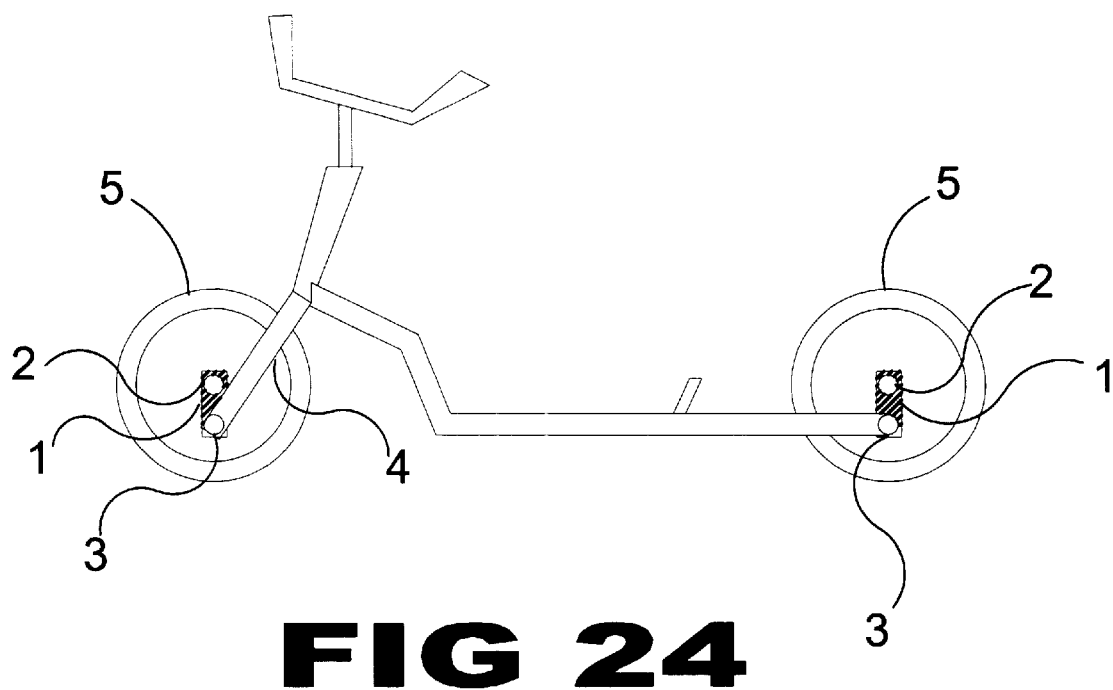
FIG. 24 is a side view of a scooter equipped with the wheel suspension system of the present invention.

FIG. 24 is the side view of a scooter 58 equipped with TS 10.

Figure 26:
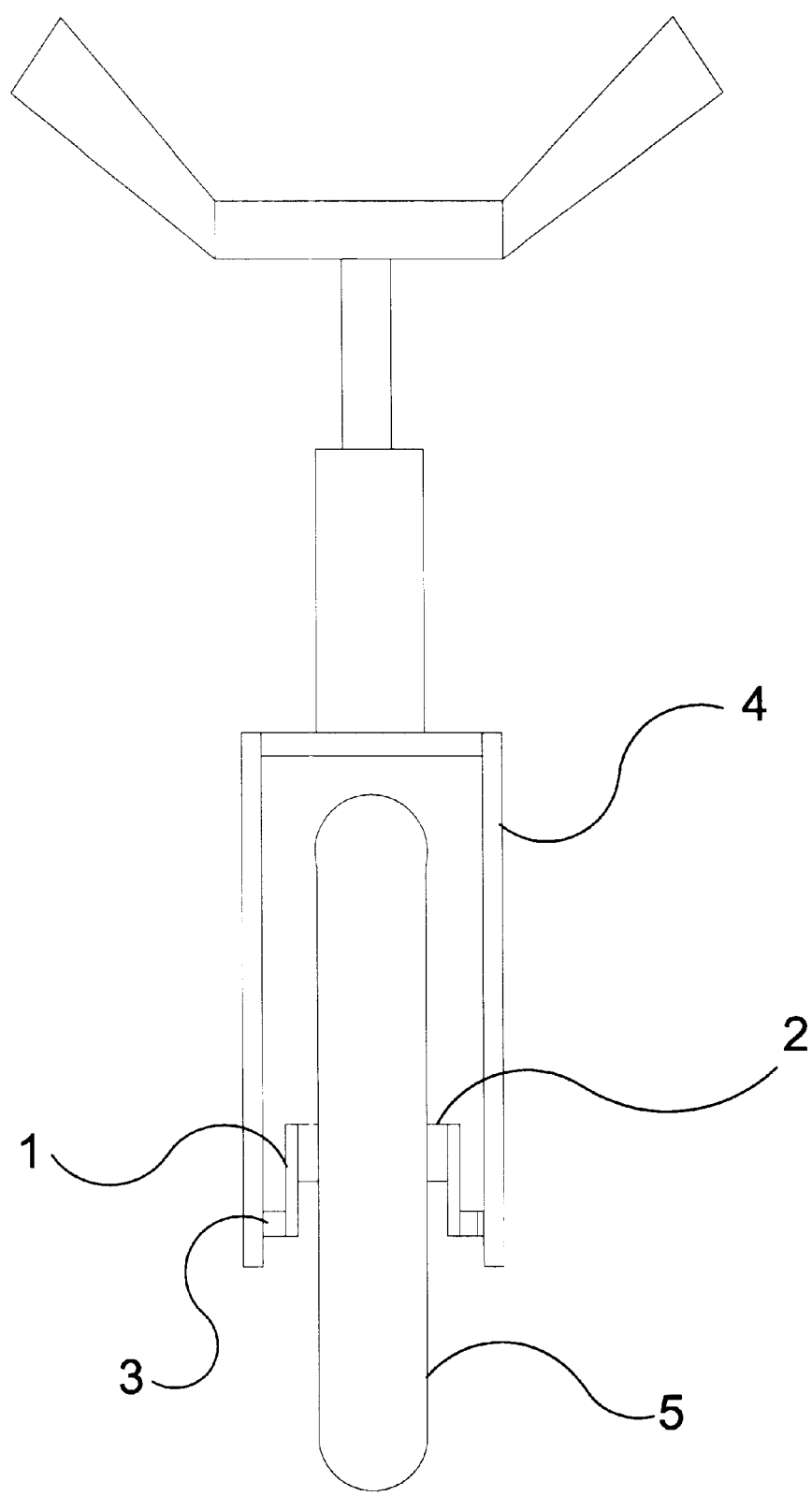
FIG. 26 is a back view of the scooter of FIG. 24 equipped with the wheel suspension system of the present invention.

FIG. 26 is the front view of the same embodiment of the scooter 58 equipped with TS 10.

Figure 25:
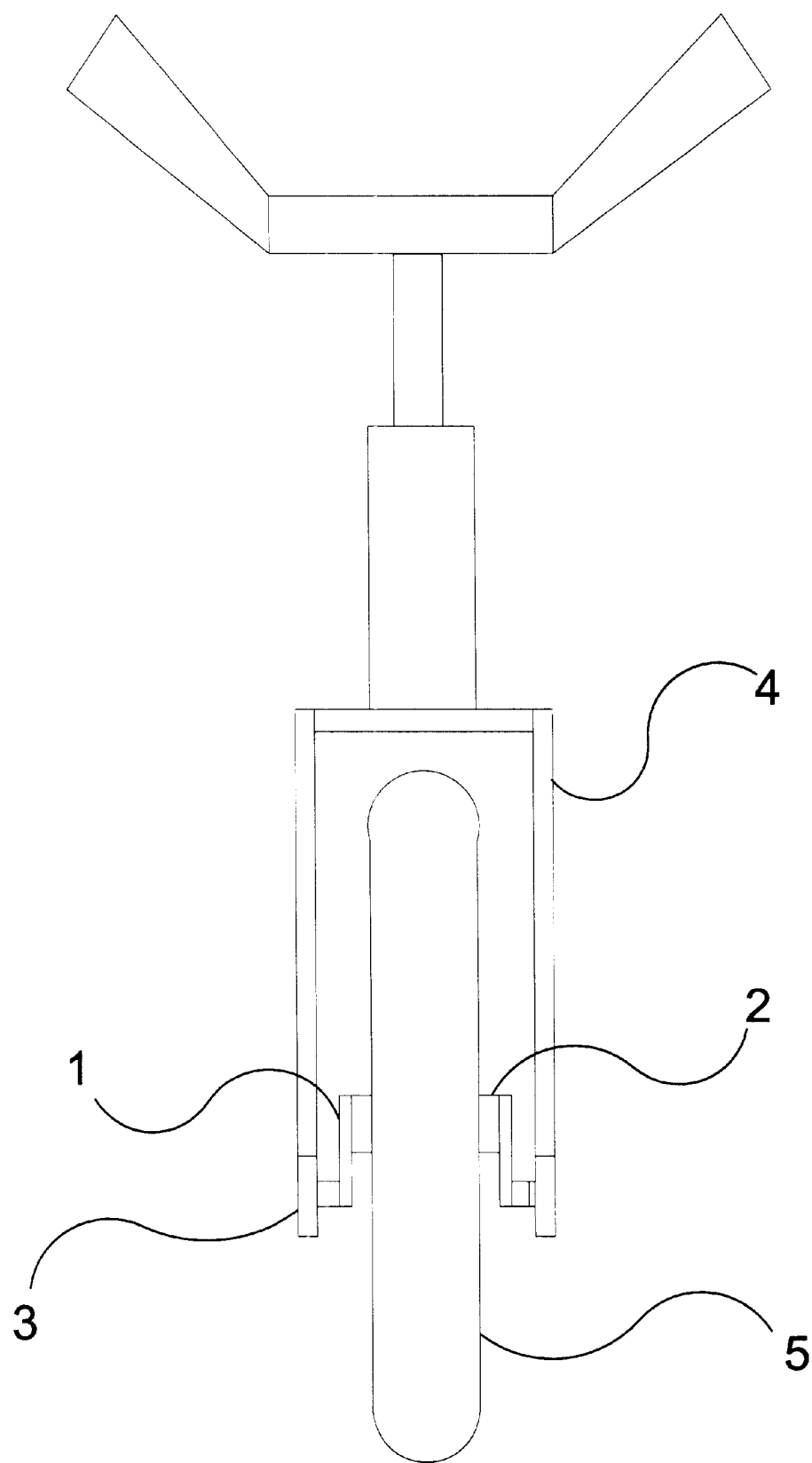
FIG. 25 is a front view of the scooter of FIG. 24 equipped with the wheel suspension system of the present invention.

FIG. 25 is the rear view of the same embodiment of the scooter 58 equipped with TS 10.

Figure 27:
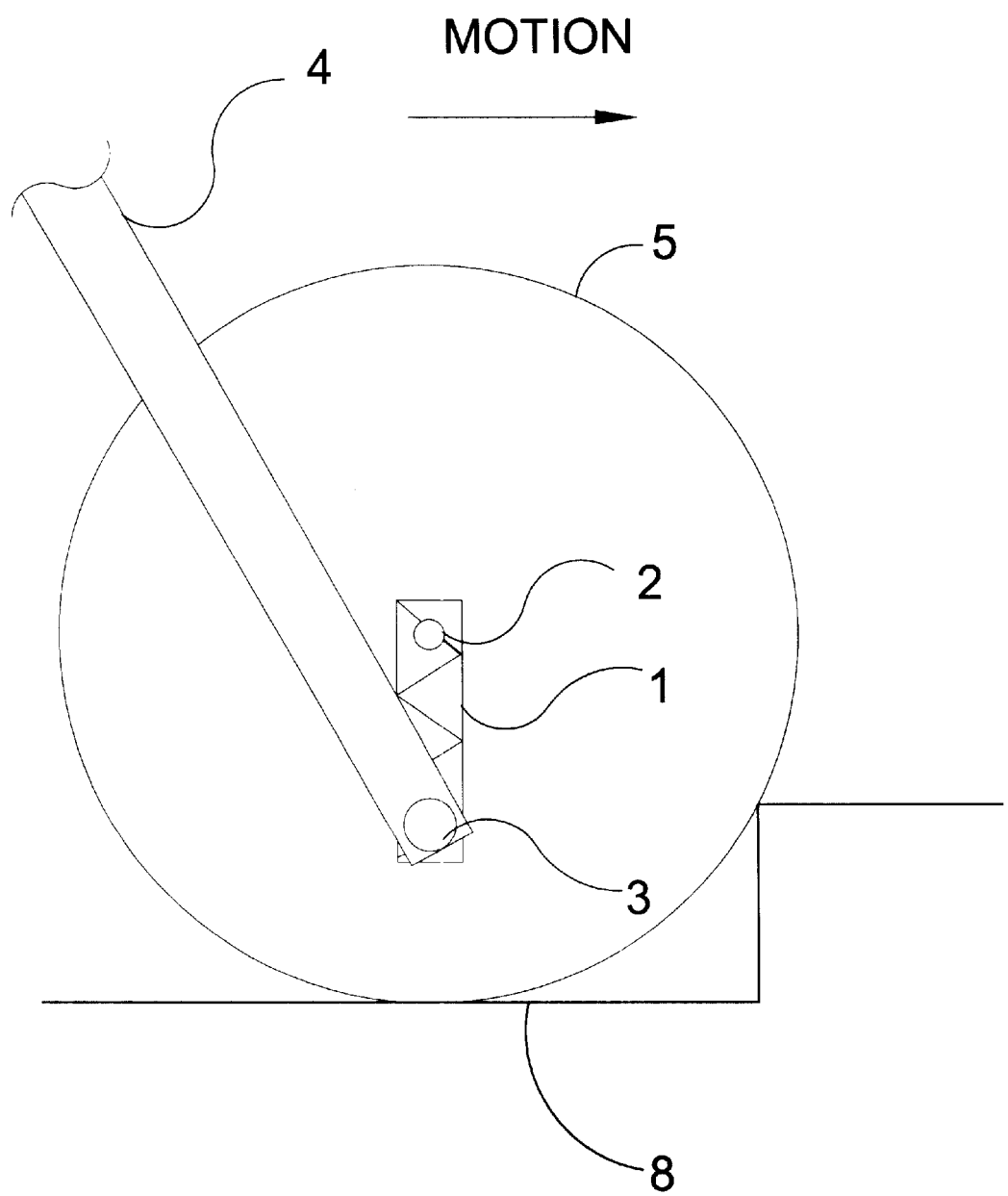
FIG. 27 is a side view of a bicycle wheel connected to the wheel suspension system of the present invention wherein the swing arms are telescopic shock absorbers.

FIG. 27 is another variation of TS 10 applied to the front wheel 5 of a bicycle 10. This figure shows a side view of the wheel the other side being symmetrical thereto. Note that the wheel axle 2 is connected to the front fork 4 via swing arms 1. The swing arms 1 are telescopic shock absorbers or other variable length means which enable the swing arm 1 to extend and contract (of course the swing arm 1 is rigid to prevent bending in order to make sure the wheel 5 is laterally rigid). FIG. 27 is the situation when the wheel 5 just hits a bump 18.

Figure 28:
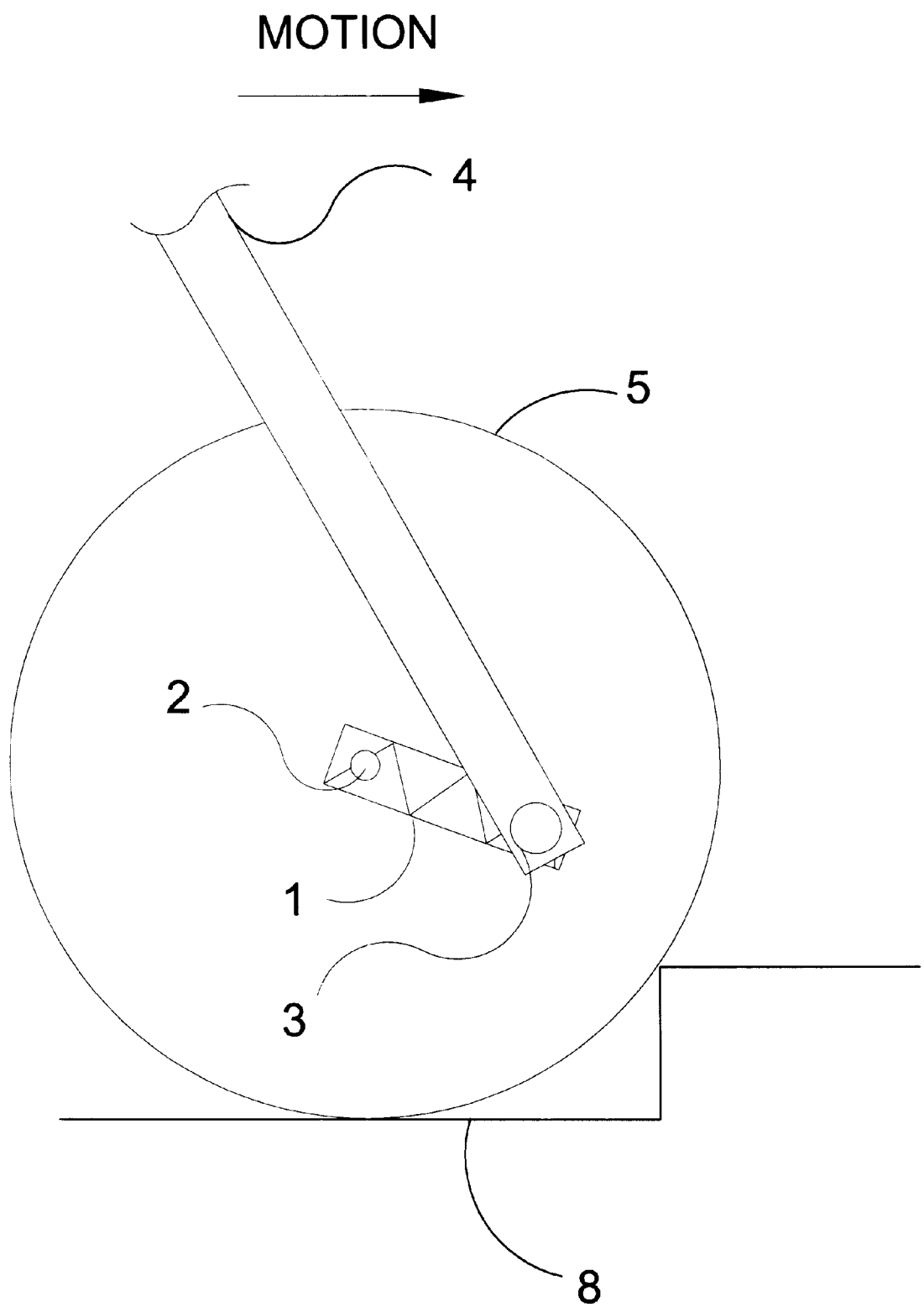
FIG. 28 is a side view of a bicycle wheel connected to the wheel suspension system of the present invention stopping upon contacting a bump with the fork continuing to swing.

FIG. 28 shows that the wheel stops while the fork 4 swings or continues forward until it reaches the critical moment. Note that the swing arm 1 is pulled to extend a greater distance at this point in the movement of the wheel over the bump 18 than at the point of movement shown in FIG. 27 but still extends a distance less than the wheel radius. Using a variable swing arm 1 in TS 10 not only eliminates the shock when encountering a bump 18 in the roadway 8 and but also reduces the direction change of the momentum therefore the rider will feel smoother than on pure TS 10.

Figure 29:
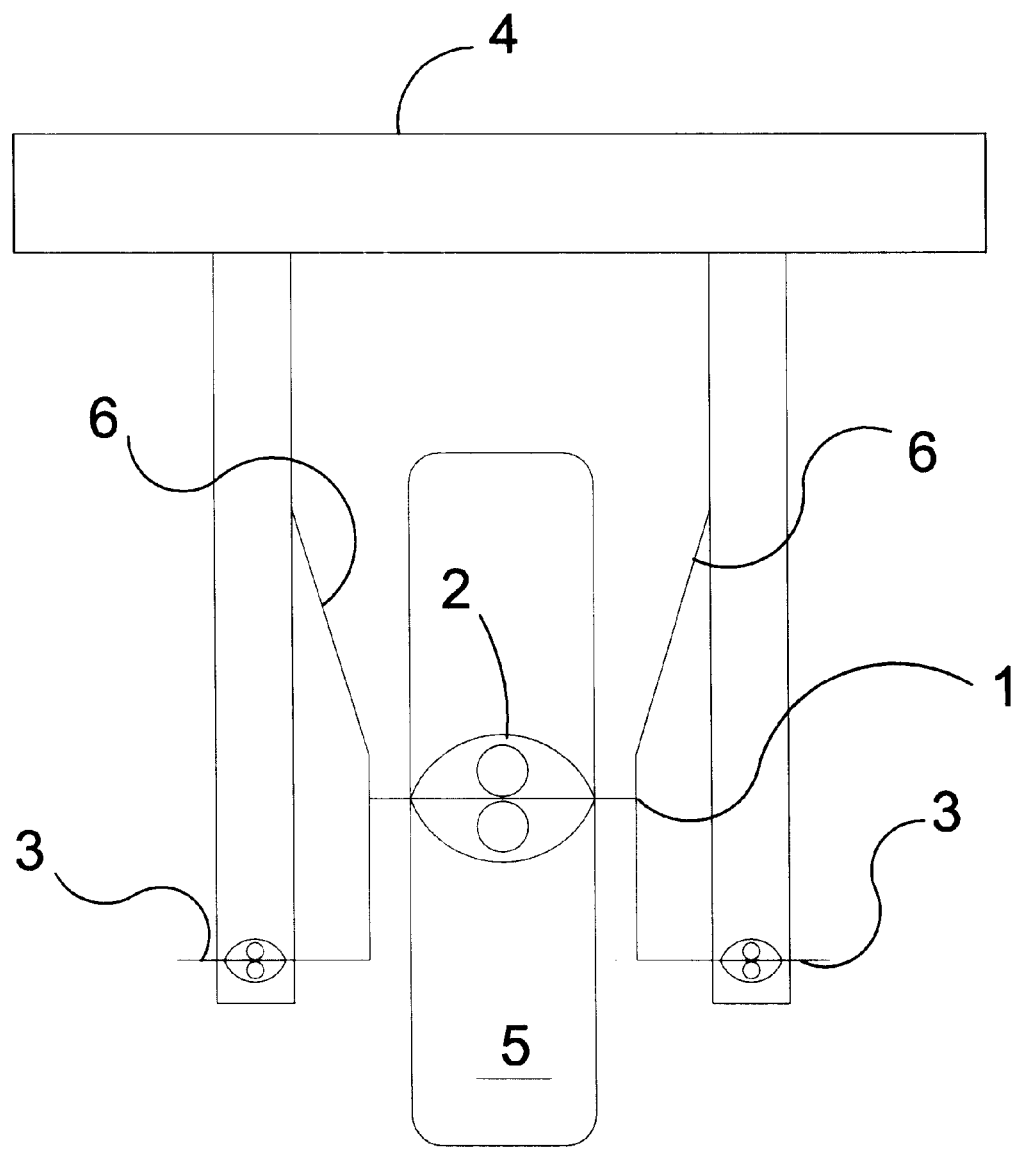
FIG. 29 illustrates a front view of the wheel suspension system of the present invention connected to small wheels.
Figure 30:
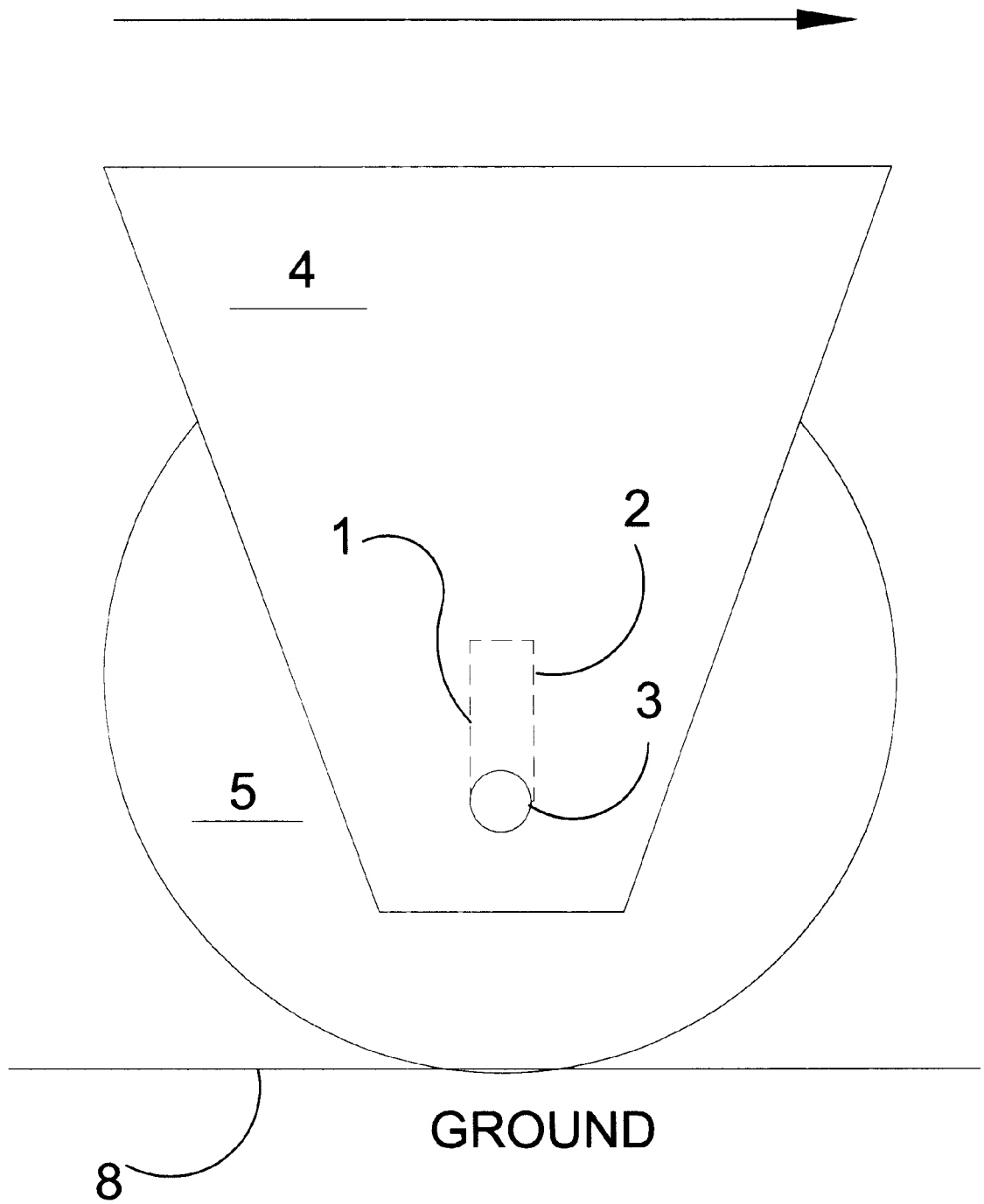
FIG. 30 is a side view of the wheel connected to the wheel suspension system of the present invention shown in FIG. 29.
Figure 31:
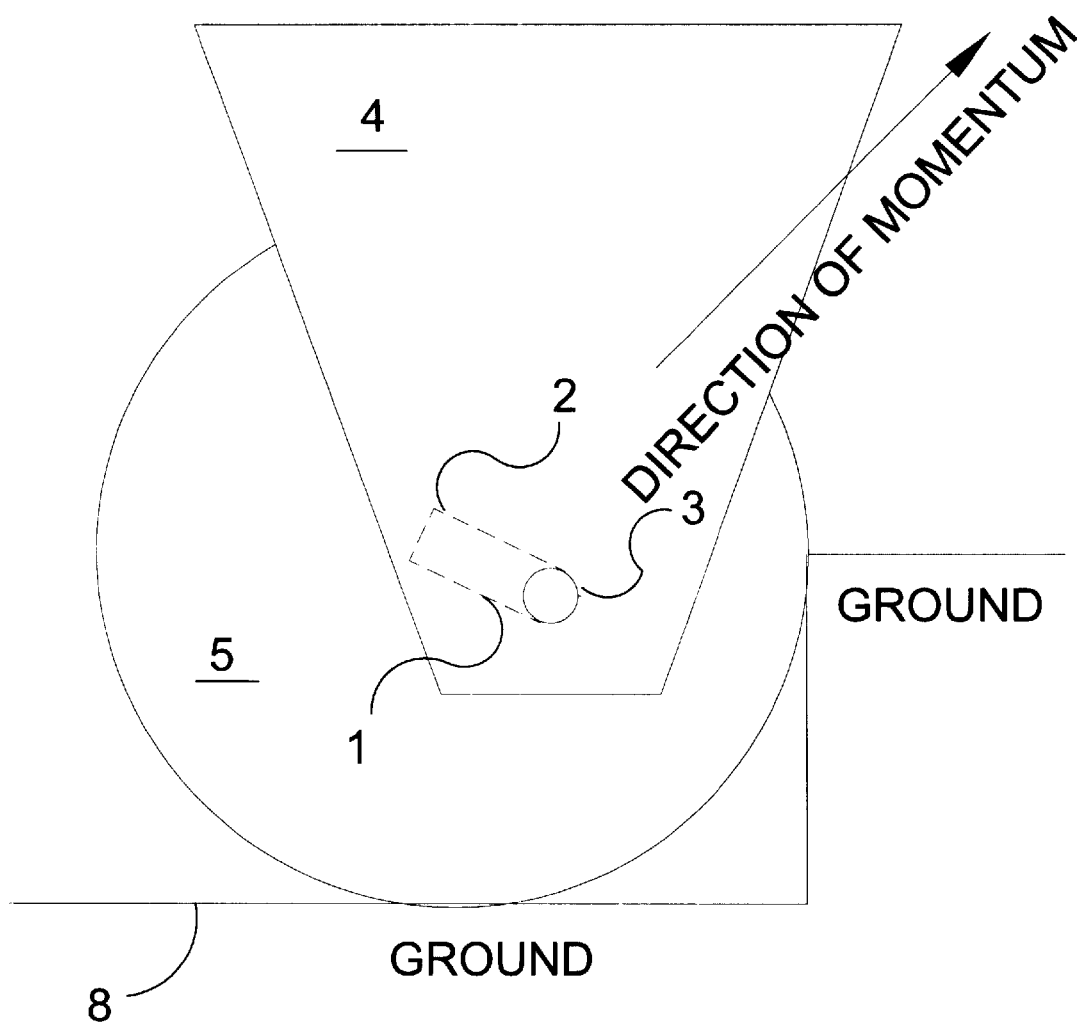
FIG. 31 is a side view of the wheel connected to the wheel suspension system of the present invention of FIG. 29 showing rotation around the joint upon contact with a bump.

TS 10 is also ideal for small wheels to over come large obstacles smoothly. FIG. 29 is a front view along the moving direction of the wheel 5. The wheel rotates around a moving axle 2 which can rotate around the joints 3 with the frame 4. Note that joint 3 is in a lower position than joint 2. The moving axle 2 also connects the frame 4 with pulling springs 6 in order to stay in the normal position as shown in FIG. 29 for on or off level ground situations. FIG. 30 is a side view of the same embodiment shown in FIG. 29. Assume the ground 8 is flat, the joint 2 is almost vertically above joint 3 in the normal position. FIG. 31 is a similar view to that of FIG. 30, showing the wheel 5 encountering an obstacle. In this case the momentum of the frame 4 causes the joint 3 to rotate around joint 2 which smoohtly changes the directing of the momentum of the frame 4 upward as shown in the picture. When the swing arm 1 swings to the critical angle it will pull the wheel 5 to roll over obstacles 18.

Figure 32:
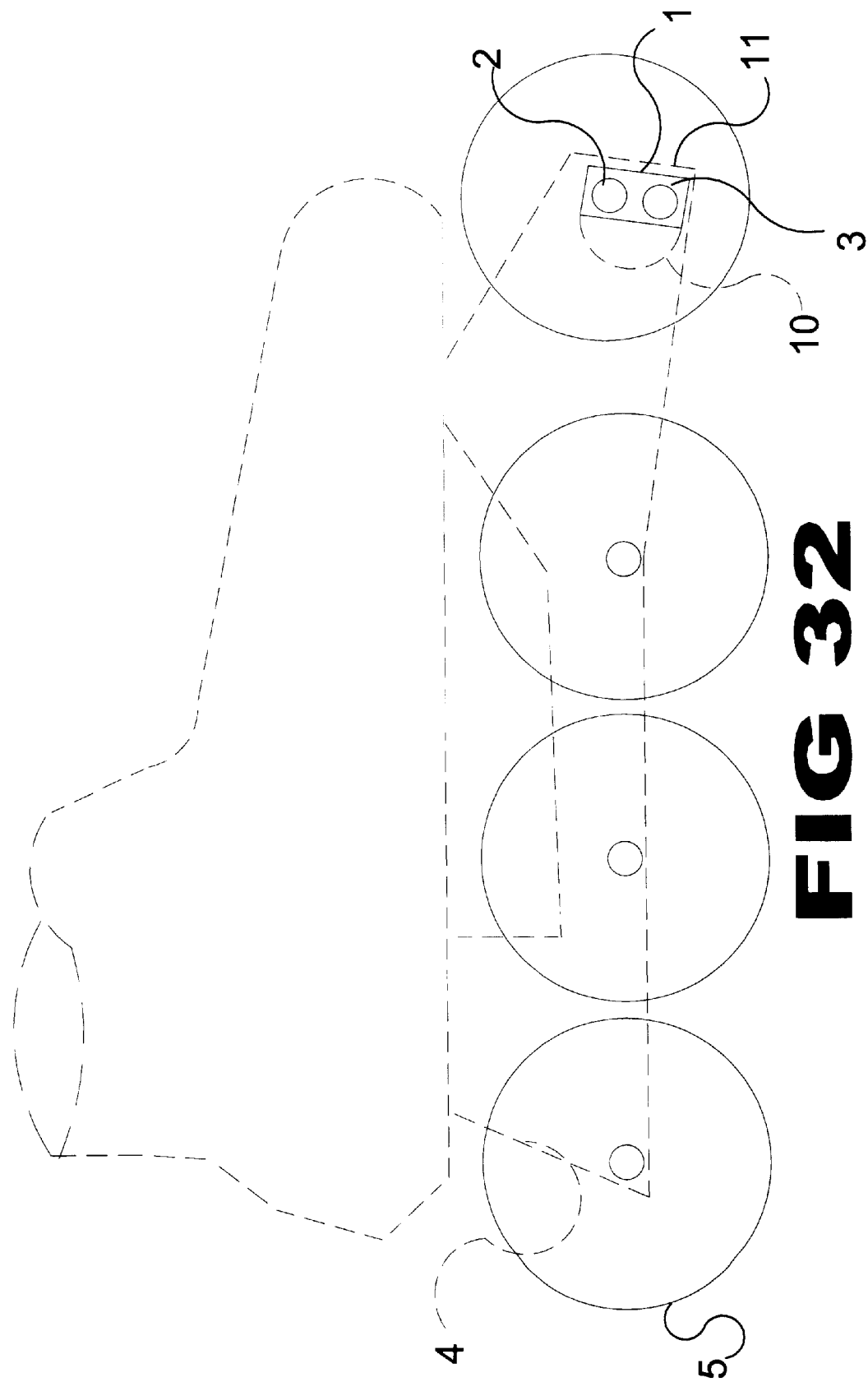
FIG. 32 is a side view of an inline skate having the wheel suspension system of the present invention connected to a front wheel thereof.
Figure 33:
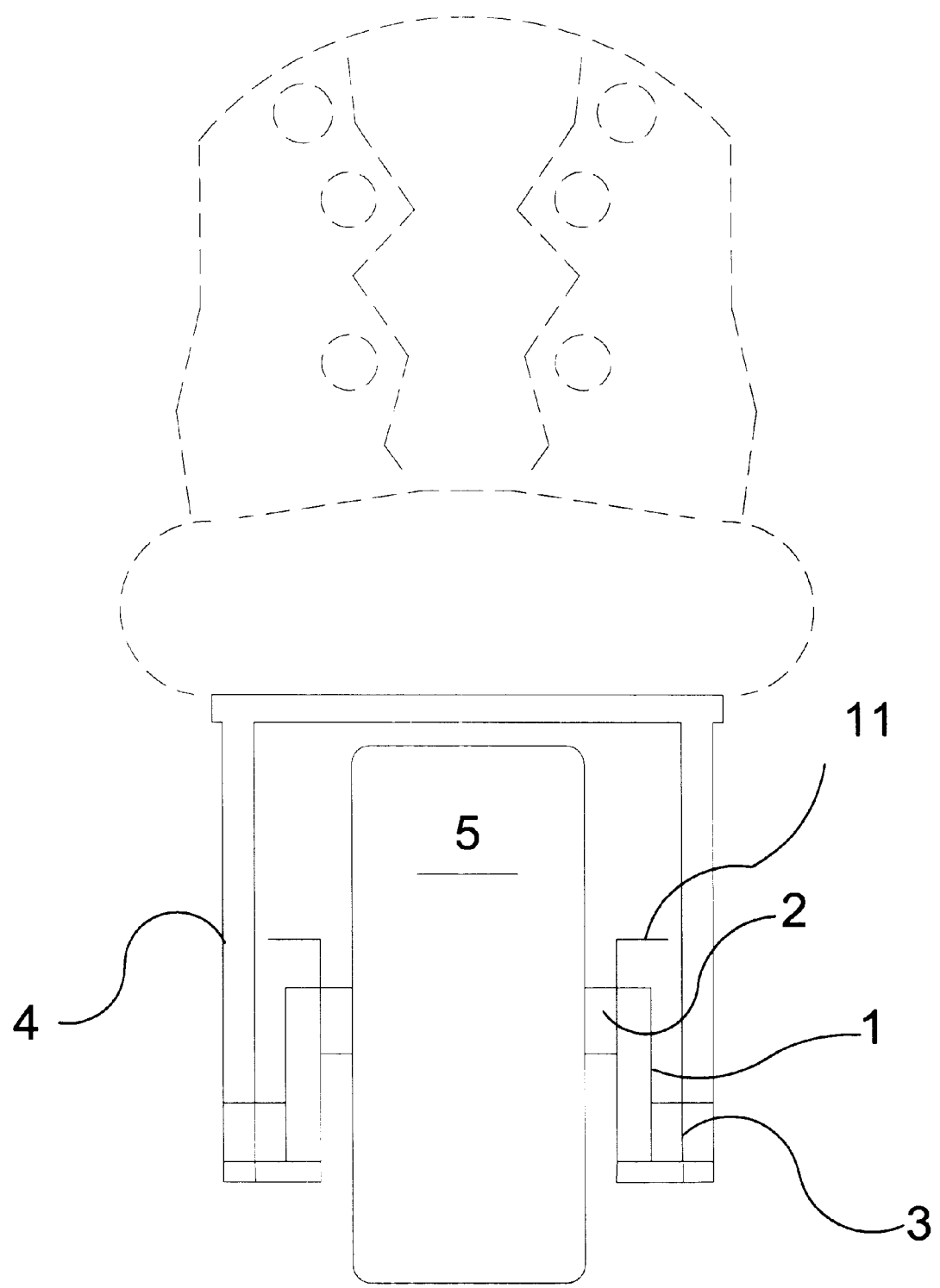
FIG. 33 is a front view of an inline skate as seen from FIG. 32 having the wheel suspension system of the present invention connected to a front wheel thereof.

FIGS. 32–33 are, respectively, a side view and front view of an inline skate 60 with CTS 10 applied only to the front wheel 62 to reduce shock to improve ability of overcoming obstacles while having the most economic structure. Note that the swing arms 1 are fixed to the axle 2 of the front wheel 62 at one end, and are pivotally connected to the frame 64 via joints 3 at the other end. The pushing spring 66 add a certain amount of torque to the swing arm 1 to offset the rolling resistance on smooth surface 8 in order to satisfy the requirement of CTS 10. Also notice that one can open a "window" 68 on each side of the frame 4 to allow the swing arms 1 to swing on the same surfaces the frames are on. Because this consideration is trivial, I am not going to draw a another picture for it and just want to point out that CTS 10 can be used without sacrificing old goodness. Conventional springs can also be applied to the rear part of the skate set to take advantage of the larger space above the wheel set there.

Figure 34:
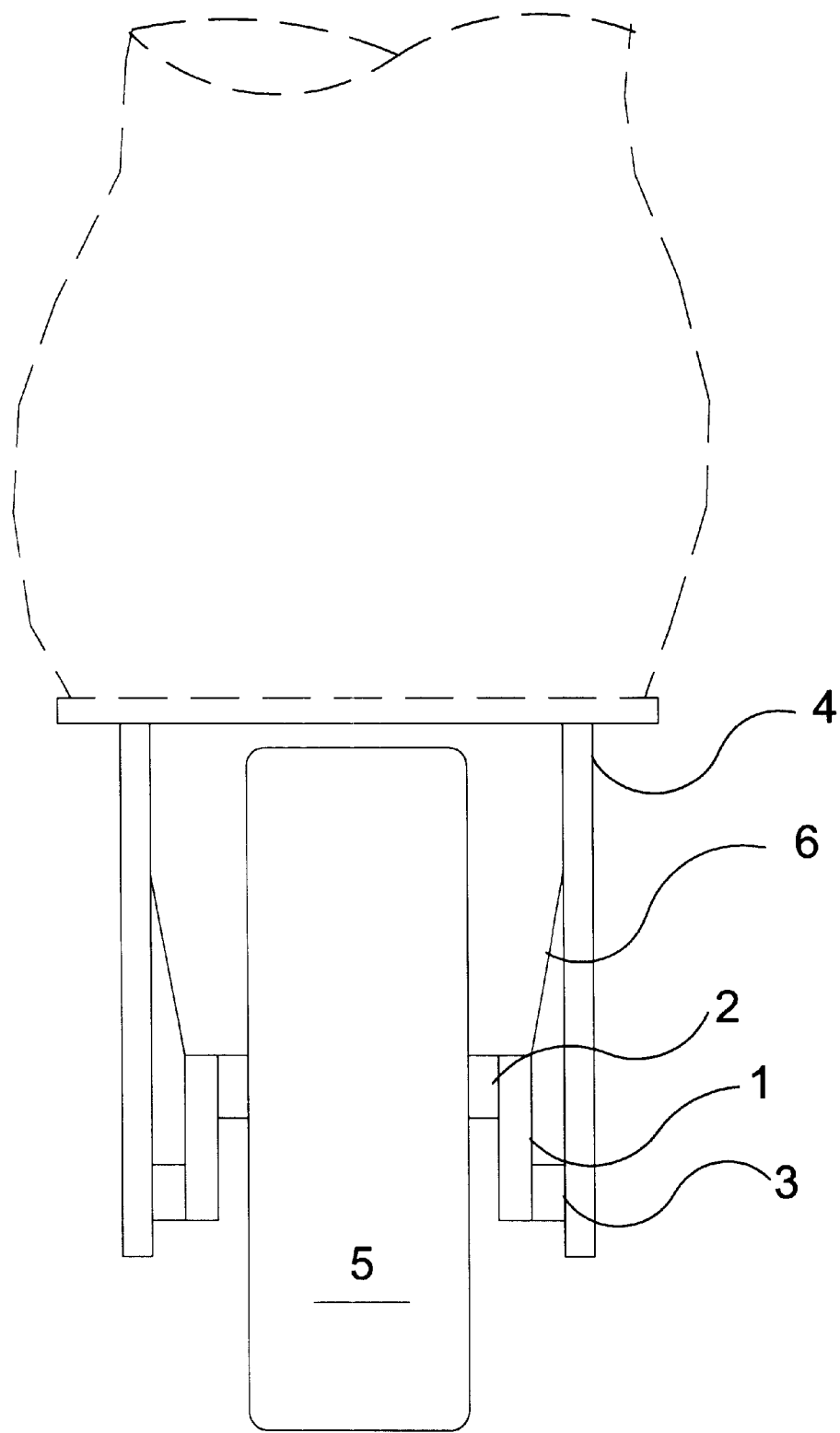
FIG. 34 is a front view of an inline skate having the wheel suspension system of the present invention connected to each wheel thereof.
Figure 35:
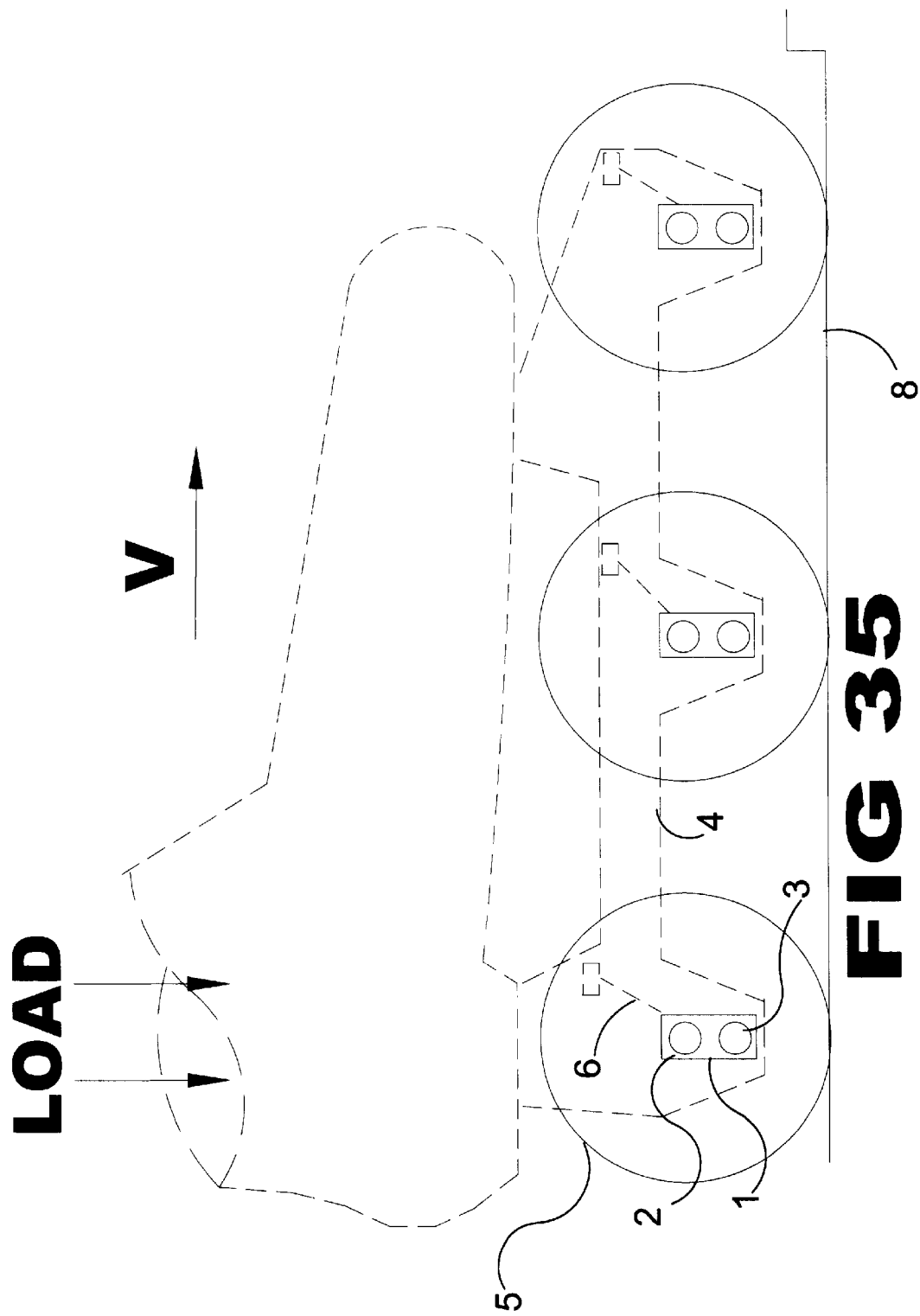
FIG. 35 is a side view of an inline skate as seen from FIG. 34 having the wheel suspension system of the present invention connected to each wheel thereof.

FIGS. 34 and 35 show different views of an inline skate set 60 equipped with independent CTS 10 for each wheel 70. Because CTS 10 can keep the gravity center of the frame 64 as low a s if no suspension system were used, therefore is ideal for the skate 60.

FIG. 35 shows the side view of the skate set 60. Note that the skate set 60 is supposed to be under load and moving at a constant speed on a flat surface 8. The spring means 6 should be adjusted so that in the above situation the swing arm 1 will be close to the normal position (i.e., perpendicular to the ground) in order to satisfy the requirement of CTS 10. There are all sorts of way to add certain torque to the swing arm 1 to compensate the rolling resistance on a flat surface 8. The spring 6 shown in the picture is just one example. FIG. 34 is the rear view of the same embodiment. Note that the swing arm 1 is fixed to the wheel axle 2 (around which the wheel 70 can rotate), but is pivotally connected to the frame 64 on its other end at a lower position.

By adjusting the strength of the spring 6 one may easily achieve independent SCTS 10 or a mixture of independent CTS and SCTS.

Figure 39:
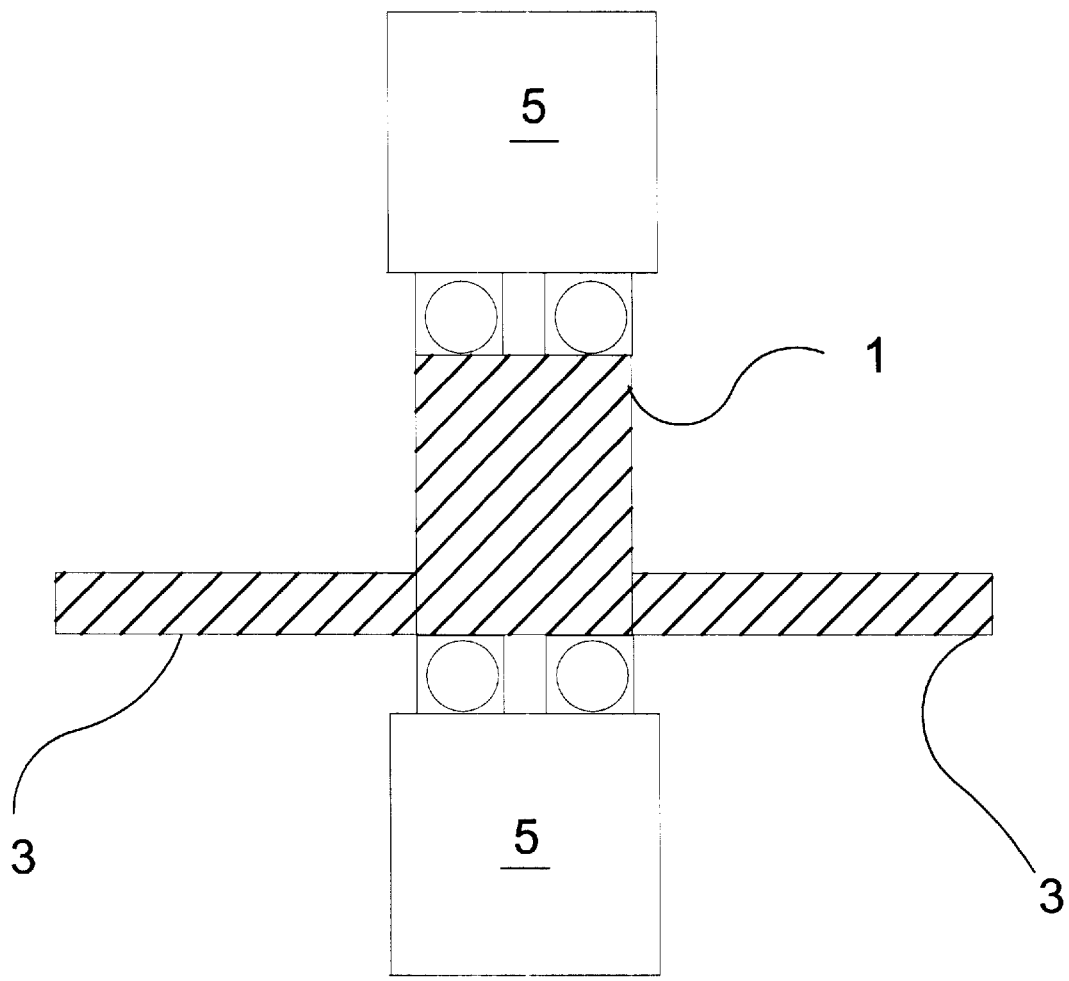
FIG. 39 is front cross-sectional view of an inline skate having an alternate embodiment of the wheel suspension system of the present invention connected thereto.

FIG. 39 is the cross-section of a wheel 5 equipped with TS in a most compact way. Let's call it a TS Wheel. The only difference from conventional wheels is that the axle 2 extends through the core ecentrically (while the outer part of the wheel 5 is supposed to be able to rotate around the core), and the axle 2 itself is supposed to be pivotally connected to the frame 72. (or it itself pivotally go through the core of the wheel 5). The TS wheel can be applied to all sorts of moving equipment to eliminate shocks.

Figure 40:
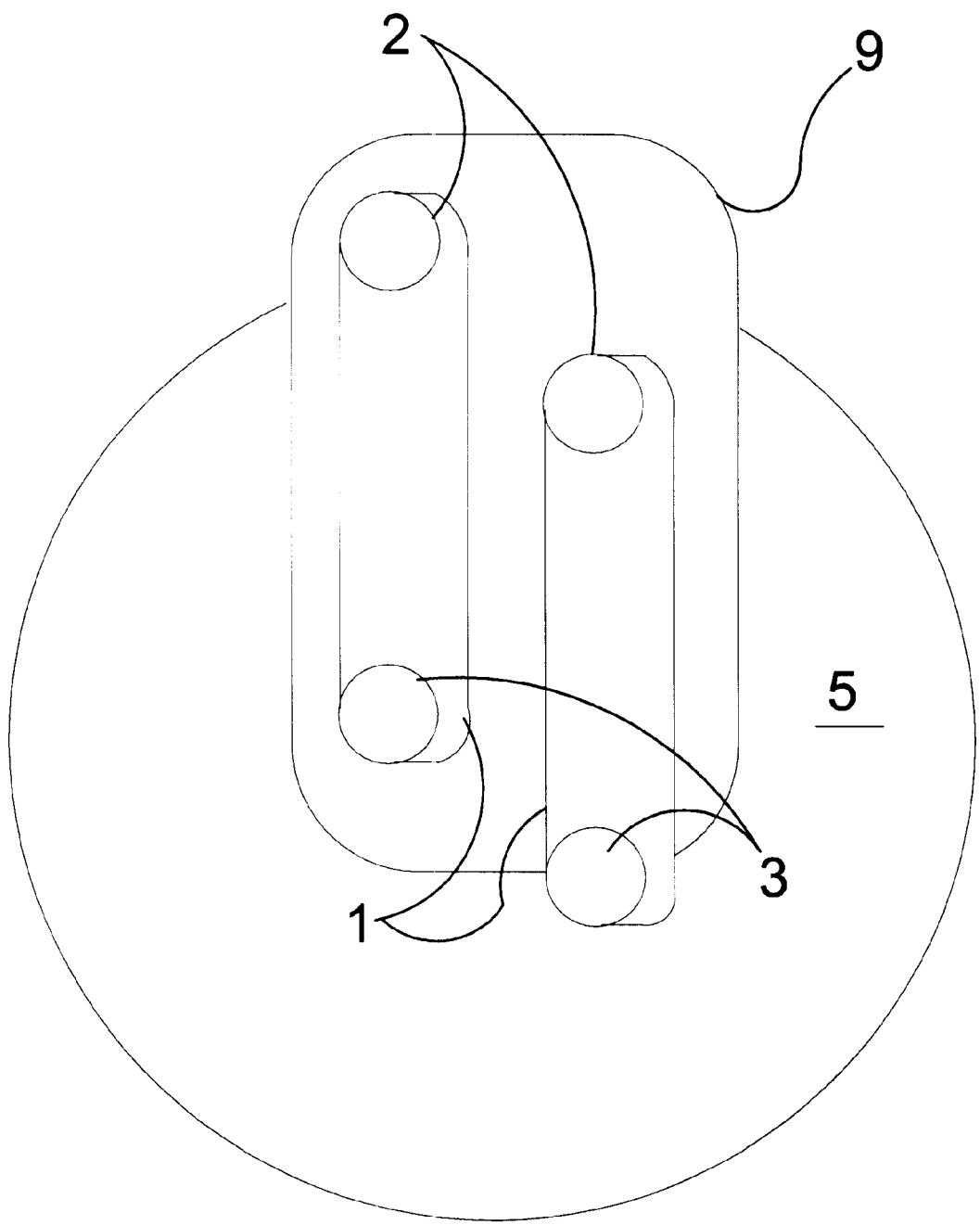
FIG. 40 is a side view of the wheel suspension system of the present invention connected to a wheel through an intermediate frame.
Figure 41:
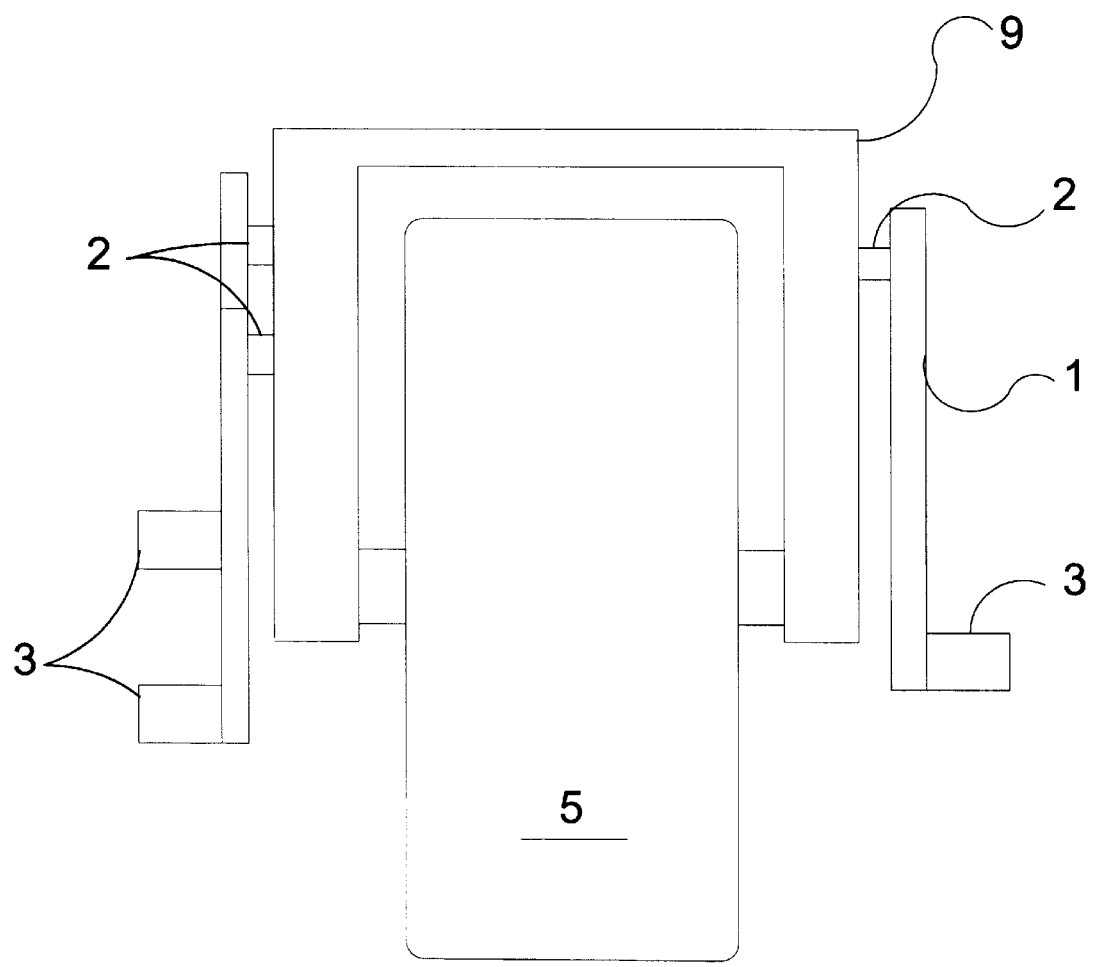
FIG. 41 is a front view of the wheel suspension system of the present invention connected to a wheel through an intermediate frame as seen in FIG. 40.

FIGS. 40 and 41 are different views of a single wheel 5 equipped with TS through an intermediate frame 72. The intermediate frame 72 allows more freedom to choose the positioning of joints 3 and the length of the swing arms 1.

FIG. 40 is the side view of the embodiment. Note that the joints between the intermediate frame 72 and the swing arms 1 are positioned at different height to allow more freedom of the swing arm 1 rotation in one direction. The swing arms 1 should be pivotally connected to the frame 72 on their other ends and the connection should satisfy the requirements of TS and allow the swing arms 1 to move parallel to one another.

FIG. 41 is the rear view of the same embodiment. Note that the swing arms 1 on the left side and on the right side are positioned non-symmetrically. This is for anti-torsional, anti-lateral force considerations. There is a lot of freedom in positioning the swing arms 1 through an intermediate frame.

Figure 37:
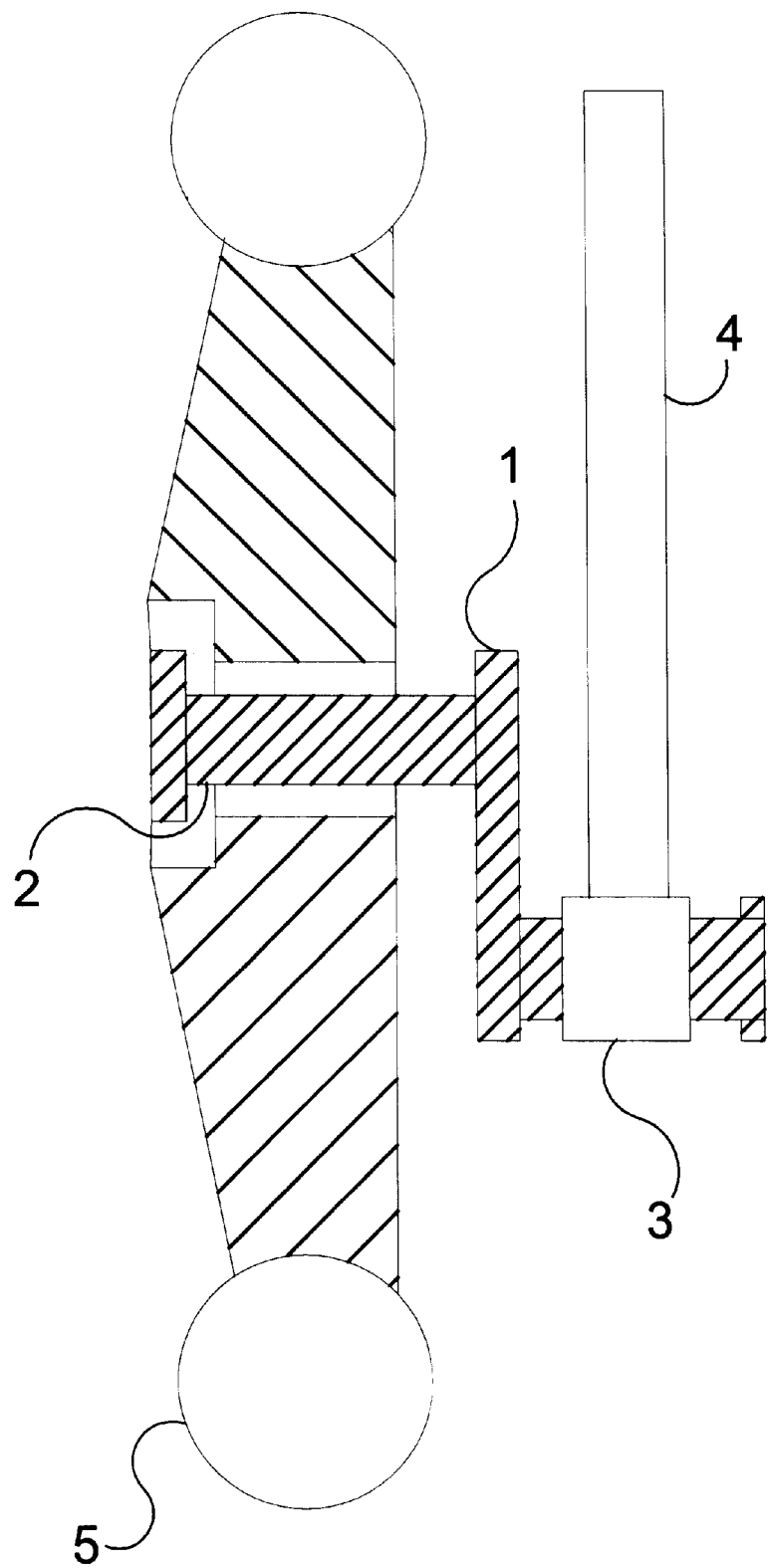
FIG. 37 is a front cross-sectional view of an inline skate having an alternate embodiment of the wheel suspension system of the present invention connected thereto.

FIG. 37 is another variation of TS. In this embodiment, the frame 4 pivotally connects the swing arm 1 via bearing 3 only on one side of the wheel 5 for structural simplicity.

Figure 36:
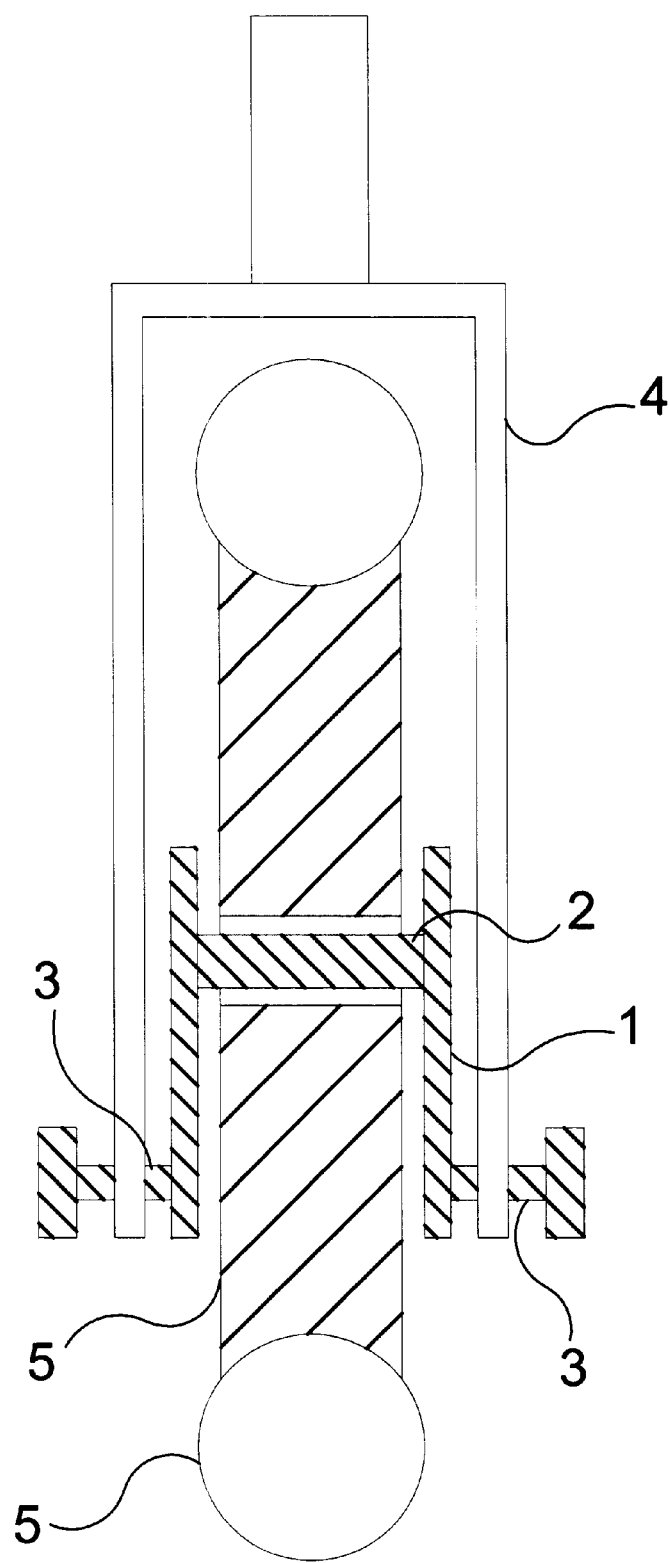
FIG. 36 is a front cross-sectional view of an inline skate having the wheel suspension system of the present invention.

FIG. 36 is the most common form of TS.

Figure 38:
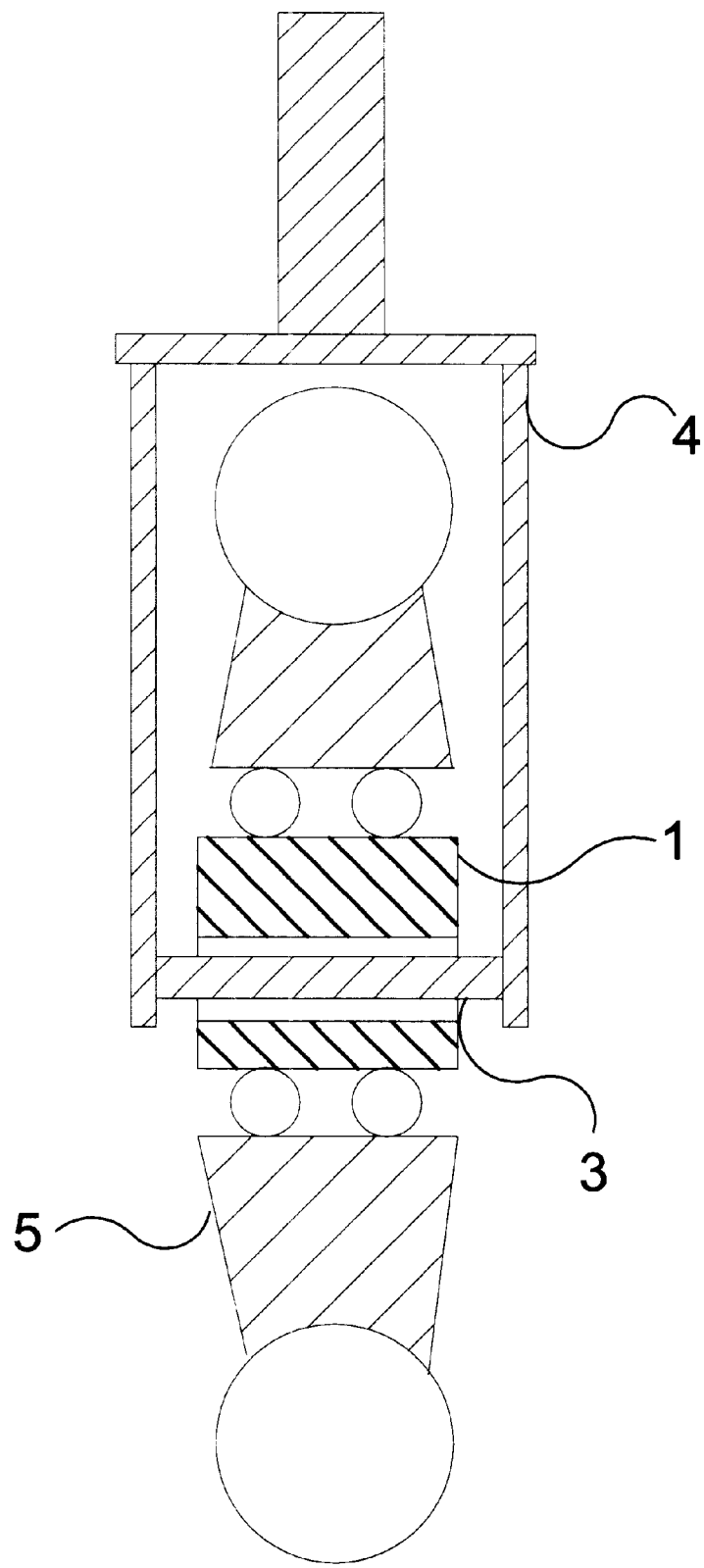
FIG. 38 is a front cross-sectional view of an inline skate having compact form of the wheel suspension system of the present invention connected thereto.

FIG. 38 is the TS wheel defined previously, the most compact form of TS. In this embodiment, the core 1 of the wheel 5 also serves as the swing arm 1. And the wheel axle 2 (which is fixed to the frame 4) ecentrically go through the core via rotatable bearing 3.

4 Applications to a Set of Connected Wheels

Figure 42:
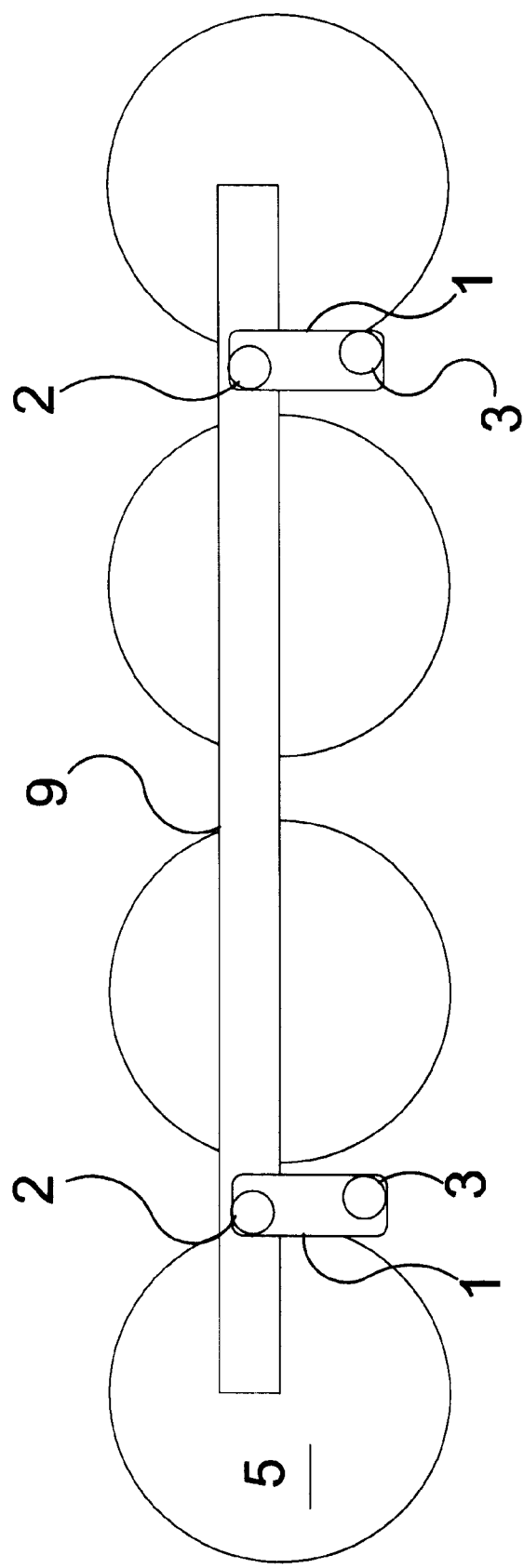
FIG. 42 is a side view of a wheel set suspended by the wheel suspension system of the present invention.

When applying the idea of TS to inline skates 60, we can put the whole wheel set 70 into suspension. FIG. 42 is the side view of the wheel set 70. The pivot joints 2 go between the gap of the wheels 70. The swing arms 1 are connected to the main frame (not shown) of the skate 60 by the pivot joints 3.

Figure 43:
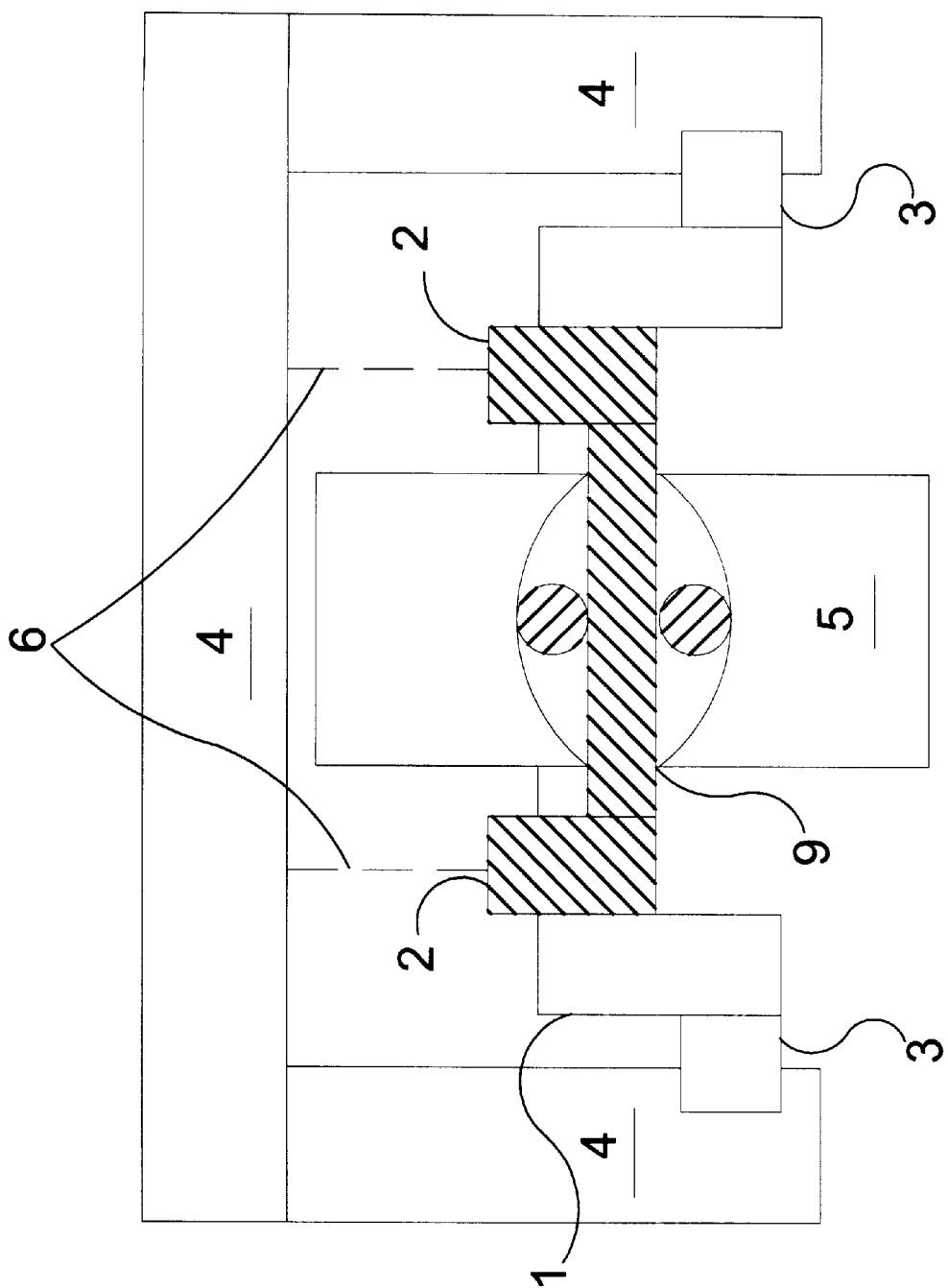
FIG. 43 is a front view of a wheel set shown in FIG. 42 suspended by the wheel suspension system of the present invention.

FIG. 43 is a rear view of the wheel set. From this view one can see clearly that the joints 3 pivotally connect to the main frame 4. There are also springs 6 connecting the wheel set 70 and the main frame 4 in order to restore the normal position of the swing arm 1 when riding on a rough road.

Figure 44:
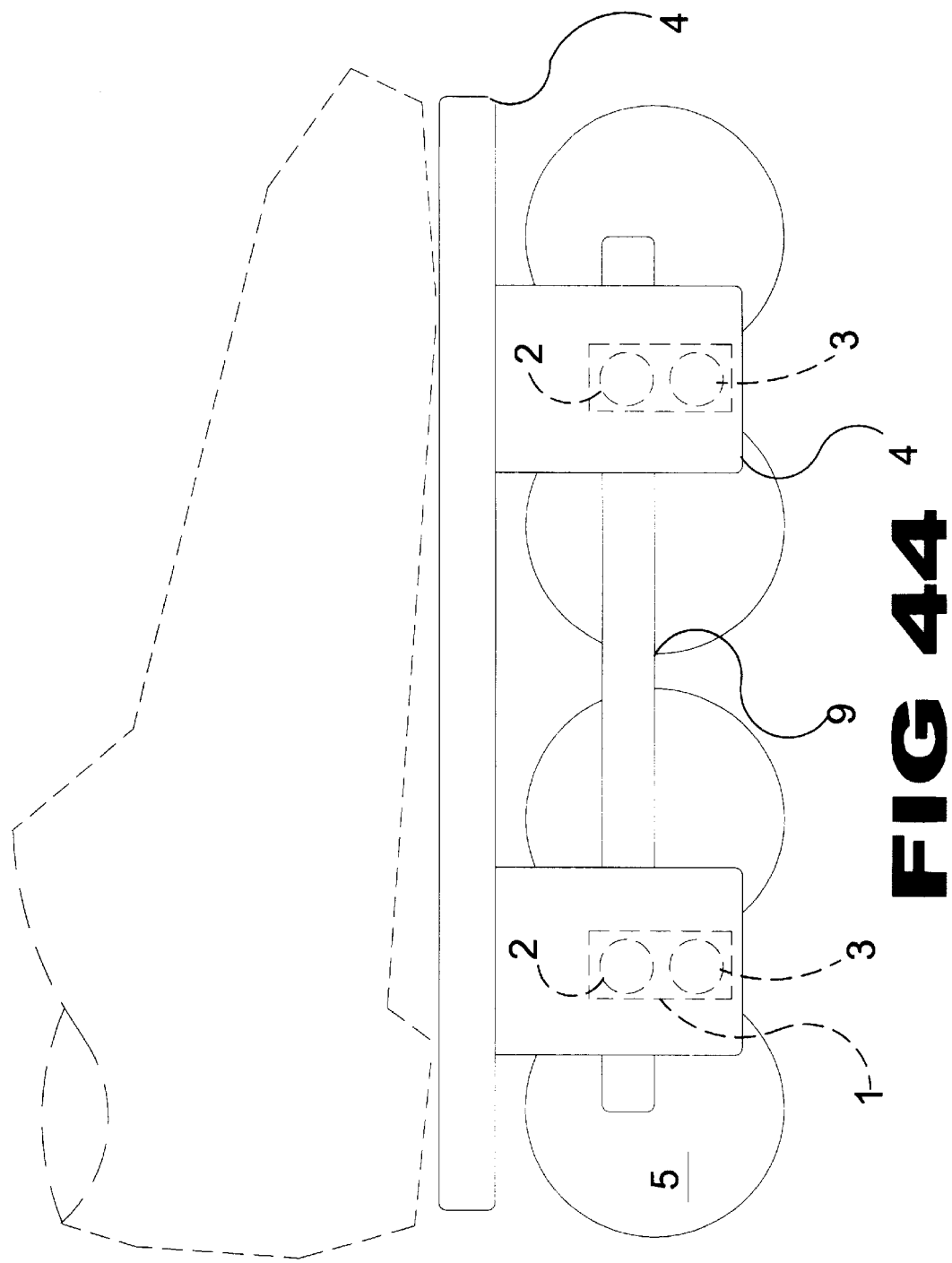
FIG. 44 is a side view of a skate shoe suspended by the wheel suspension system of the present invention with pivot joints connected between the wheel set.

FIG. 44 is the side view of the whole skate shoe 60 equipped with the TS suspension system. The pivot joints 3 between the wheel set and the main frame 4 are blocked by the frame 64, and therefore are shown by the dotted lines.

The advantages of the TS suspension are fully explored when applied to inline skates 60 because it enables the skate shoe to remain positioned in a conventional low profile position.

Figure 45:
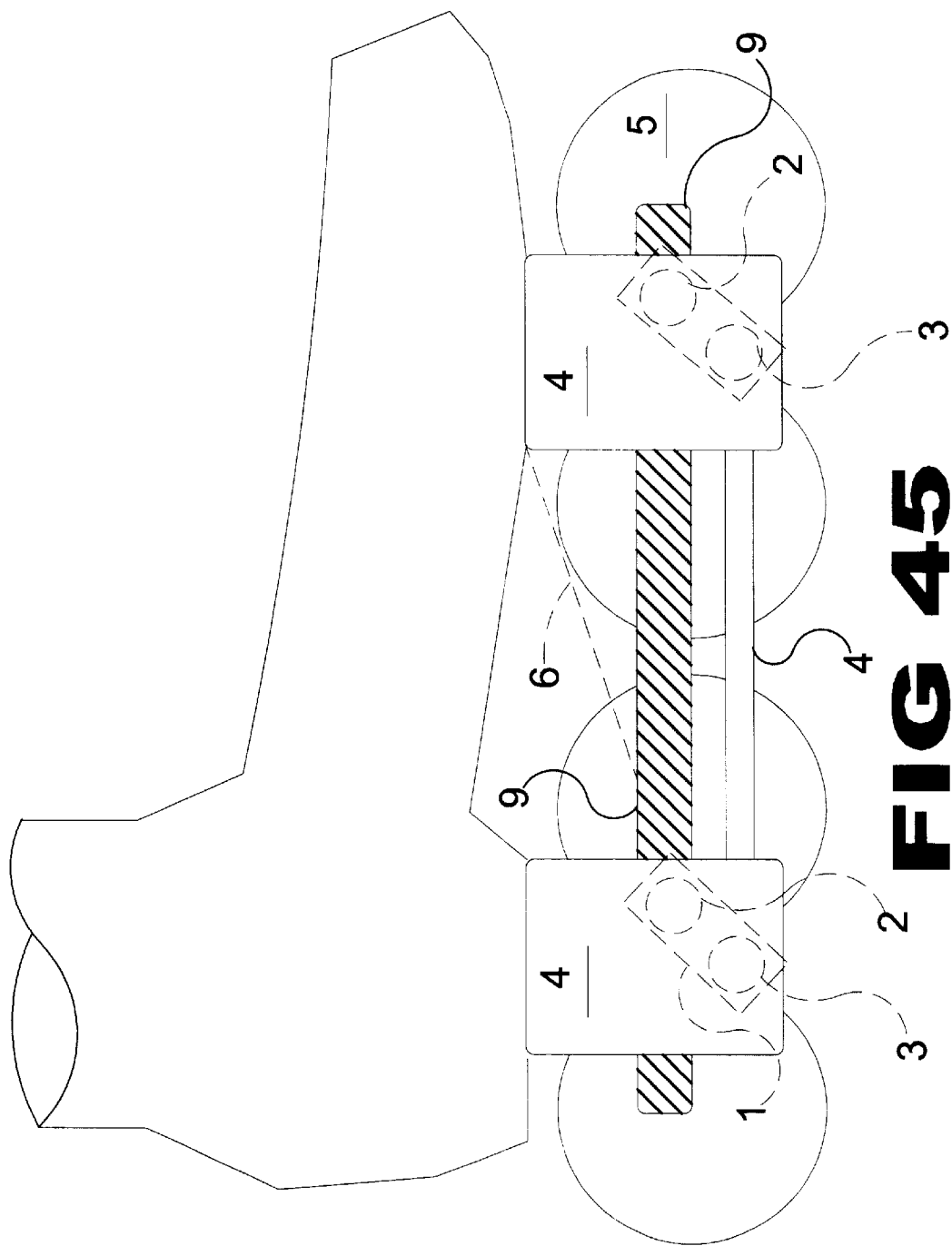
FIG. 45 is a side view of a skate shoe suspended by the wheel suspension system of the present invention as shown in FIG. 44 with increased torque on the spring.

FIG. 45 is the side view of the inline skate unit 60 equipped with the SCTS. Note that the spring 6 connecting the wheel set 70 and the frame 64 pulls forward in order to satisfy the SCTS requirement.

Figure 46:
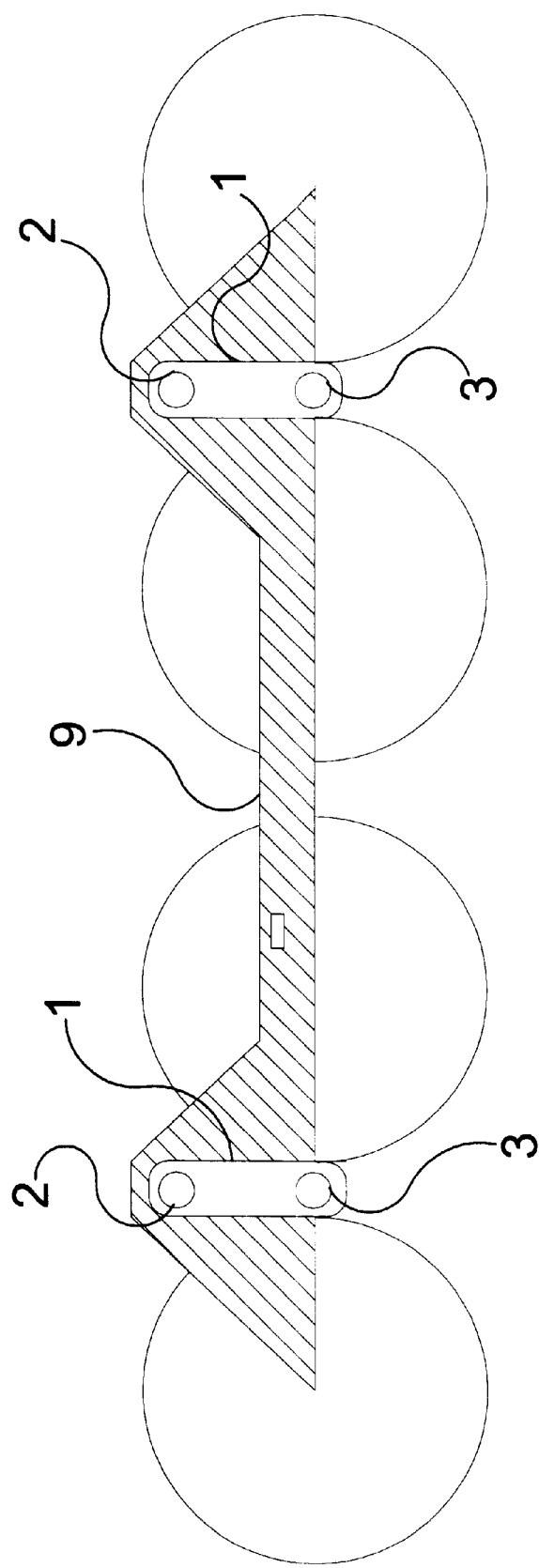
FIG. 46 is a side view of the wheel suspension system of the present invention connected between sets of two wheels of an in line skate.
Figure 47:
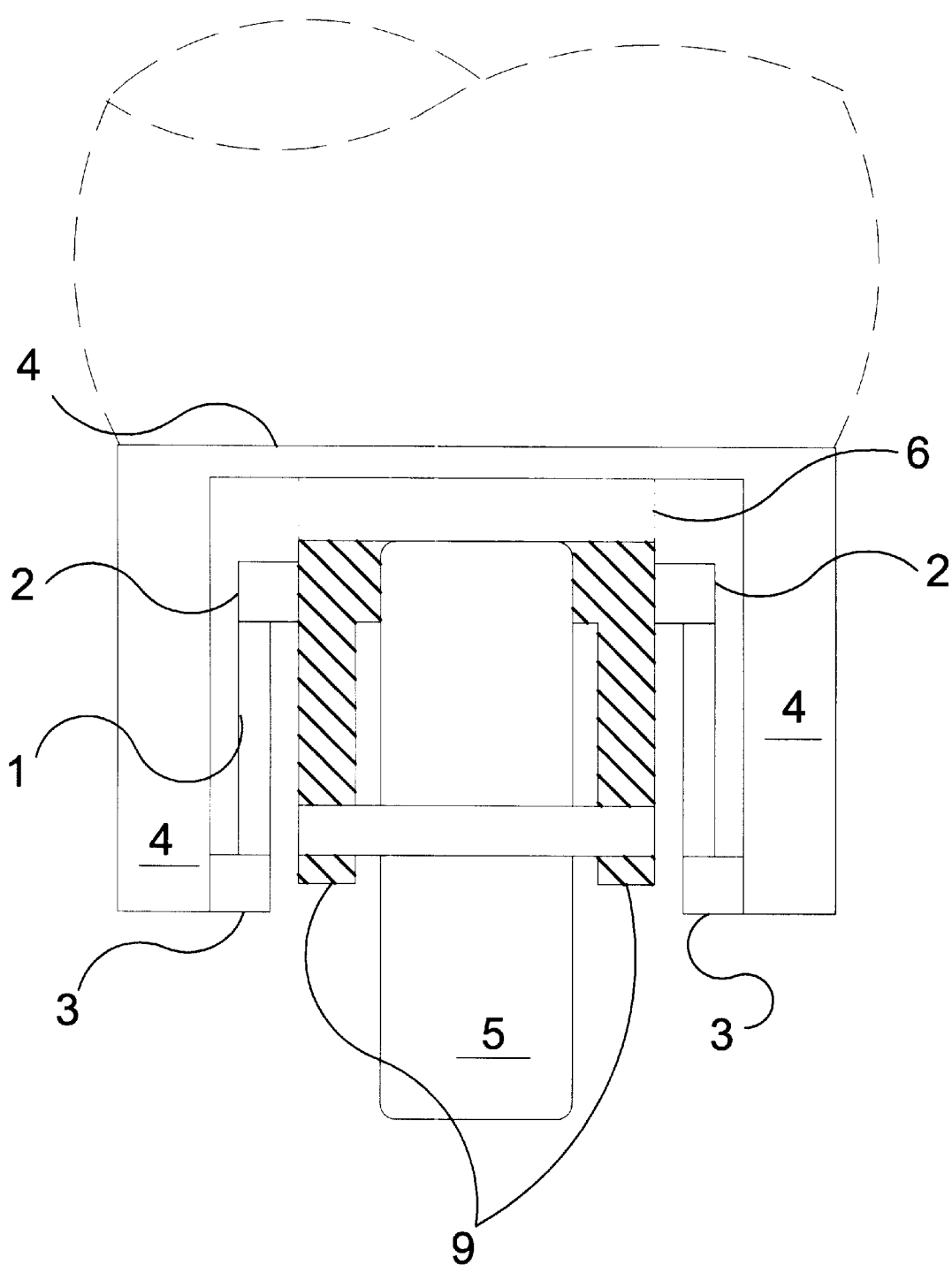
FIG. 47 is a front view of the wheel suspension system of the present invention connected between sets of two wheels of an in line skate.
Figure 48:
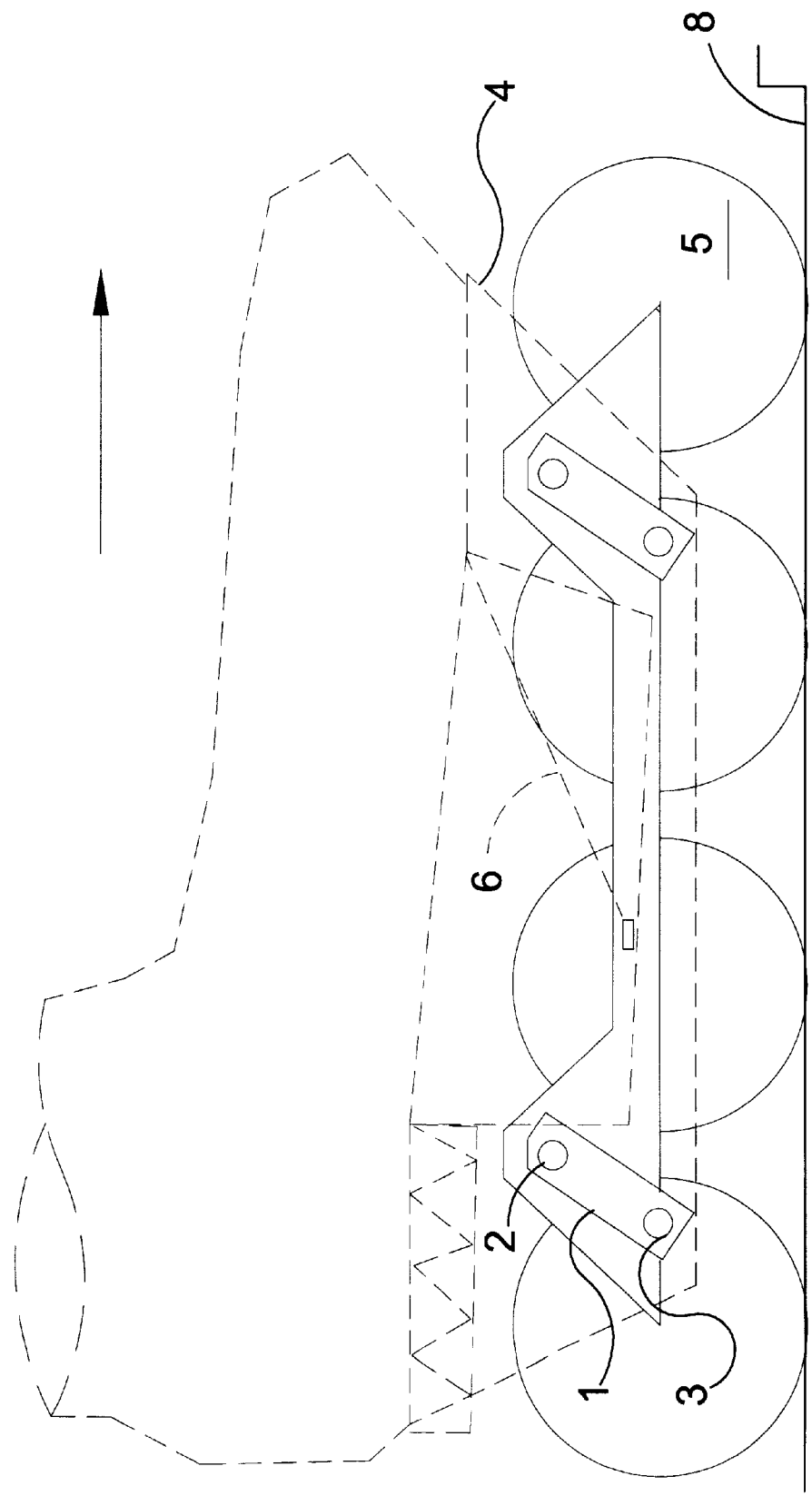
FIG. 48 is a side view of the wheel suspension system of the present invention connected between sets of two wheels of an in line skate with increased torque in the spring.

FIGS. 46–48 are different views of another application of SCTS to inline roller 60. In this embodiment, the pivot joint 2 between the wheel set 70 and the swing arm 1 is located higher to enable the swing arm 1 to have a length which is equal to the wheel radius (note that if the length of the swing arm 1 is greater than the radius of the wheel 5, then at the critical moment, the gravity center of the frame 64 will have already been raised to a distance greater than the height of the bump 18, causing "overshooting"). The pulling string 6 (metal or plastic) is easily replaced by a pulling string having a different strength, i.e. either stronger or weaker, in order to achieve either SCTS or STS respectively.

TS, CTS, or SCTS can also be easily applied to truck type roller skates, roller skateboards, roller skis and other recreational or transportation equipment. They can be used for the whole wheel set or can be used individually for each wheel or a subset of the wheel set to achieve different effects.

Figure 49:
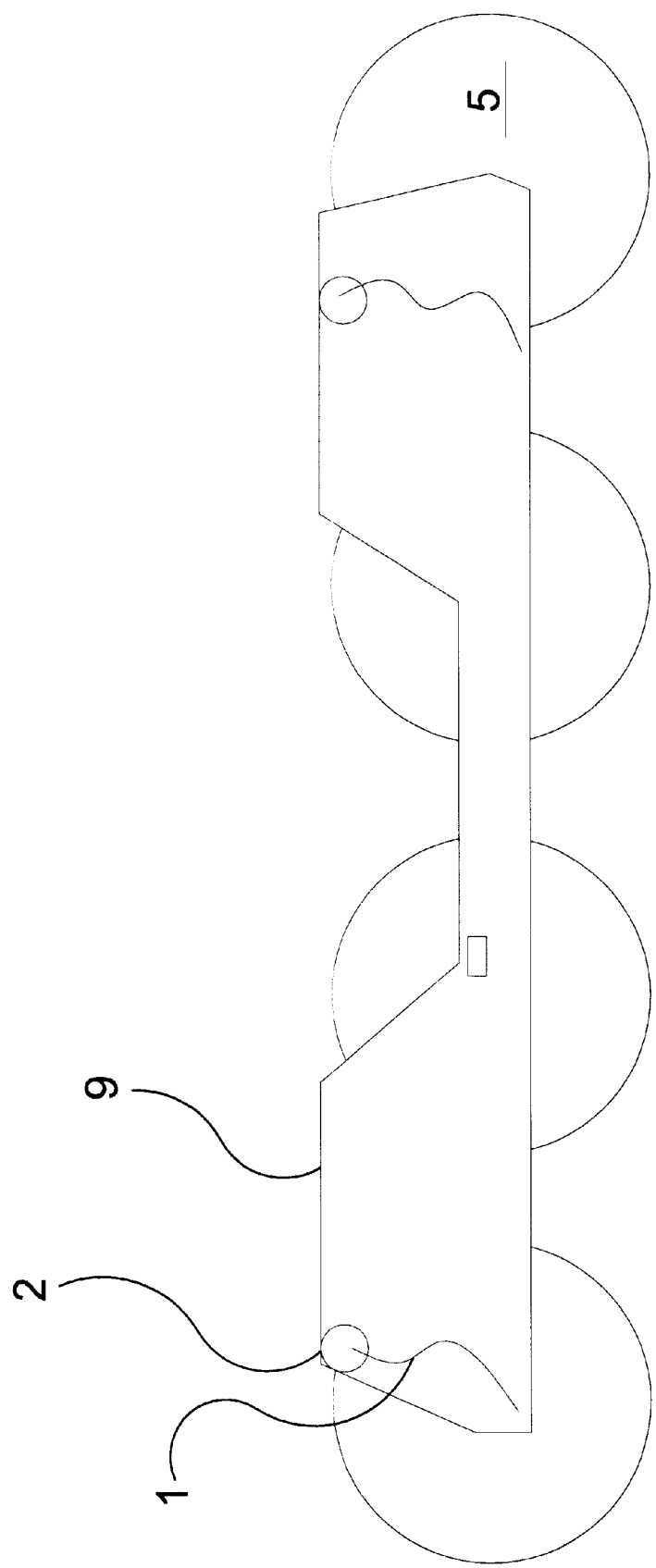
FIG. 49 is a side view of a wheel set of an in line skate including the wheel suspension system of the present invention equipped with a cable swing arm.
Figure 50:
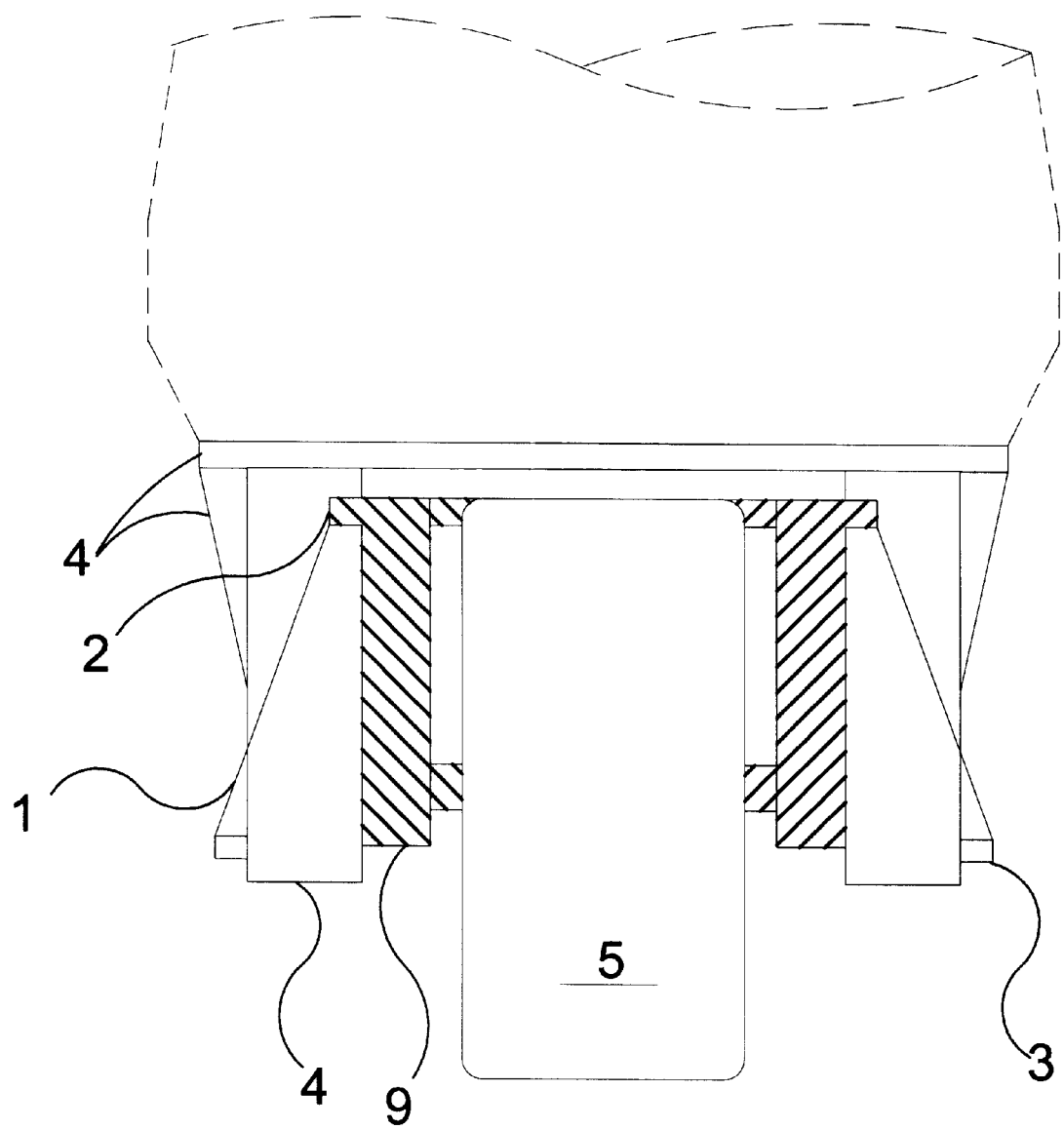
FIG. 50 is a back view of an in line skate including the wheel suspension system of the present invention equipped with a cable swing arm.
Figure 51:
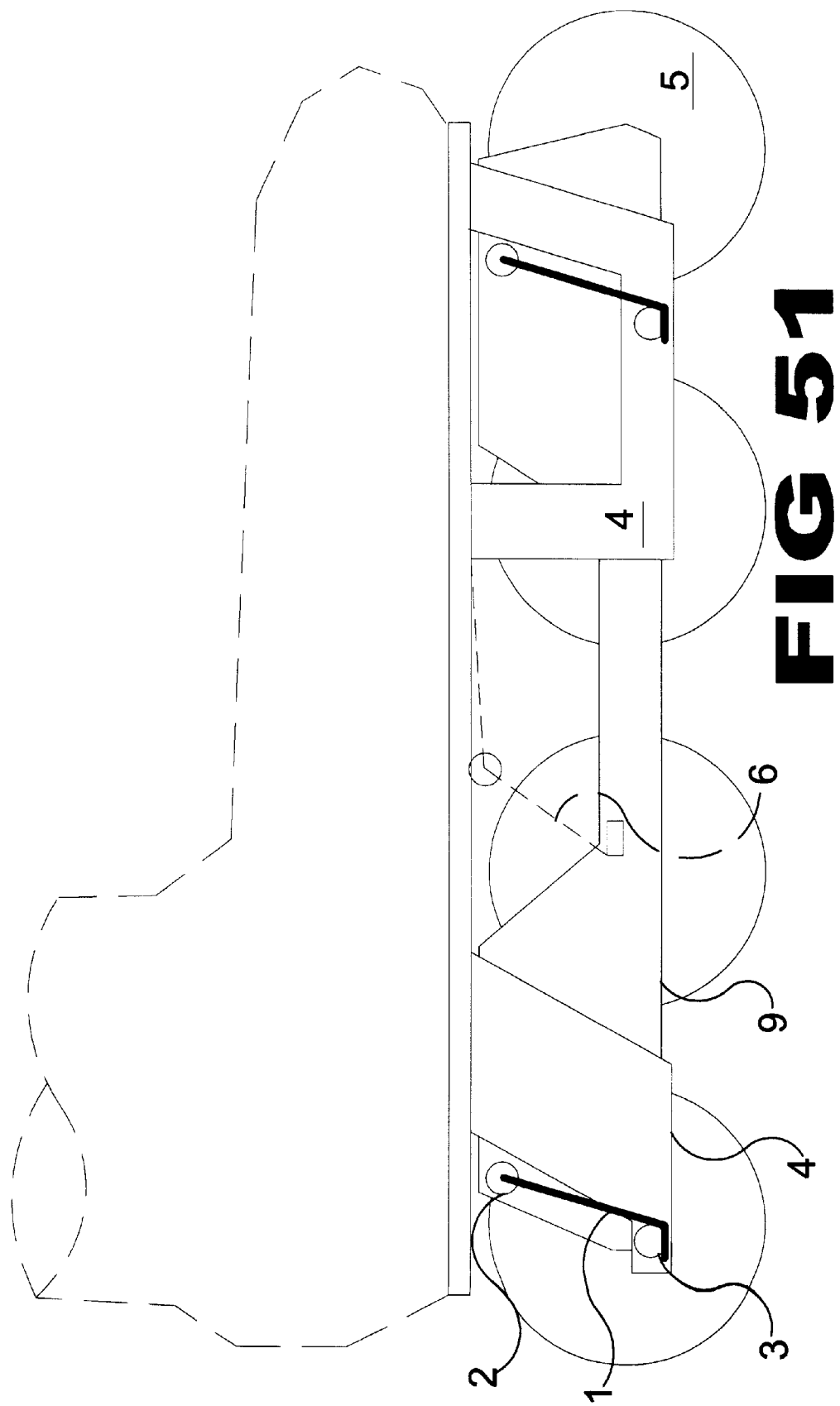
FIG. 51 is a side view of a whole skate including the wheel suspension system of the present invention equipped with a cable swing arm.

FIGS. 49–51 are different views of an inline skate unit 60 equipped with CTS using cable swing arm 1.

FIG. 49 is the side view of the wheel set 70 with the swing cables 1 attached at the front and the rear part. The length of the swing cables 1 should are preferably substantially equal. They can be positioned symmetrically or non-symmetrically on both sides of the wheel set 70 as long as the projections of their movements onto the wheel set surface are all parallel to each other. The surface of the wheel set 70 should be flat and smooth in order to run through the frame 64 freely.

FIG. 51 is the side view of the whole inline skate unit 60.

FIG. 50 in the rear view of the same embodiment. Note that the frame 64 keeps the wheel set 70 standing by surface contact and a connection with the swing cables 1. Therefore the inner surface on the frame 64 must be also very smooth, and the frame 64 should be laterally rigid. Also notice that the swing cables 1 have a certain inclination. The inclination helps stabilize the wheel set 70 when running and also helps the frame 64 to stand lateral force in a powerful stride.

Figure 52:
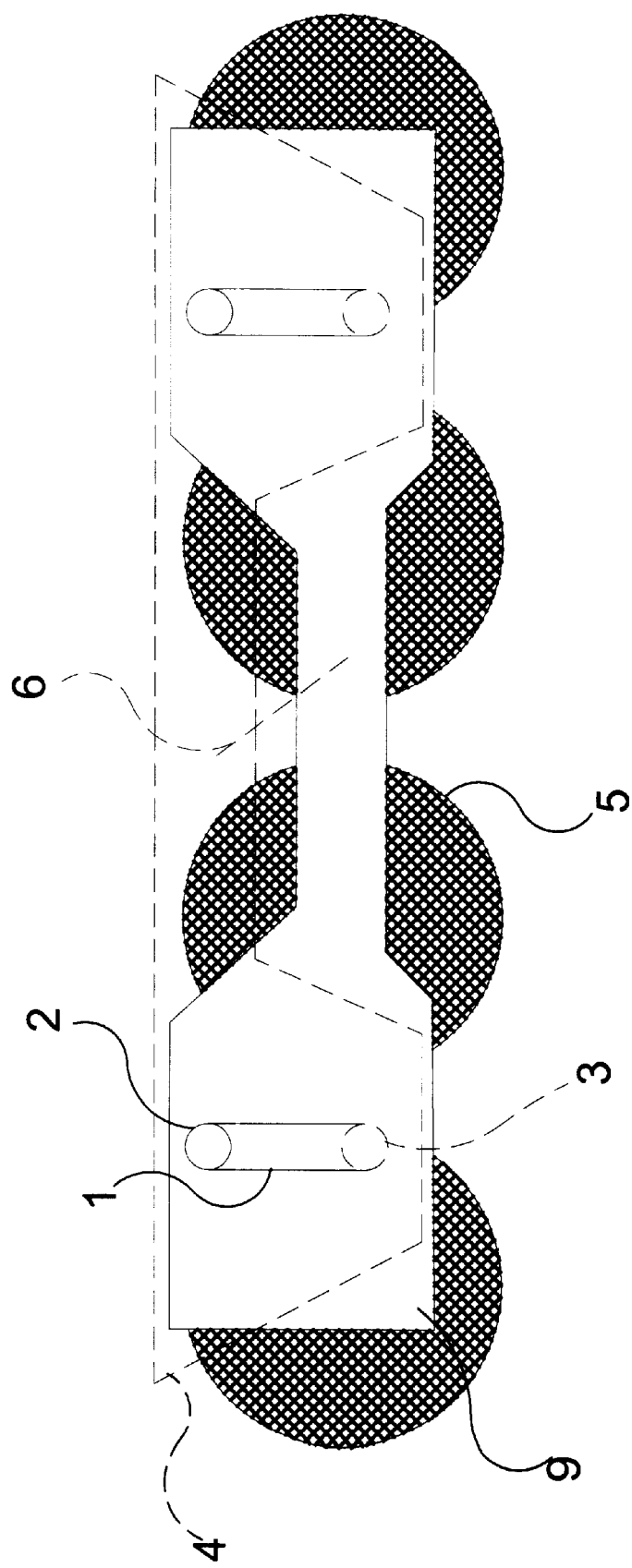
FIG. 52 is a side view of wheels of an in line skate including the wheel suspension system of the present invention and having a cable ring for hooking two hookers.
Figure 53:
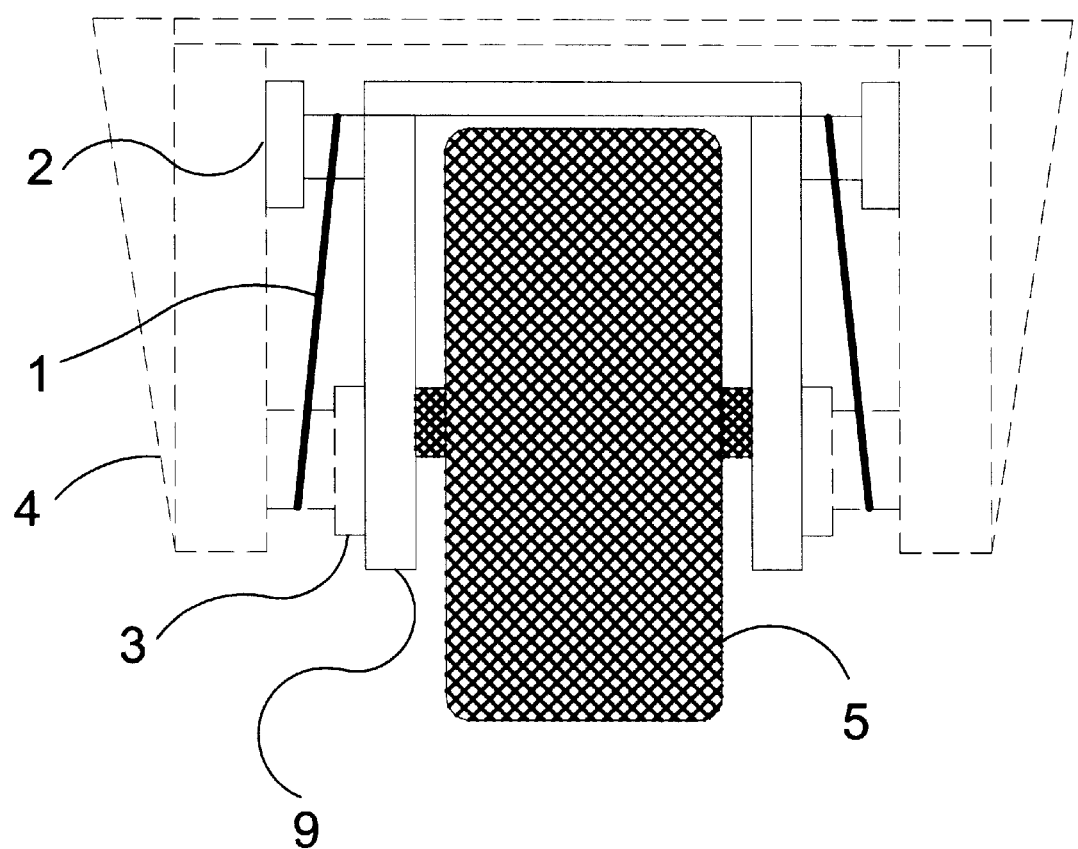
FIG. 53 is a front view of wheels of an in line skate shown in FIG. 52 including the wheel suspension system of the present invention and having a cable ring for hooking two hookers.

FIGS. 52–53 are two views of another variation of TS as applied to the inline skate 60.

Instead of using a single cable hooking two hookers, e.g. joints 2 and 3, a cable ring 1 is used. All the advantages of the cable swing arm are preserved, and in addition, the swing cable 1 can be ½ as thin as in the single cable and fastening the cable is easily performed by simply hooking the cable ring 1 to the two corresponding cable hookers 2 and 3. Note that the pairs of hookers 2 and 3 connecting the same cable 1 should be of equal radius in order to keep the distance between them unchanged and eliminate abrasions and friction between the cable 1 and the hookers 2 and 3 during swinging. The distance between each pair of hookers is preferably no more than the radius of the wheel 5 in order to avoid "over shooting". Also notice that the skate shoes are not in the graph. They can be attached to the top of the frame 64 in the conventional way. The wheel set 70 is preferably able to slide freely within the frame 64 therefore the surface of the wheel set 70 should be smooth. The hookers 2 and 3 also act as spacers in the gap between the wheel set 70 and the frame 64, therefore the sliding surfaces between them should be smooth (not that for each pair of hookers, the upper hooker is part of the wheel set 70 and the lower hooker is part of the frame 64.)

Figure 54:
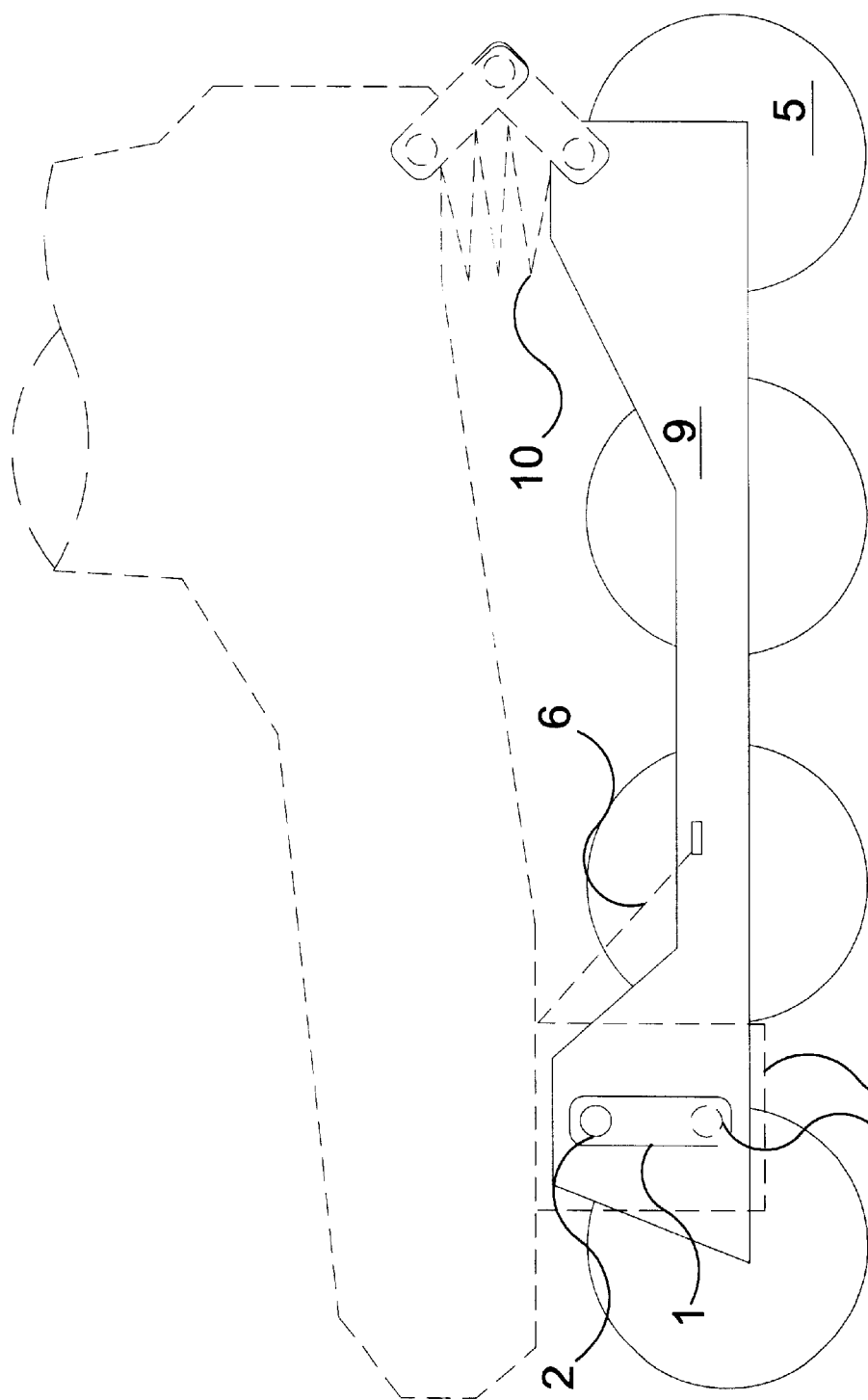
FIG. 54 is a side view of an in line skate including the wheel suspension system of the present invention connected to the front of the wheel set and conventional suspension on the back of the wheel set.

FIG. 54 is the side view of an inline skate unit 60 equipped with the so called Mixed Tangential Suspension (MTS). TS is applied at the front part of the wheel set 70 where there is no room for the wheel set 70 to bounce up, and conventional suspension is applied to the rear part of the wheel set 70 where there is room for the wheel set to bounce up. Note that the weight bearing spring 10 is compression type. The connection at the rear part is to restrict the side movement of the frame 64 (or the shoe) relative to the wheel set, while allowing freedom in other directions like up and down, back and forth. It is only used for describing the freedom, it is neither unique nor optimal. For example, one may use a single "C" shape leaf spring to replace both the spring 74 and the rear connection, or use surface contraction arrangement to replace the spring 6. The weight bearing spring 10 must act directly above the axle 2 of the rear wheel or close to it, or behind it in order for the TS at the front to work as it is supposed (otherwise overshooting will occur at the front TS). The advantage of MTS is that it has kept all the properties of TS for all the wheels 5 in the wheel set 70, and also provides the added advantage of conventional suspension for the rear 3 wheels. These combined advantages can also be achieved without MTS by a more independent combination of TS and conventional suspensions. For example, one may apply independent TS to the front wheel, and apply independent conventional suspension for the rest of the wheels or introduce a buffer at the heel part of the skate.

5 Applications to Coaxle Wheels

TS (CTS or SCTS) can also be applied to coaxial wheels. FIGS. 55–58 show the application of TS to utility carts to improve their ability of overcoming bumps and curbs.

Figure 55:
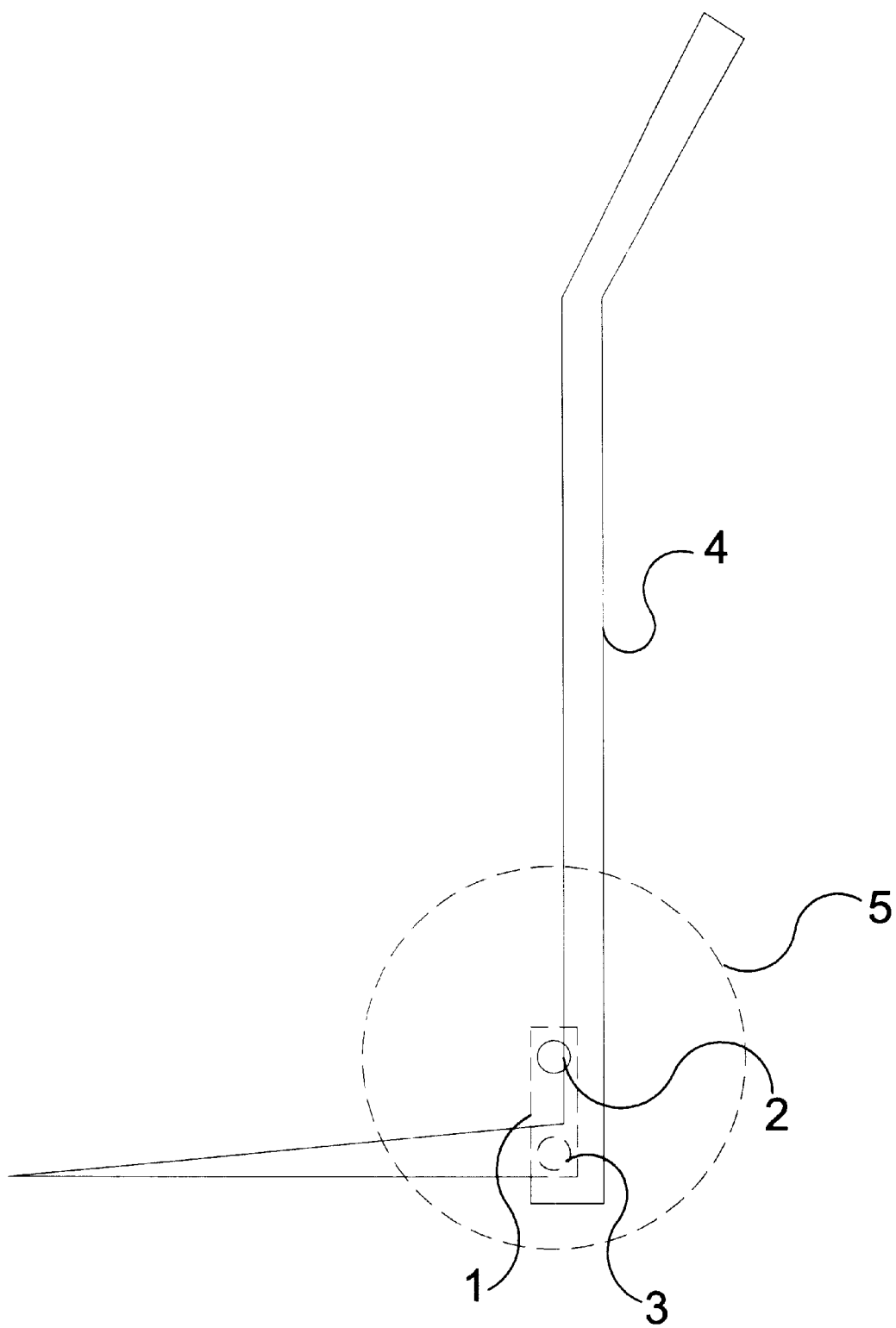
FIG. 55 is a side view of a hand truck including the wheel suspension system of the present invention.

FIG. 55 is the side view of a work cart with TS. As can be seen, the swing arm 1 is connected a wheel (not shown) at a first end thereof by a joint 2 and to the junction of the frame 4 with the base 76 at a second end thereof by a second joint 3.

Figure 56:
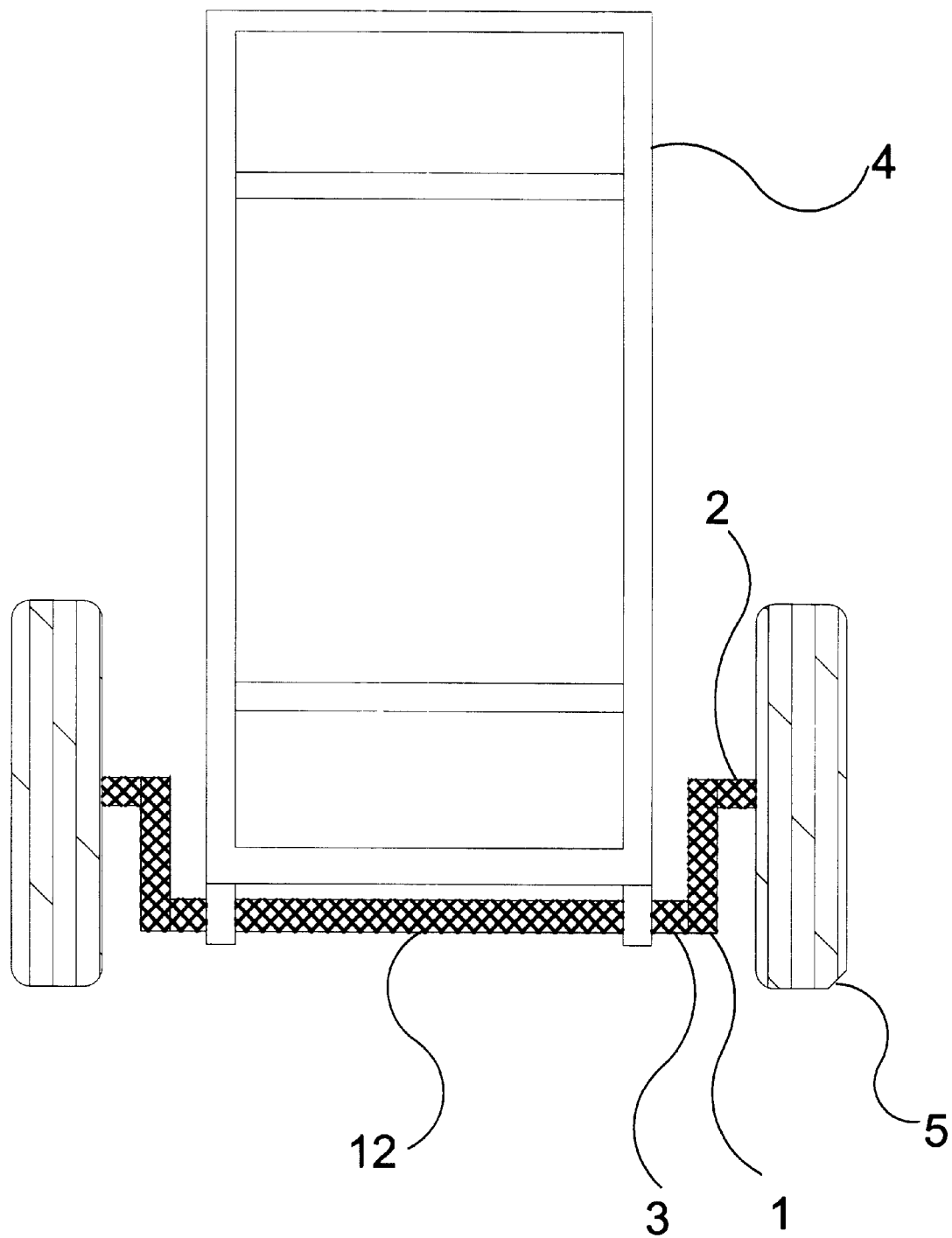
FIG. 56 is a rear view of the hand truck shown in FIG. 55 including the wheel suspension system of the present invention.

FIG. 56 is the rear view of the same embodiment. Note that the swing arms 1 and the axle 2 are rigidly connected to each other while the axle or joint 3 pivotally connects the frame 4 and the swing arms 1 to the wheels 5.

Figure 57:
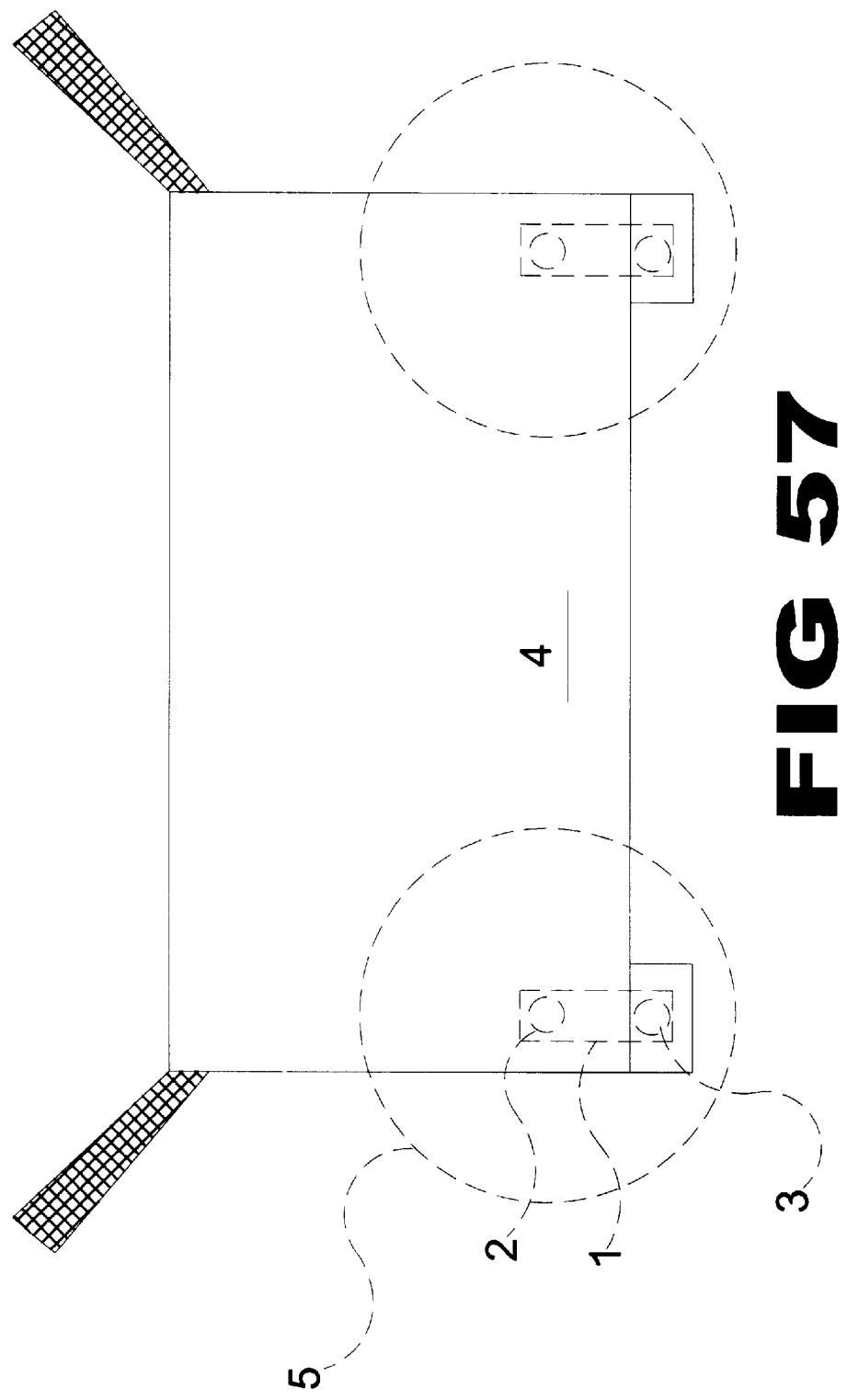
FIG. 57 is a side view of a cart including the wheel suspension system of the present invention.

FIG. 57 is the side view of a cart with TS.

Figure 58:
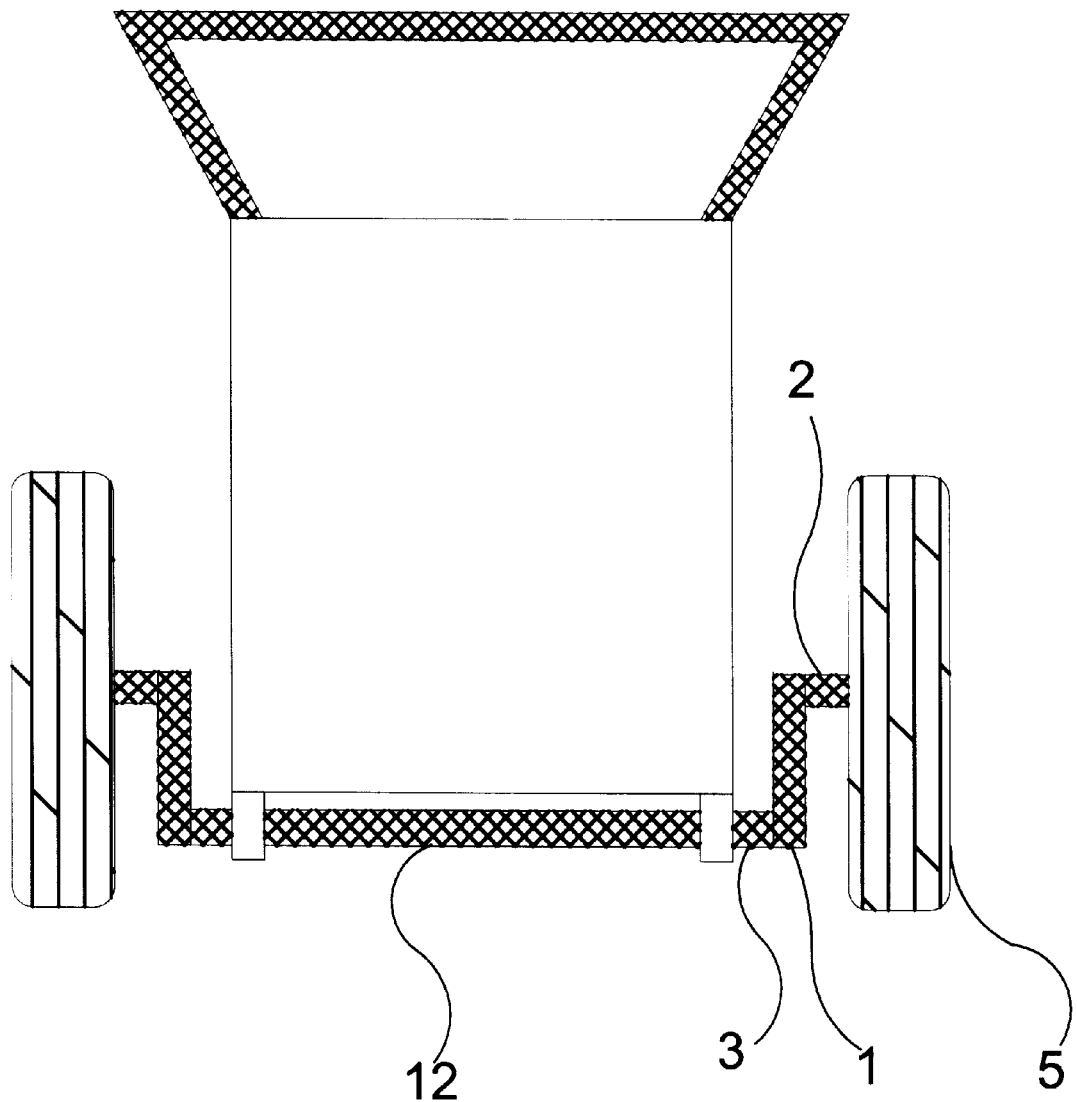
FIG. 58 is a rear view of the cart shown in FIG. 57 including the wheel suspension system of the present invention.

FIG. 58 is the rear view of the same embodiment. In addition to improving the cart's ability to roll over curbs and reduce the shock associated therewith, the TS also makes the cart more stable than conventional suspension systems which introduce the vertical movement of the frame. Therefore, in this case, TS is ideal for carts carrying heavy loads, electronic equipment, street merchandise, etc.

Figure 59:
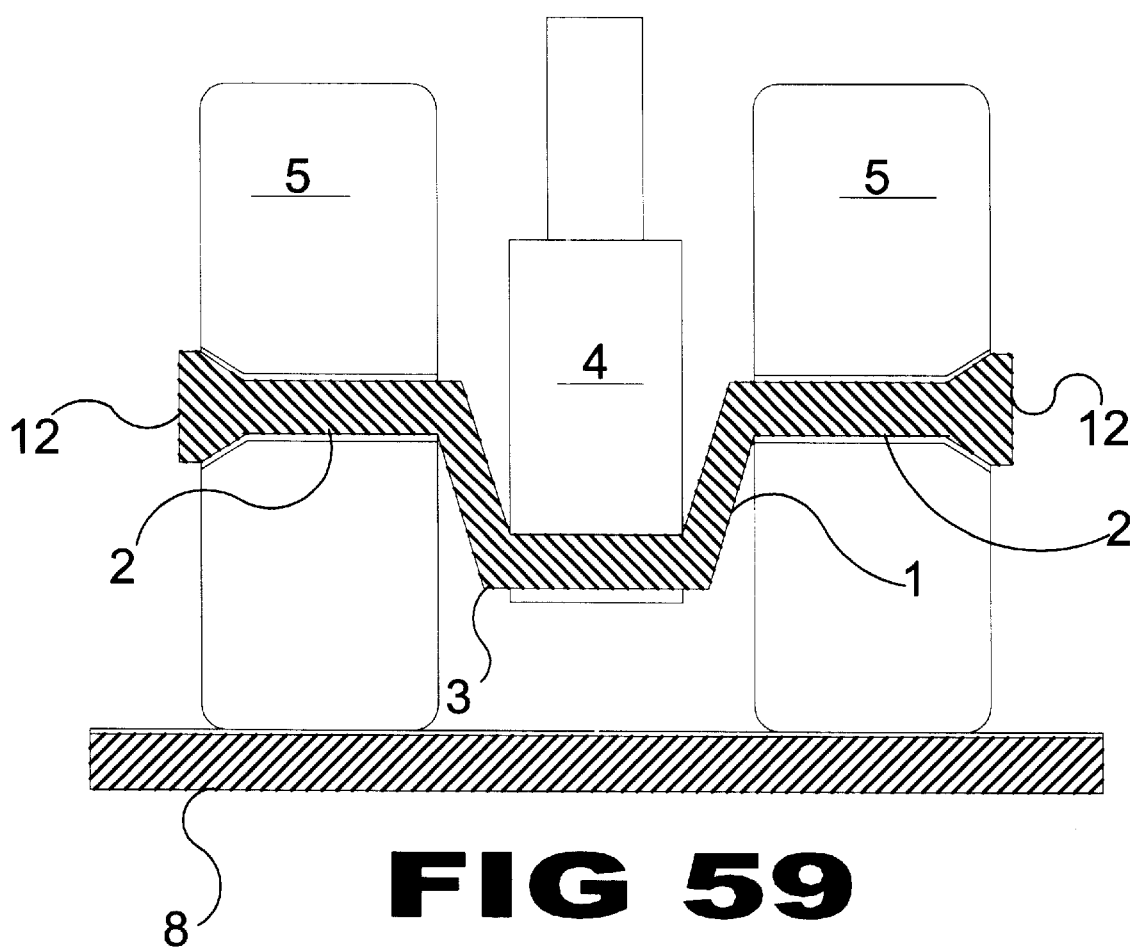
FIG. 59 is a rear view of wheels of a baby stroller including the wheel suspension system of the present invention.

FIG. 59 is a rear view of TS applied to the wheels of a baby stroller. Note that the "V" shape axle pivotally extends through three bearings (or simply, holes) 78, 80 and 82, two at the wheel centers 78 and 82 and one at the frame 80.

Figure 60:
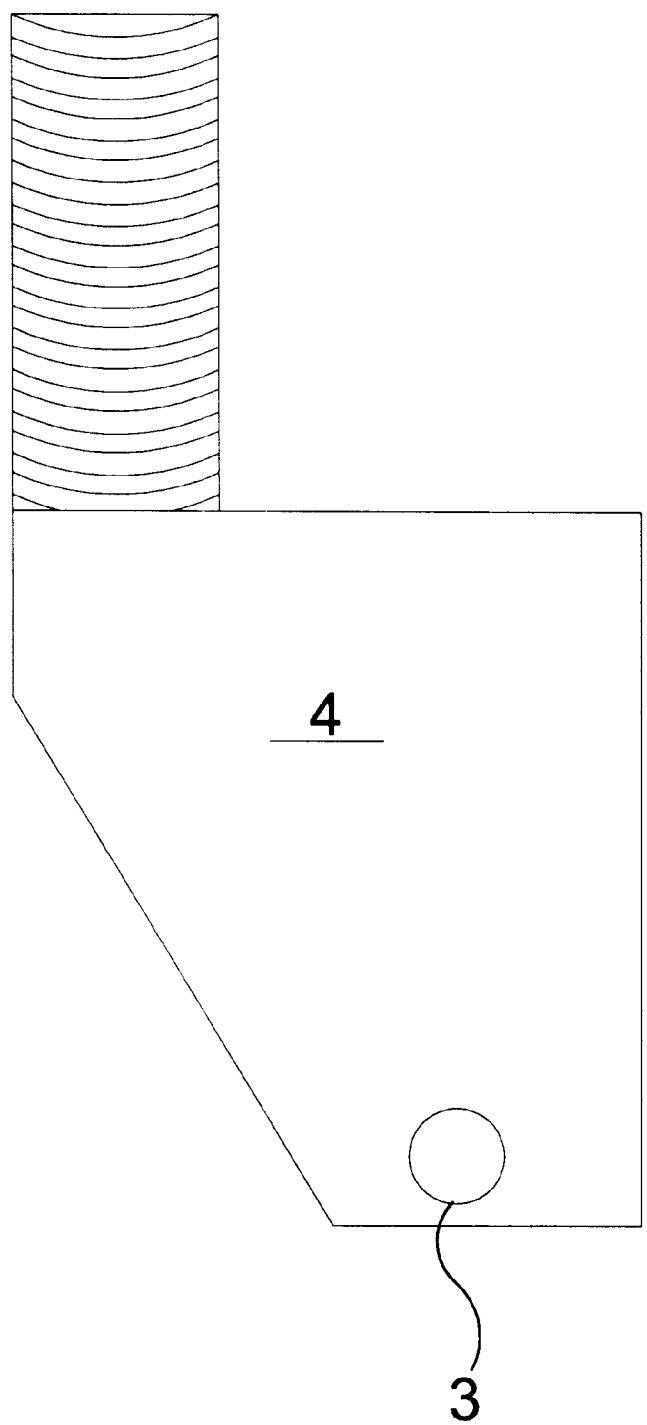
FIG. 60 is a side view of a frame of the baby stroller including the wheel suspension system of the present invention for multi-direction wheels.

FIG. 60 is the side view of the frame 4 in the embodiment of FIG. 59, for a stroller having multi-direction wheels.

Figure 61:
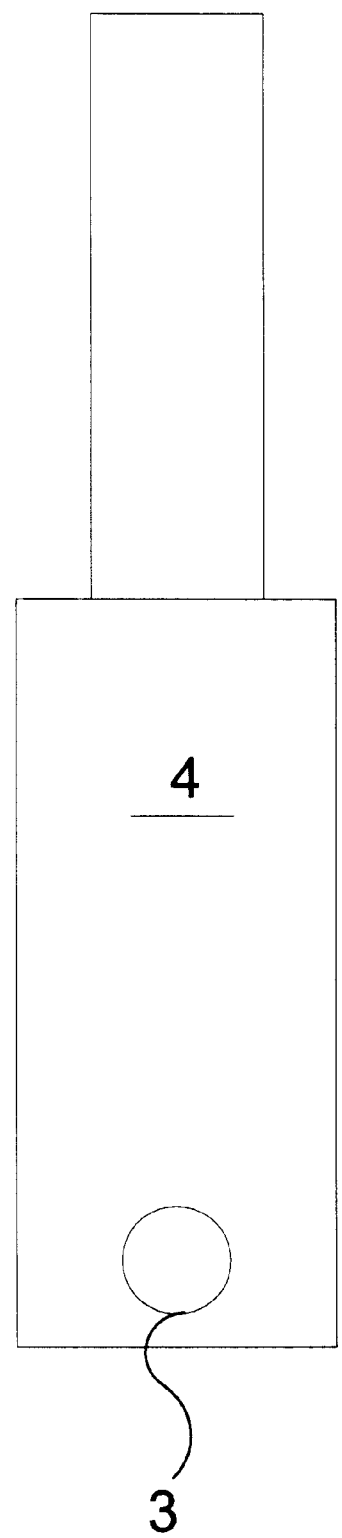
FIG. 61 is a side view of a frame of the baby stroller including the wheel suspension system of the present invention for single direction wheels.

FIG. 61 is the side view of the frame 4 in the embodiment of FIG. 59, for a stroller having single-direction wheels. TS eliminates the shocks from the twin wheels when they encounter bumps or dents as described above with respect to bicycles, rollerblades and carts.

FIG. 62 is another variation of the TS applied to baby strollers with twin wheels. Note that the wheel axle 12 is fixed with the twin wheels. The swing arm 1 pivotally connects to the wheel axle 84 via bearing 2 on one ends and pivotally connects to the frame 4 via bearing 3 on the other end. Also notice that the frame is formed in the shape of an "O" in order to provide space for the movement of the wheel axle 84.

What is claimed is:

1. In combination, a wheel suspension having a frame, weight bearing wheels and swing arms comprising:
    (a) one of said wheels having an axle upon which said wheel is rotatable, a pair of parallel swing arms extending in the same direction on opposite sides of said wheel, an upper end of each of the swing arms being rigidly connected to freely rotate with said axle;
    (b) said wheel being able to rotate around its axle as said wheel rides on a surface;
    (c) said frame having downwardly extending fork members on opposite sides of said wheel with distal ends of said fork members connected pivotally to lower ends of said swing arms respectively, said fork members comprising the sole connection of said frame to said wheel;
    (d) said swing arms thereby being rotatable along with said axle with respect to said wheel and also around its connection with said frame;
    (e) each of said swing arms extending down from said axle and being substantially perpendicular to the ground when said wheel is still or moving with constant velocity on a flat, smooth and level ground surface and said swine arms are able to swing forward and backward when said wheel makes contact with irregularities on said ground surface.

2. The combination according to claim 1 whereby the length of each of the said swing arms is optimally equal to or less than the radius of said wheel.

* * * * *